US012274654B2

(12) United States Patent
Singh et al.

(10) Patent No.: US 12,274,654 B2
(45) Date of Patent: Apr. 15, 2025

(54) DEVICES AND METHODS FOR TRANSFERRING AN OBJECT

(71) Applicant: Able Innovations Inc., Toronto (CA)

(72) Inventors: Jayiesh Singh, Toronto (CA); Philip Chang, Toronto (CA); Thomas Alexander Medal, Toronto (CA); Simon Chang, Scarborough (CA); Aditya Narayanan, Mississauga (CA); Ngoc Phuong Bui, Toronto (CA)

(73) Assignee: Able Innovations Inc. (CA)

( * ) Notice: Subject to any disclaimer, the term of this patent is extended or adjusted under 35 U.S.C. 154(b) by 368 days.

(21) Appl. No.: 17/768,823

(22) PCT Filed: Oct. 16, 2020

(86) PCT No.: PCT/CA2020/051389
§ 371 (c)(1),
(2) Date: Apr. 13, 2022

(87) PCT Pub. No.: WO2021/072547
PCT Pub. Date: Apr. 22, 2021

(65) Prior Publication Data
US 2023/0277399 A1    Sep. 7, 2023

Related U.S. Application Data

(60) Provisional application No. 62/923,216, filed on Oct. 18, 2019.

(51) Int. Cl.
*A61G 7/10* (2006.01)
*B65G 15/06* (2006.01)
(Continued)

(52) U.S. Cl.
CPC .......... *A61G 7/1032* (2013.01); *A61G 7/1011* (2013.01); *A61G 7/1019* (2013.01);
(Continued)

(58) Field of Classification Search
CPC .. A61G 7/1032; A61G 7/1011; A61G 7/1019; A61G 7/1036; A61G 7/1073;
(Continued)

(56) References Cited

U.S. PATENT DOCUMENTS 3,493,979 A * 2/1970 Crook, Jr. ................ B65G 7/02
296/17
3,579,672 A    5/1971 Koll et al.
(Continued)

FOREIGN PATENT DOCUMENTS

CN         1903154 A     1/2007
CN       100493484 C     6/2009
(Continued)

OTHER PUBLICATIONS

International Search Report and Written Opinion dated Jan. 4, 2021 for corresponding International Application No. PCT/CA2020/051389, 10 pages.
(Continued)

*Primary Examiner* — Seahee Hong
(74) *Attorney, Agent, or Firm* — DENTONS DAVIS BROWN PC; Matthew Warner-Blankenship

(57) ABSTRACT

A transfer device includes an extendable transfer platform. The transfer platform includes a fixed plate, a moveable plate, and at least one platform actuator configured to selectively move the moveable plate relative to the fixed plate between a retracted position and an extended position in which a leading edge of the moveable plate is located distally from a leading edge of the fixed plate. The transfer platform also includes a transfer belt having a first end secured to a first driven roller, and a second end secured to a second driven roller. The transfer device also includes a platform support structure secured to the transfer platform for supporting the transfer platform above a floor surface.

(Continued)

The platform support structure includes at least one support actuator configured to selectively move the transfer platform relative to the floor surface between a lowered position and a raised position.

19 Claims, 54 Drawing Sheets

(51) Int. Cl.
| | | |
|---|---|---|
| *B65G 15/30* | (2006.01) | |
| *B65G 21/02* | (2006.01) | |
| *B65G 21/12* | (2006.01) | |
| *B65G 35/04* | (2006.01) | |
| *B65G 41/00* | (2006.01) | |
| *B65G 45/22* | (2006.01) | |
| *B65G 45/24* | (2006.01) | |
| *B65G 47/24* | (2006.01) | |
| *B66F 7/06* | (2006.01) | |
| *B66F 7/22* | (2006.01) | |
| *B66F 9/065* | (2006.01) | |
| *B66F 9/19* | (2006.01) | |

(52) U.S. Cl.
CPC ......... *A61G 7/1036* (2013.01); *A61G 7/1046* (2013.01); *A61G 7/1065* (2013.01); *A61G 7/1073* (2013.01); *B65G 15/06* (2013.01); *B65G 15/30* (2013.01); *B65G 21/02* (2013.01); *B65G 21/12* (2013.01); *B65G 35/04* (2013.01); *B65G 41/005* (2013.01); *B65G 45/22* (2013.01); *B65G 45/24* (2013.01); *B65G 47/24* (2013.01); *B66F 7/0625* (2013.01); *B66F 7/065* (2013.01); *B66F 7/22* (2013.01); *B66F 9/065* (2013.01); *B66F 9/19* (2013.01); *A61G 2203/34* (2013.01); *A61G 2203/44* (2013.01); *B65G 2811/0626* (2013.01); *B65G 2812/02019* (2013.01)

(58) Field of Classification Search
CPC ............ A61G 2203/34; A61G 2203/44; B65G 15/06; B65G 15/30; B65G 21/02; B65G 21/12; B65G 35/04; B65G 41/005; B65G 45/22; B65G 45/24; B65G 47/24; B65G 2811/0626; B65G 2812/02019; B66F 7/0625; B66F 7/065; B66F 7/22; B66F 9/065; B66F 9/19
See application file for complete search history.

(56) References Cited

U.S. PATENT DOCUMENTS

| | | | |
|---|---|---|---|
| 3,654,644 A | 4/1972 | Stevens | |
| 3,765,037 A | 10/1973 | Dunkin | |
| 3,829,915 A | 8/1974 | Dunkin | |
| 3,967,328 A * | 7/1976 | Cox | A61G 1/0212 5/81.1 C |
| 4,073,016 A * | 2/1978 | Koll | A61G 7/1032 5/81.1 C |
| 4,631,761 A | 12/1986 | Lederman | |
| 4,680,818 A | 7/1987 | Ooka et al. | |
| 4,794,655 A * | 1/1989 | Ooka | A61G 7/1046 5/81.1 C |
| 4,914,769 A | 4/1990 | Kume et al. | |
| 5,540,321 A | 7/1996 | Foster | |
| 5,937,456 A | 8/1999 | Norris | |
| 6,854,137 B2 | 2/2005 | Johnson | |
| 6,857,143 B2 | 2/2005 | McNulty | |
| 7,200,881 B2 | 4/2007 | Kasagami et al. | |
| 7,484,252 B2 | 2/2009 | Wang | |
| 7,578,011 B2 | 8/2009 | Johnson | |
| 8,214,944 B2 | 7/2012 | Patterson | |
| 8,307,478 B2 | 11/2012 | Patterson et al. | |
| 8,356,368 B2 | 1/2013 | Patterson | |
| 9,254,233 B2 | 2/2016 | Schy | |
| 9,393,168 B2 | 7/2016 | Konda | |
| 9,579,243 B2 | 2/2017 | Rice et al. | |
| 9,668,929 B2 | 6/2017 | Patterson et al. | |
| 9,730,849 B2 | 8/2017 | Patterson et al. | |
| 2004/0244108 A1 | 12/2004 | Spanton | |
| 2005/0135907 A1 | 6/2005 | Romano et al. | |
| 2007/0079438 A1 | 4/2007 | Patterson | |
| 2010/0064431 A1 | 3/2010 | Kawakami et al. | |
| 2010/0138990 A1 | 6/2010 | Van Oirschot | |
| 2012/0084914 A1 | 4/2012 | Patterson et al. | |
| 2012/0291196 A1 | 11/2012 | Konda | |
| 2016/0106608 A1 | 4/2016 | Oh | |
| 2017/0027795 A1 | 2/2017 | Asil | |
| 2017/0071808 A1 | 3/2017 | Wunderlich et al. | |

FOREIGN PATENT DOCUMENTS

| | | |
|---|---|---|
| CN | 104856808 | 8/2015 |
| CN | 104997606 A | 10/2015 |
| CN | 108294889 A | 7/2018 |
| CN | 108324466 A | 7/2018 |
| CN | 108324467 A | 7/2018 |
| EP | 2428197 A1 | 3/2012 |
| EP | 3616665 A1 | 3/2020 |
| FR | 2712488 | 5/1995 |
| WO | 2001030295 A1 | 5/2001 |
| WO | 2012099629 A2 | 7/2012 |

OTHER PUBLICATIONS

First Office Action issued on correspondence Chinese Patent Application No. 2020800873961 dated Jan. 23, 2024, 4 pages.
Kedar, S.A., et al., "Lateral Transfer Devices for Hospital Stretcher," Applied Mechanics and Materials vols. 446-447 (2014) pp. 1330-1333.

* cited by examiner

DEVICES AND METHODS FOR TRANSFERRING AN OBJECT

RELATED APPLICATION

This patent application is a national phase entry of PCT patent application no. PCT/CA2020/051389 filed on Oct. 16, 2020, which claims priority to U.S. provisional patent application No. 62/923,216 filed on Oct. 18, 2019. The aforementioned patent applications are incorporated by reference herein in their entirety.

FIELD

This disclosure relates generally to devices and methods for transferring an object from a position on a first surface, onto a platform of the device, and then onto a second surface (or back to the first surface), and more specifically to devices and methods for transferring an object from (and/or to) a floor surface.

INTRODUCTION

Countries around the world are facing an aging problem whereby in the coming decades, the majority of their populations will become dependents rather than of an independent age contributing to society. Coupled with this aging population is a growing number of people that have restricted mobility due to injury, illness, or old age. Being mobile necessitates a means of transportation (from point A to point B) as well as being transferred (from surface A to surface B).

There are various transportation aids that are often used to aid mobility. Examples include walkers, wheelchairs, slings, transfer boards and gantry hoists. Many of these devices have not been updated or improved in decades and fundamental problems associated with the operation of these transfer methods persist. These included injuries to practitioners, reduced patient health and well-being as a result of interaction with these devices, and induced stress on the health-care sector due to implications of the operation of these devices.

The fact is however, these devices are greatly needed; as between 30-60% of patients in long-term care facilities need assistance with transfer to perform routine tasks such as eating a meal or going to the washroom. Without the aid of these devices, people would remain largely immobile once their health starts to fail. Similar challenges exist when performing routine medical diagnostics or fall recovery with bariatrics patients. In these circumstances some transfers that may be required include (but not limited to), from a gurney to a medical imaging table (e.g. MRI), movement of a fallen patient from the ground back to a controlled surface, or simply re-positioning of their body on their existing surface.

Currently the most popular devices used to assist in patient transfer consist of lifts and slings. These systems are commonly referred to by their trade name as Hoyer Lifts, Hoyer being a popular manufacturer of these devices. These lifts or slings have been in the market for decades with most innovations focusing on improving lift technology. Current technologies typically place significant strain on a human operator, as they typically require some form of "staging" where a sling (or other strap(s) or harnesses) are fitted underneath a patient, and then removed from under the patient after a transfer. Furthermore, these devices are often costly and may put heavy burdens on operating budgets of long-term care and health care facilities. These devices are also error prone, which can and does result in numerous injuries to individuals being transferred, in some cases even resulting in death.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In accordance with one broad aspect of this disclosure, there is provided a transfer device comprising: an extendable transfer platform comprising: a fixed plate having a first end, a second end, and a leading edge extending between the first end and the second end, a moveable plate positioned below the fixed plate and having a first end, a second end, and a leading edge extending between the first end and the second end, at least one platform actuator configured to selectively move the moveable plate relative to the fixed plate between a retracted position in which the fixed plate overlies a majority of the moveable plate, and an extended position in which the leading edge of the moveable plate is located distally from the leading edge of the fixed plate, a transfer belt having a first end secured to a first driven roller, a second end secured to a second driven roller, the belt extending from the first driven roller, above an upper surface of the fixed plate, around the leading edge of the moveable plate, and to the second driven roller, wherein the transfer belt overlies the fixed plate and the moveable plate in both the retracted and extended positions; a platform support structure secured to the extendable transfer platform for supporting the extendable transfer platform above a floor surface, the platform support structure comprising: at least one support actuator configured to selectively move the transfer platform relative to the floor surface between a lowered position in which at least the leading edge of the moveable plate is proximate the floor surface, and a raised position; and a transfer device controller operably coupled to the first driven roller, the second driven roller, and the at least one platform actuator.

In some embodiments, in the lowered position, at least the leading edge of the moveable plate is within about 50 mm of the floor surface.

In some embodiments, the moveable plate comprises an upper moveable plate and a guard layer positioned below and secured to the upper moveable plate.

In some embodiments, a lower surface of the guard layer comprises at least one of a low-friction surface treatment and a roller.

In some embodiments, in the lowered position, the guard layer abuts the floor surface.

In some embodiments, a combined height of the upper moveable plate and the guard layer is less than about 50 mm.

In some embodiments, the guard layer comprises a rigid guard plate.

In some embodiments, the moveable plate comprises two or more articulated plate segments.

In some embodiments, the moveable plate comprises two or more telescopic plate segments.

In some embodiments, the transfer device controller is operably coupled to the at least one support actuator.

In some embodiments, each of the at least one platform actuator, the first driven roller, and the second driven roller are positioned above the guard layer.

In some embodiments, the at least one platform actuator comprises a first linear actuator positioned proximate the first end of the fixed plate, and a second linear actuator positioned proximate the second end of the fixed plate.

In some embodiments, the first and second linear actuators are mechanically coupled to each other and driven by a single platform motor.

In some embodiments, the at least one support actuator is further configured to selectively tilt the transfer platform relative to the floor surface.

In some embodiments, the transfer device further comprises: a belt treatment system comprising at least one of: a UV light emitter configured to direct UV light towards at least an upper surface of the transfer belt; a fluid emitter configured to direct at least one of a cleaning fluid and a disinfectant fluid towards at least the upper surface of the transfer belt, and a fluid agitator configured to agitate fluid in a fluid chamber through which the transfer belt is configured to pass.

In some embodiments, the belt treatment system comprises the UV light emitter, the transfer device controller is operatively coupled to the belt treatment system, and the transfer device controller is configured to selectively actuate the UV light emitter.

In some embodiments, the belt treatment system comprises the fluid emitter, the transfer device controller is operatively coupled to the belt treatment system, and the transfer device controller is configured to selectively actuate the fluid emitter.

In some embodiments, the belt treatment system comprises the fluid agitator, the transfer device controller is operatively coupled to the belt treatment system, and the transfer device controller is configured to selectively actuate the fluid agitator.

In some embodiments, the transfer device controller is operatively coupled to the belt treatment system, and the transfer device controller is configured to selectively actuate one or more of the UV light emitter, the fluid emitter, and the fluid agitator concurrently or separately from each other.

In accordance with another broad aspect, there is provided a transfer device comprising: an extendable transfer platform comprising: a fixed plate having a first end, a second end, and a leading edge extending between the first end and the second end; a moveable plate positioned below the fixed plate and having a first end, a second end, and a leading edge extending between the first end and the second end; at least one platform actuator configured to selectively move the moveable plate relative to the fixed plate between a retracted position in which the fixed plate overlies a majority of the moveable plate, and an extended position in which the leading edge of the moveable plate is located distally from the leading edge of the fixed plate, a transfer belt having a first end secured to a first driven roller, a second end secured to a second driven roller, the belt extending from the first driven roller, above an upper surface of the fixed plate, around the leading edge of the upper moveable plate, and to the second driven roller, wherein the transfer belt overlies the fixed plate and the moveable plate in both the retracted and extended positions; a sensor system operable to generate relative position information for an object to be transferred and the leading edge of the moveable plate; and a transfer device controller operably coupled to the first driven roller, the second driven roller, the at least one platform actuator, and the sensor system, wherein the transfer device controller is configured to control motion of the moveable plate based on at least the relative position information to assist in aligning the leading edge of the moveable plate with the object to be transferred.

In some embodiments, the moveable plate comprises an upper moveable plate and a guard layer positioned below and secured to the upper moveable plate.

In some embodiments, a combined height of the upper moveable plate and the guard layer is less than about 50 mm.

In some embodiments, each of the at least one platform actuator, the first driven roller, and the second driven roller are positioned above the guard layer.

In some embodiments, the guard layer comprises a rigid guard plate.

In some embodiments, the moveable plate comprises two or more articulated plate segments.

In some embodiments, the moveable plate comprises two or more telescopic plate segments.

In some embodiments, the at least one position sensor comprises at least one of an infrared (IR) based time of flight sensor, a LiDAR system, a digital camera system, a depth-enabled camera system, an ultrasonic sensor, a time-of-flight sensor, and a radar mapping system.

In some embodiments, the transfer device further comprises: at least one contact sensor operable to detect contact between the object to be transferred and the leading edge of the moveable plate.

In some embodiments, the transfer device further comprises: a belt treatment system comprising at least one of: a UV light emitter configured to direct UV light towards at least an upper surface of the transfer belt; a fluid emitter configured to direct a disinfectant towards at least the upper surface of the transfer belt; and a fluid agitator configured to agitate fluid in a fluid chamber through which the transfer belt is configured to pass.

In some embodiments, the belt treatment system comprises the UV light emitter, the transfer device controller is operatively coupled to the belt treatment system, and the transfer device controller is configured to selectively actuate the UV light emitter.

In some embodiments, the belt treatment system comprises the fluid emitter, the transfer device controller is operatively coupled to the belt treatment system, and the transfer device controller is configured to selectively actuate the fluid emitter.

In some embodiments, the belt treatment system comprises the fluid agitator, the transfer device controller is operatively coupled to the belt treatment system, and the transfer device controller is configured to selectively actuate the fluid agitator.

In some embodiments, the transfer device controller is operatively coupled to the belt treatment system, and the transfer device controller is configured to selectively actuate one or more of the UV light emitter, the fluid emitter, and the fluid agitator concurrently or separately from each other.

In some embodiments, the transfer device may be used to assist in transferring an object from a first surface to a second surface.

It will be appreciated by a person skilled in the art that a method or apparatus disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which.

Figure 1:
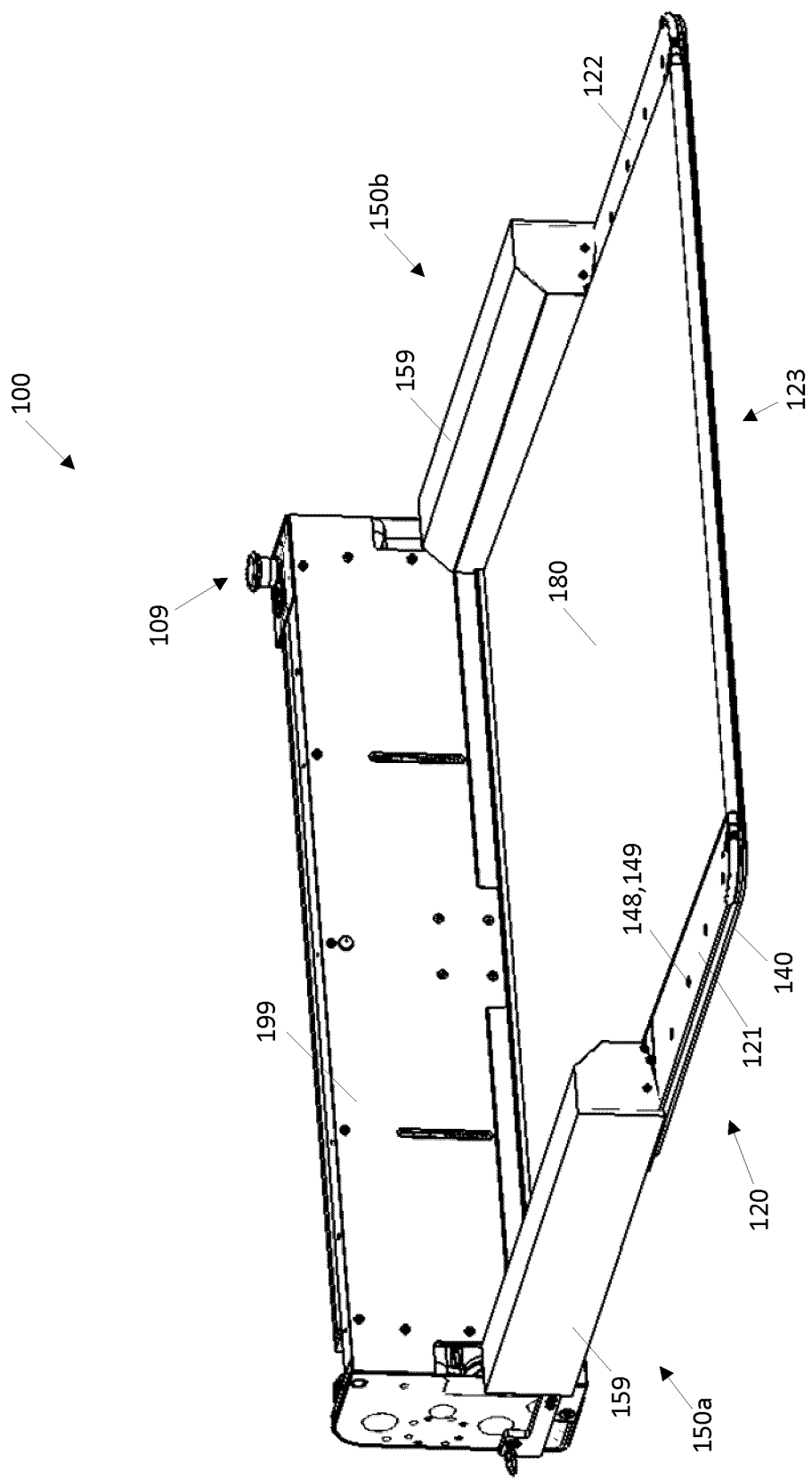
FIG. 1 is a perspective view of an extendible transfer platform in accordance with one embodiment, with a moveable plate in an extended position.

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

While the apparatus and methods disclosed herein are described specifically in relation to and in use with transferring a human body (e.g. an individual with reduced, limited, or no mobility, an able bodied individual, an unconscious individual, an incapacitated individual, etc.), it will be appreciated that the apparatus and methods may alternatively be used to transfer other objects, such as those that may be bulky, cumbersome, delicate, and/or difficult to grasp. For example, the apparatus and methods disclosed herein may be suited and/or adapted for use to transfer livestock or domestic animals, undomesticated animals (e.g. in a zoo or wildlife care facility), human corpses (e.g. in a funeral home of a mortuary), inanimate objects (e.g. in courier, cargo, and/or logistical operations), and the like.

FIGS. 1 to 6 illustrate an example embodiment of an extendable transfer platform, referred to generally as 100. Transfer platform 100 includes a fixed plate 110, a moveable plate 120, and at least one platform actuator 150 to selectively move the moveable plate relative to the fixed plate between a retracted position (e.g. FIG. 4) and an extended position (e.g. FIG. 3). Transfer platform 100 also includes a transfer belt 180 that overlies both the fixed plate and the moveable plate.

In use, the moveable plate may be extended to a position underneath an object to be transferred (e.g. a human body)—i.e. between the object and a surface on which the object is supported—and then retracted with the object supported on the transfer belt so that the object is positioned above both the fixed plate and the moveable plate. Additionally, or alternatively, the moveable plate may be extended to transfer an object positioned on the transfer platform (i.e. supported on the transfer belt) onto to a remote surface.

As illustrated in FIGS. 1 to 4, moveable plate 120 is positioned below and generally parallel to fixed plate 110. This arrangement may have one or more advantages. For example, by positioning the moveable plate below the fixed plate, this may allow the moveable plate to be positioned closer to a surface an object is resting on (e.g. a floor surface), which may reduce the magnitude of any vertical displacement of the object as the moveable plate is extended underneath the object. Additionally, or alternatively, this arrangement may facilitate a guard layer being positioned below the transfer belt to inhibit or prevent contact between the transfer belt and the surface on which the object being transferred to or from using the transfer platform.

Figure 2:
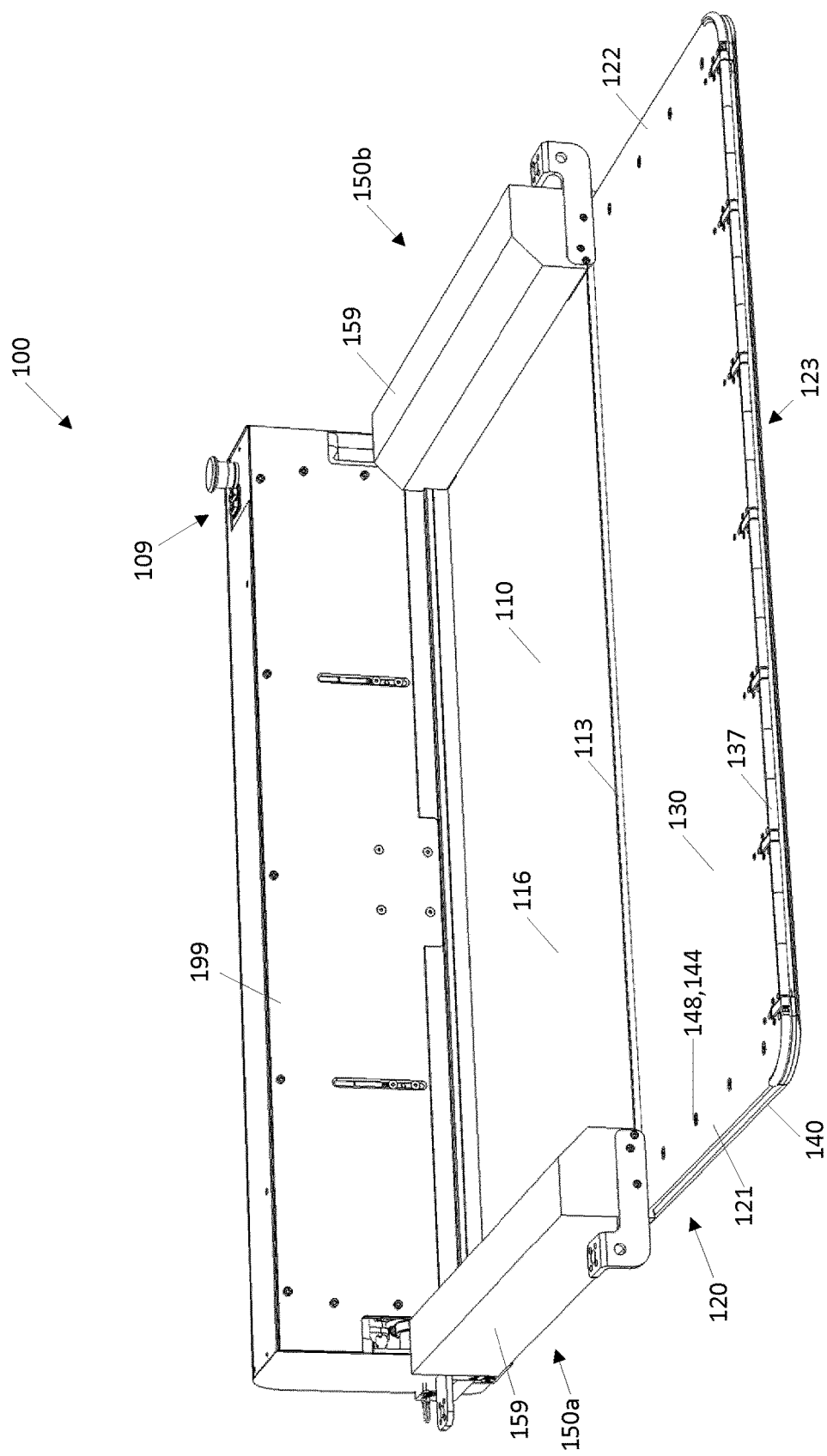
FIG. 2 is a perspective view of an extendible transfer platform in accordance with one embodiment, with a moveable plate in an extended position, and with a transfer belt omitted for clarity.
Figure 3:
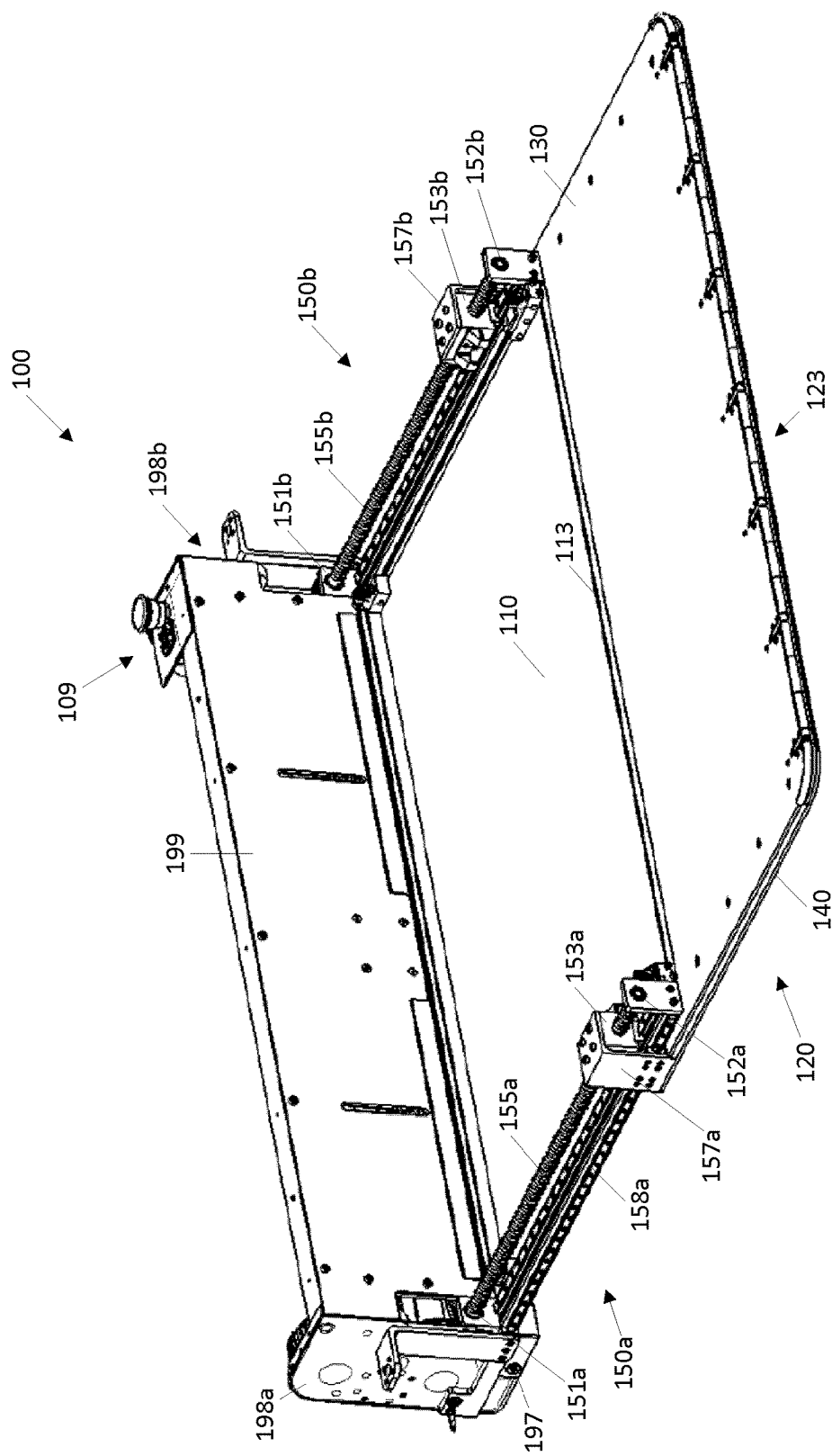
FIG. 3 is another perspective view of the extendible transfer platform of FIG. 2, with platform actuator and driven roller covers omitted for clarity.
Figure 4:
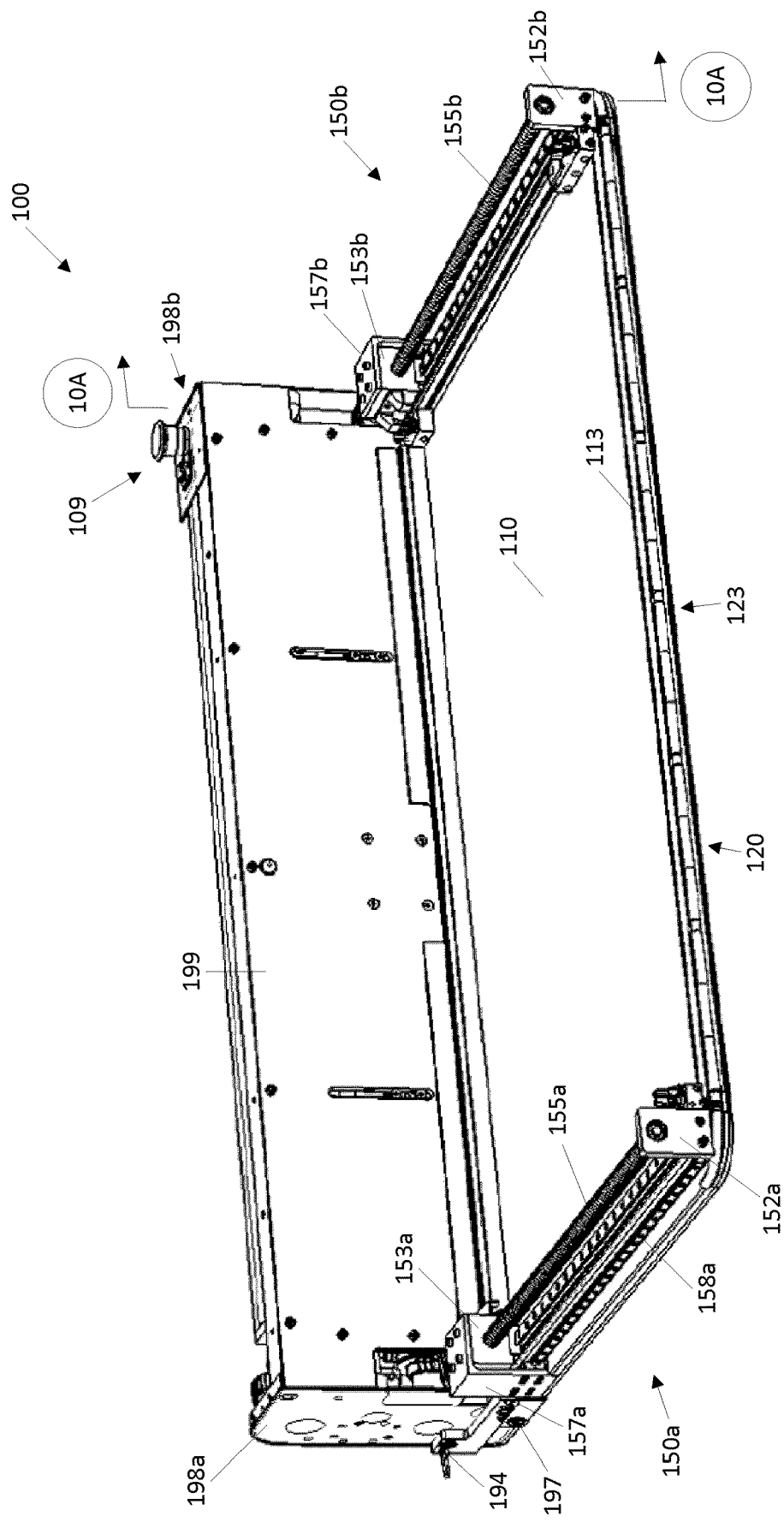
FIG. 4 is a perspective view of the extendible transfer platform of FIG. 3, with the moveable plate in a retracted position.

Referring to FIGS. 3 to 6, in the illustrated example, moveable plate 120 is coupled to linear actuators 150 located at a first end 121 and at a second end 122 of moveable plate 120. Optionally, as shown in FIGS. 1 and 2, actuator guards 159 that cover all or substantially all of actuators 150 may be provided to inhibit or prevent contact between the actuators and a human being transported and/or an operator of the transfer platform 100.

In the illustrated example, linear actuators 150 each include a threaded shaft 155 rollingly supported at first and second ends of the actuator frame by bearings 151, 152, respectively. A ballscrew 153 is mounted on shaft 155. Ballscrew 153 may be translated between the first and second ends of the actuator frame by rotating threaded shaft 155; rotating shaft 155 in one direction advances ballscrew 153 towards the first end, and rotating shaft 155 in the other direction advances ballscrew 153 towards the second end.

Each ballscrew 153 is secured to a sled 157, so that translation of the ballscrew 153 results in translation of the sled 157. Each sled 157 is mounted to a guide rail 158, and also to an end of moveable plate 120, so that translation of the ballscrews results in translation of the moveable plate.

Figure 5:
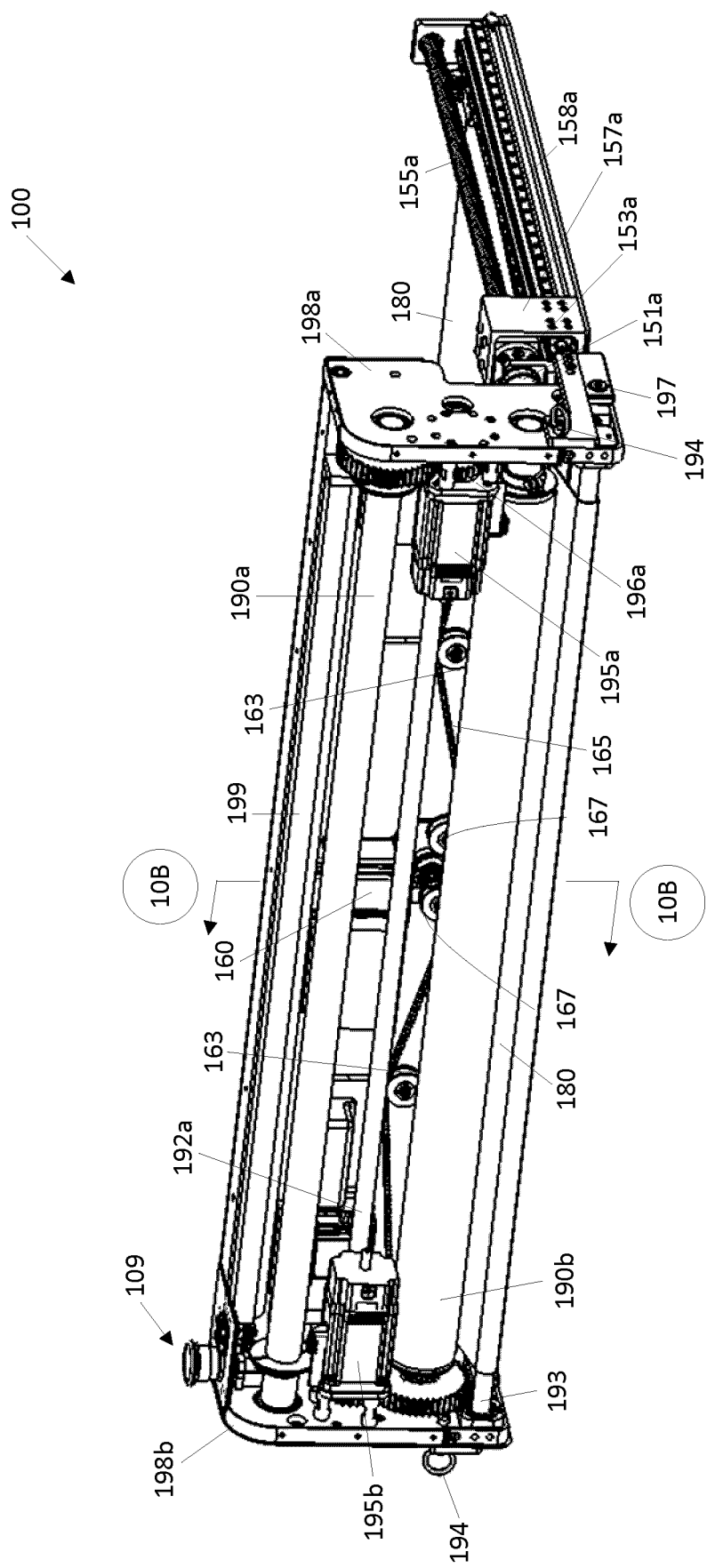
FIG. 5 is a rear perspective view of the extendible transfer platform of FIG. 3, with a transfer belt.
Figure 6:
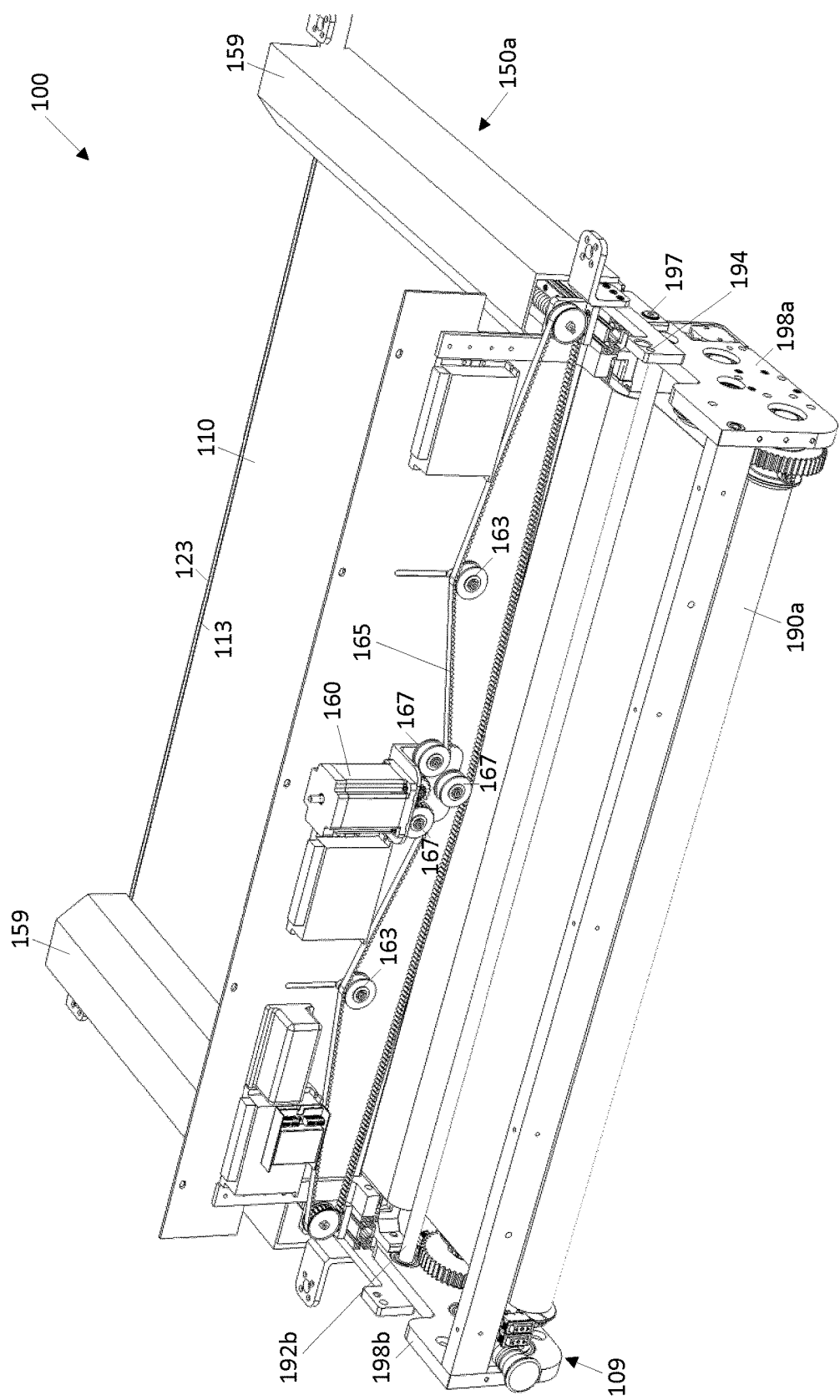
FIG. 6 is a rear perspective view of the extendible transfer platform of FIG. 1, with the driven rollers in a service position.

Referring to FIGS. 5 and 6, in the illustrated example threaded shafts 155*a*, 155*b* are mechanically coupled to each other via a timing belt 165. Timing belt 165 is also coupled to platform motor 160. Accordingly, rotation of motor 160 will urge the moveable plate to translate relative to fixed plate 110 in a direction parallel to shafts 155a, 155b. This arrangement allows both ball screws to be extended and contracted in unison with a single motor 160.

In the illustrated example, timing belt 165 is also operatively coupled to two tensioners 163, and three idlers 167. It will be appreciated that fewer, more, or no tensioners 163 and/or idlers 167 may be provided in alternative embodiments.

Optionally, tensioners 163 may be provided with one or more force and/or position sensors, the output of which may be used to measure and/or imply tension of transfer belt 180.

In the illustrated example, platform motor 160 is a stepper motor, but it will be appreciated that other motors (e.g. a DC motor, a brushless DC motor (BLDC)), or a fluid driven actuator (e.g. a pneumatic rotary motor) may be used in variant embodiments. Also, while a pair of actuators 150a, 150b are shown, it will be appreciated that more of fewer actuators may be used in variant embodiments.

Figure 11A:
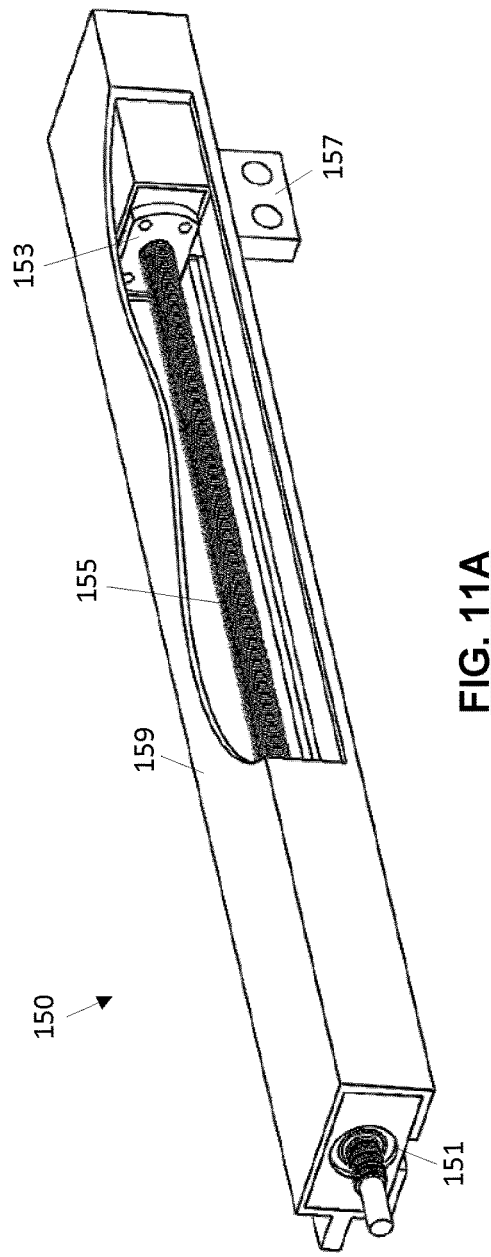
FIG. 11A is a perspective view of a linear actuator for an extendible transfer platform, in accordance with at least one other embodiment, with a portion of an actuator guard omitted for clarity.
Figure 11B:
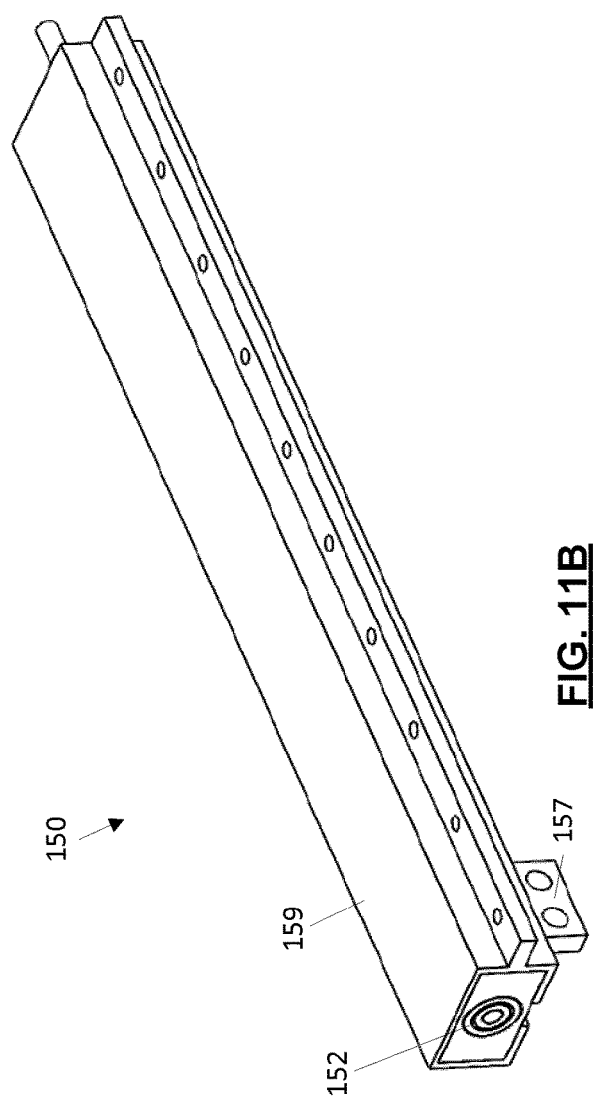
FIG. 11B is another perspective view of the linear actuator of FIG. 11A.
Figure 12:
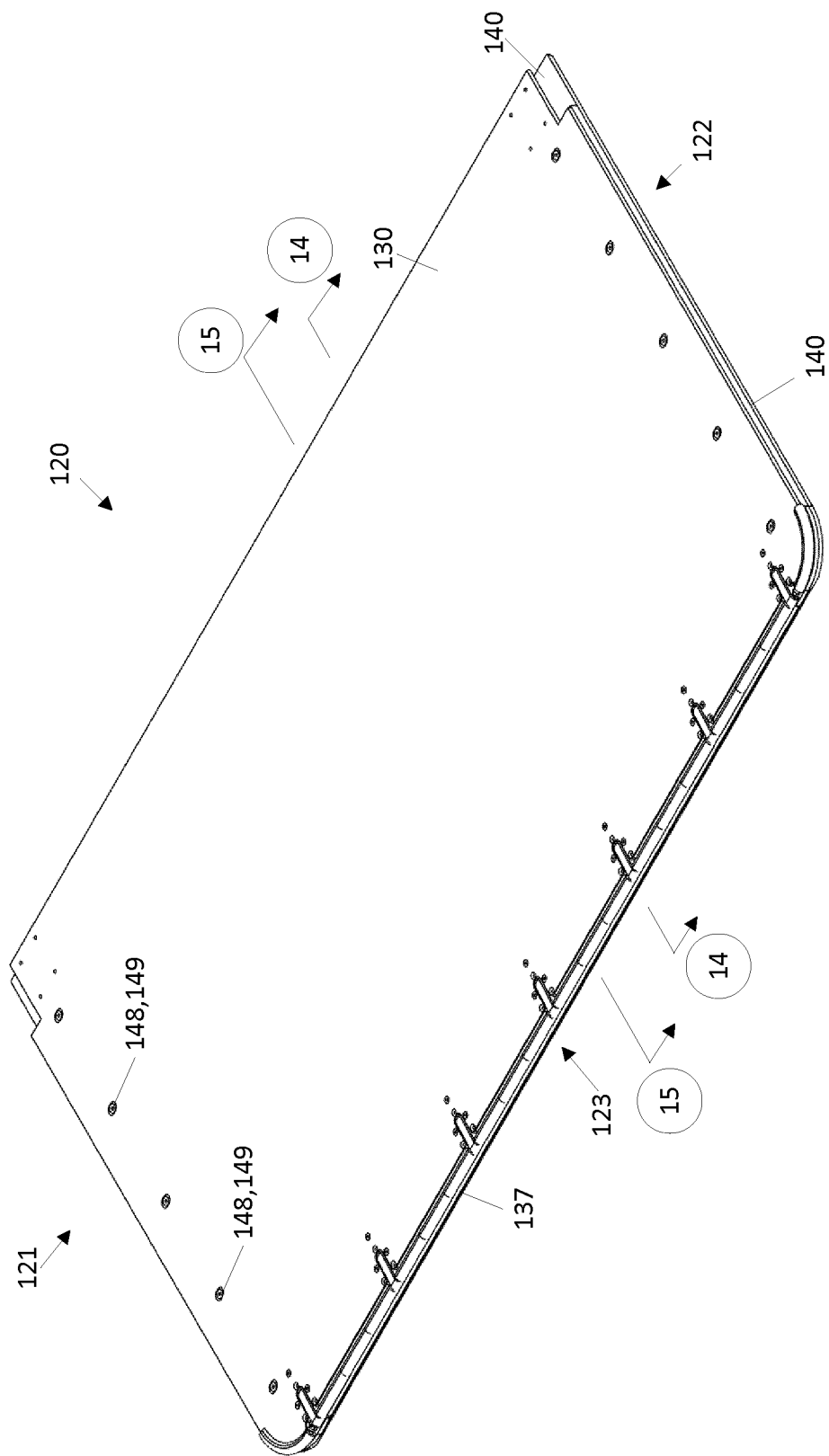
FIG. 12 is a perspective view of a moveable plate, in accordance with one embodiment.
Figure 13:
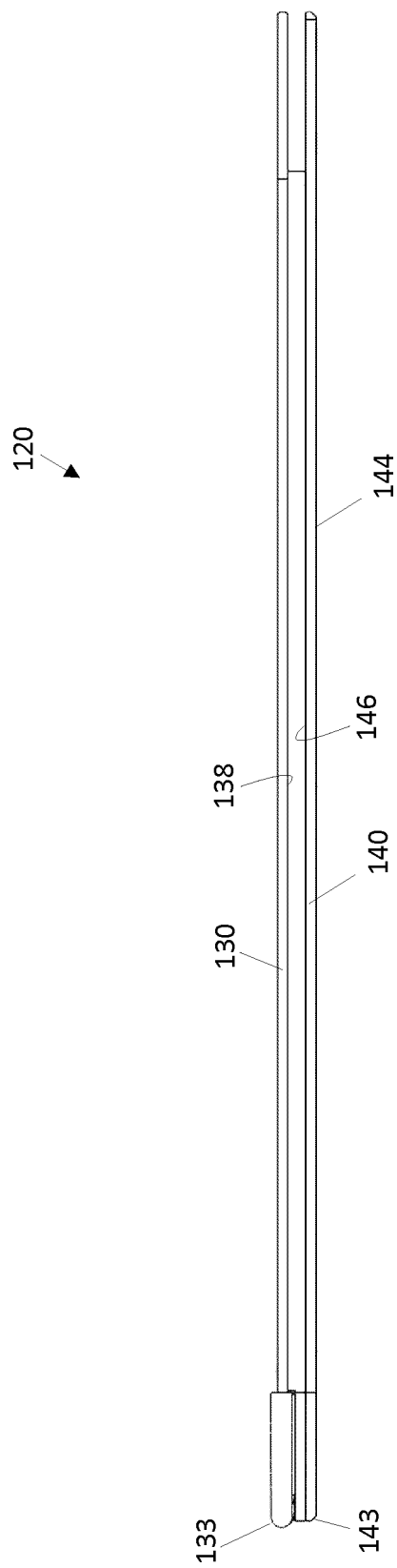
FIG. 13 is a side elevation view of the moveable plate of FIG. 12.
Figure 14:
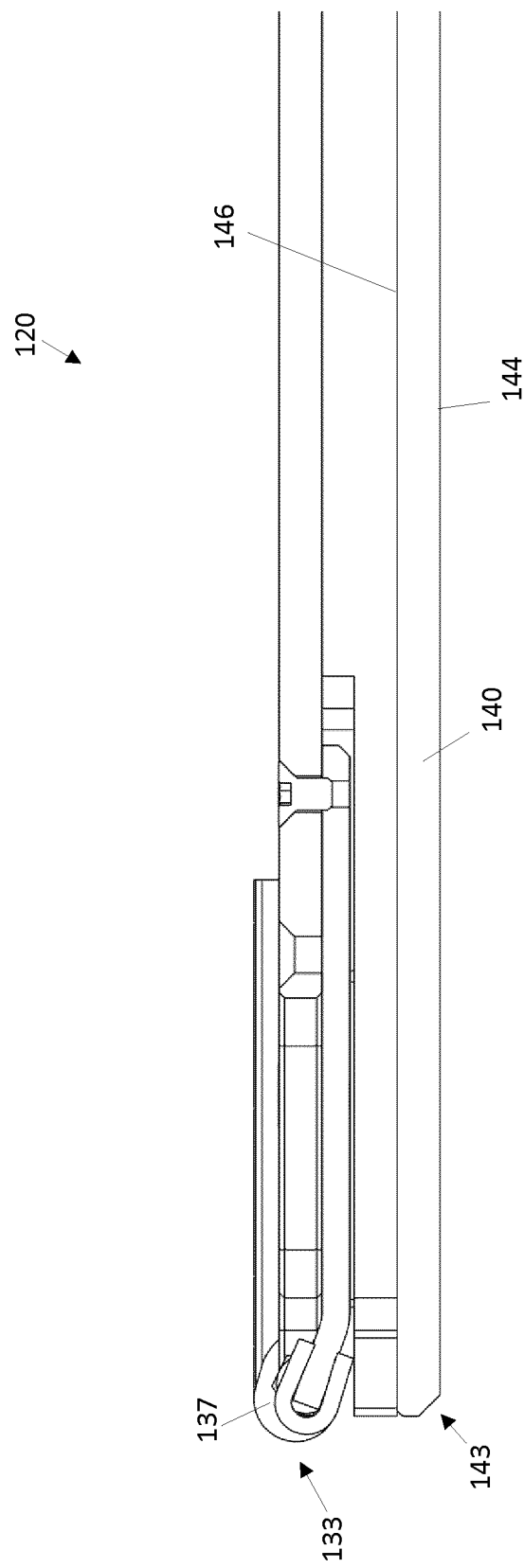
FIG. 14 is a section view of a leading edge of the moveable plate of FIG. 12, taken along line 14-14 in FIG. 12.
Figure 15:
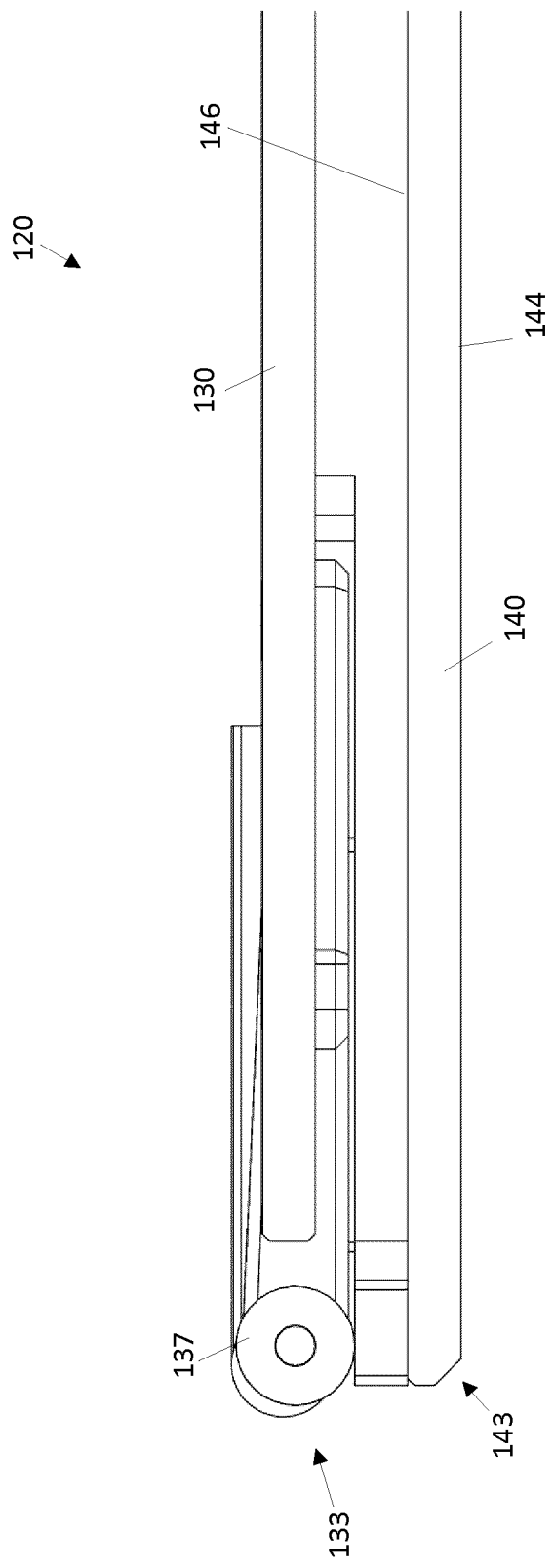
FIG. 15 is a section view of a leading edge of the moveable plate of FIG. 12, taken along line 15-15 in FIG. 12.

FIGS. 11A and 11B illustrate another example configuration of a ballscrew-type linear actuator 150. In this embodiment, the ballscrew and its supporting structure have been integrated to provide an actuator that may have reduced weight, simplified mechanical mounting, and/or a reduced overall width. This configuration may have one or more advantages. For example, the improved mounting approach may reduce the bending moment and/or loading on the screw itself. Also, the mounting surface being placed on the underside of the ball screw assembly may allow for more direct, uniform and extensive mounting of the lower plates and plate assemblies.

In the illustrated example, moveable plate 120 comprises an upper moveable plate 130 and a guard layer in the form of a guard plate 140 positioned below the upper moveable plate. In the illustrated example, upper moveable plate 130 and guard plate 140 are secured to each other using a plurality of screws 148 inserted through bores 149. Alternatively, or additionally, upper moveable plate 130 and a guard plate 140 may be secured to each other using an adhesive, one or more welds, or other suitable methods. In some embodiments, upper moveable plate 130 and a guard plate 140 may be integrally formed.

Movable plate 120 may be made from any suitable material or materials, including composite materials. For example, upper movable plate 130 may be made from an aluminum alloy, and guard plate 140 may be made from a carbon fiber composite material.

Figure 54:
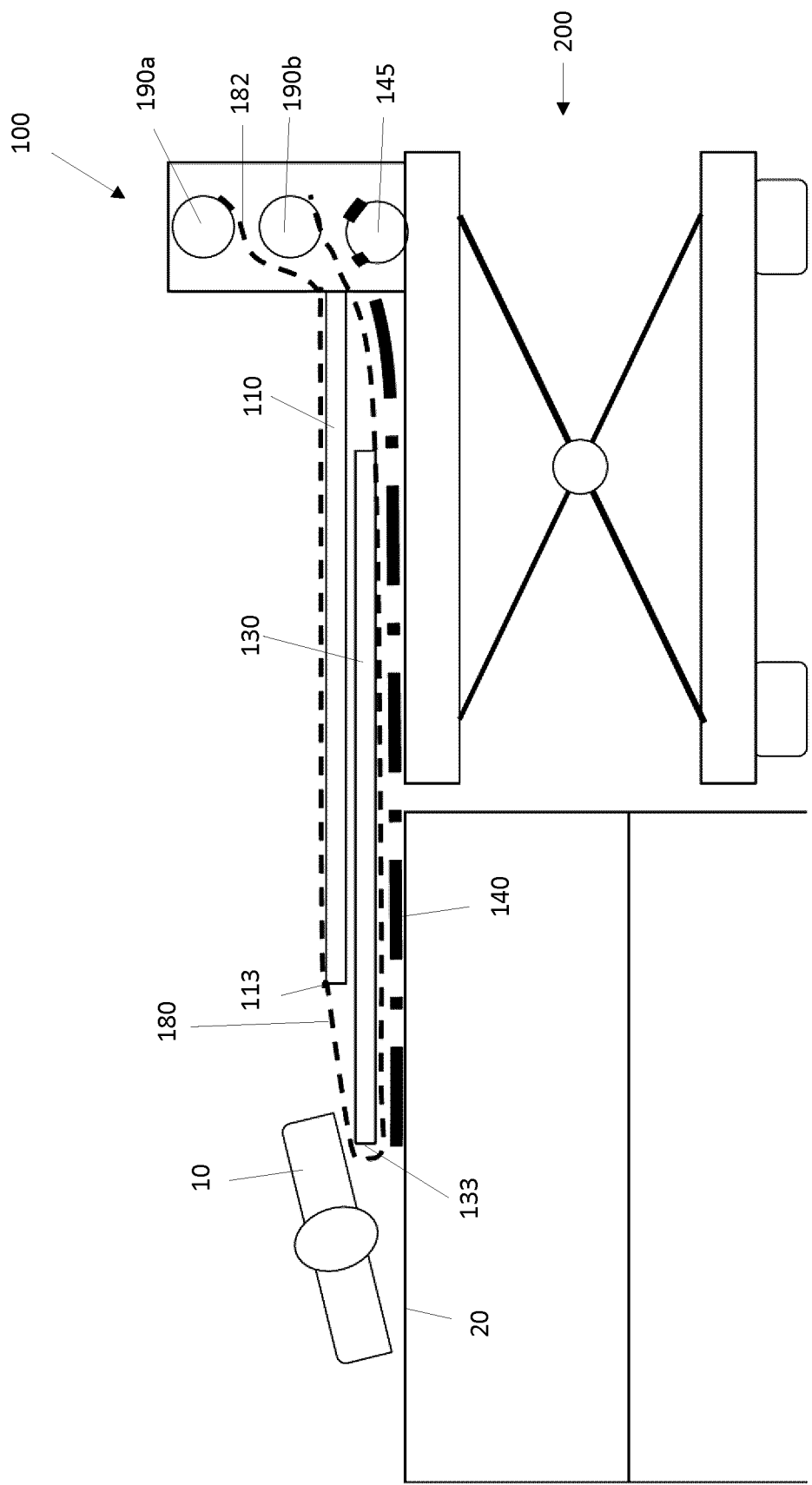
FIG. 54 is a schematic elevation view illustrating an extendible transfer platform with a flexible guard layer being used to transfer a human from a bed onto the transfer platform.

Optionally, instead of a rigid guard plate 140, a flexible guard layer 140 may be provided below the transfer belt to inhibit or prevent contact between the transfer belt and the surface on which the object being transferred to or from using the transfer platform. For example, as illustrated in FIG. 54, guard layer 140 may be formed from a textile and/or flexible material with a first end is secured to moveable plate 130 proximate leading edge 133, and a second end secured to a roller 145, which may be actively driven and/or spring-biased to take up guard layer 140 as moveable plate 130 moves towards a retracted position. Optionally, flexible guard layer 140 may be formed from a low-friction material, e.g. Polytetrafluoroethylene (PTFE), Polyam ides, Graphite, Acetol, Ultra High Molecular Weight Polyethylene (UHMW PE), and the like.

Figure 31:
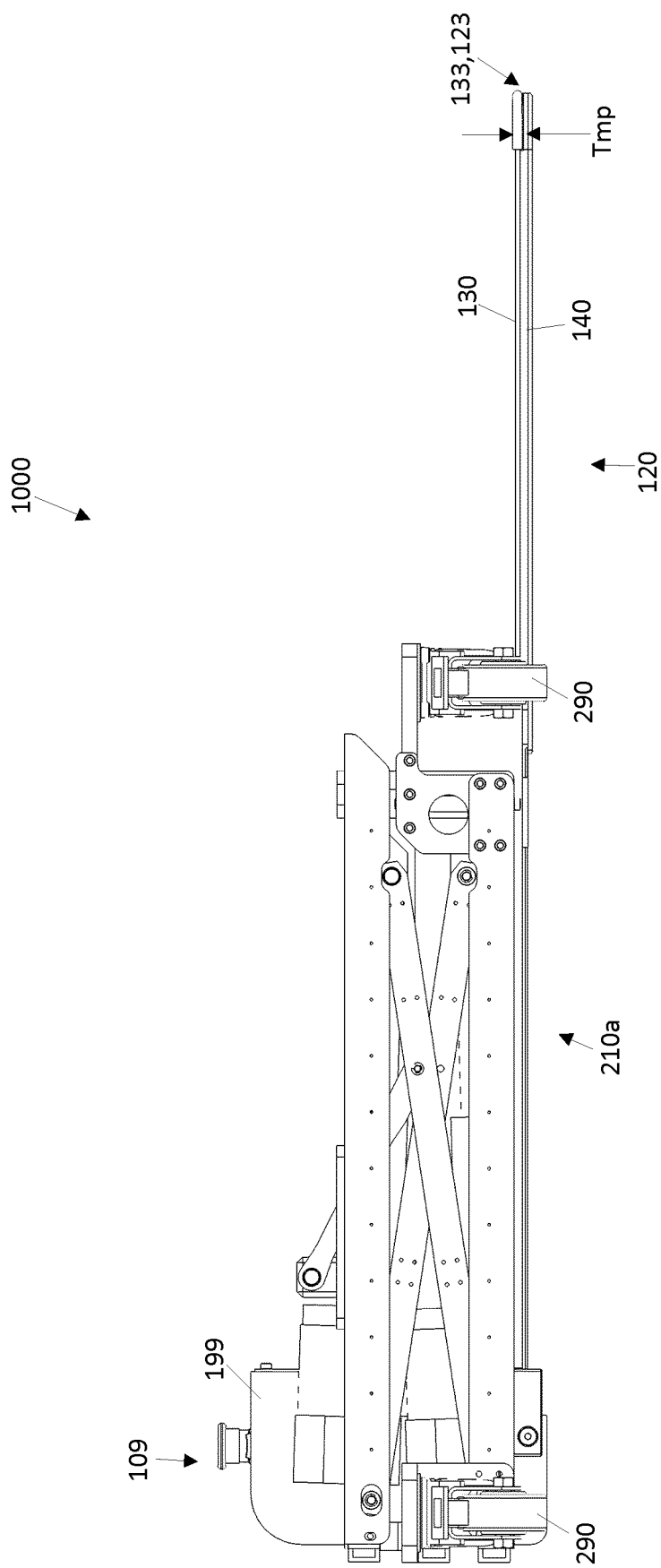
FIG. 31 is a side elevation view of the transfer device of FIG. 30.
Figure 32:
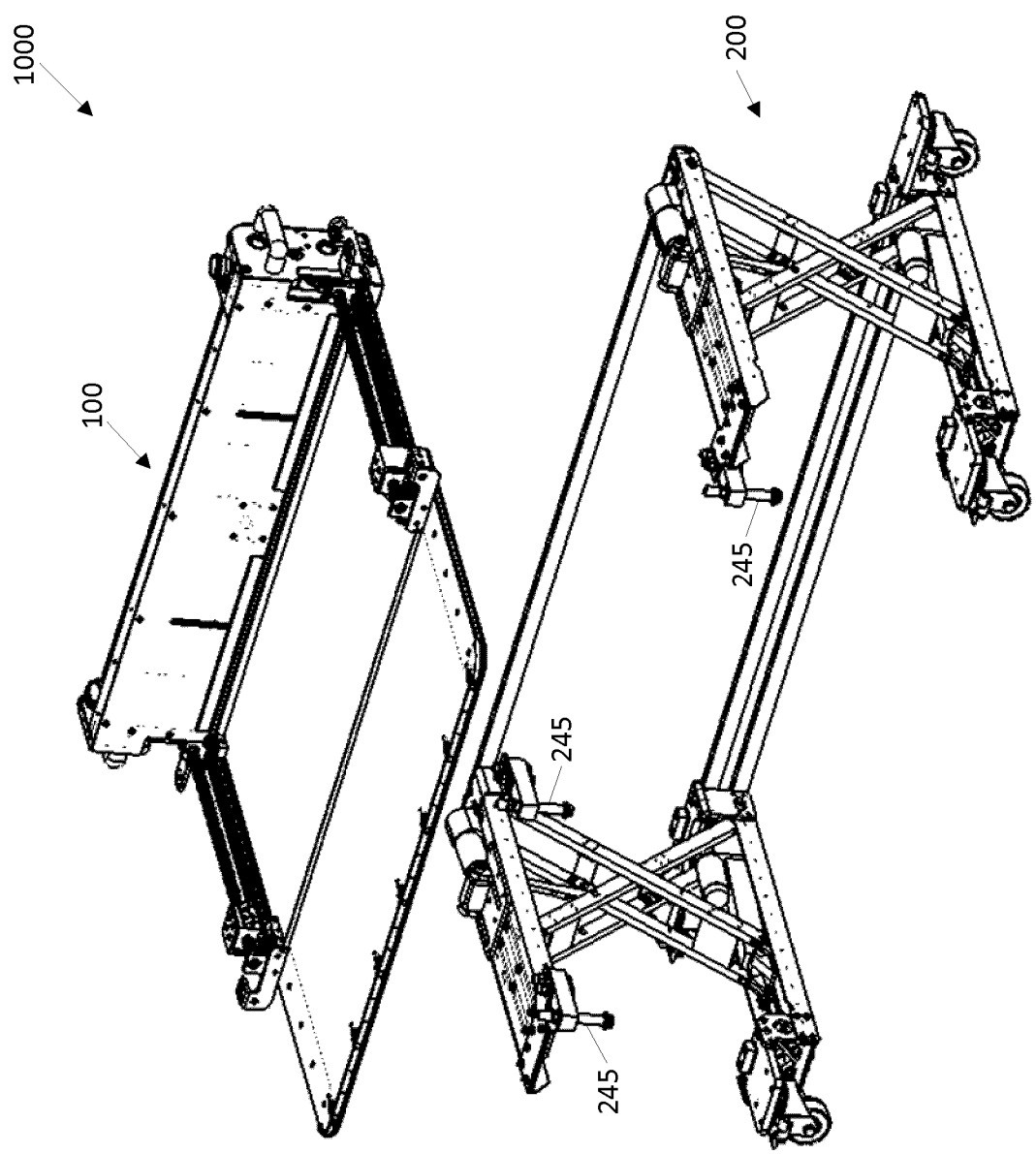
FIG. 32 is a partially exploded perspective view of a transfer device in accordance with one embodiment.
Figure 33:
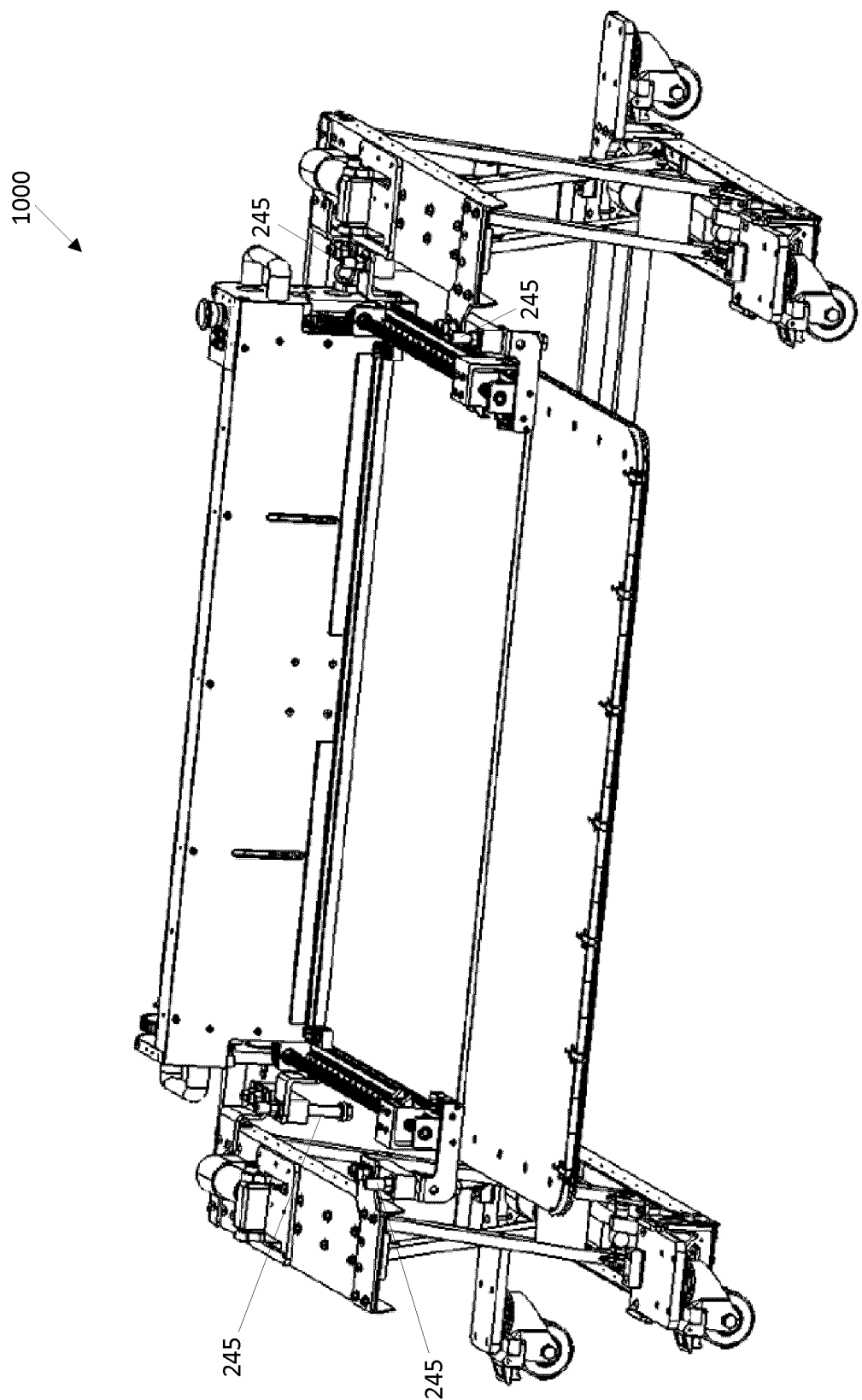
FIG. 33 is a perspective view of the transfer device of FIG. 32.

Preferably, the overall height (i.e. thickness) of moveable plate 120 (e.g. the combined thickness $T_{mp}$ (see FIG. 31) of upper moveable plate 130 and guard layer 140) is less than about 100 mm, or less than about 50 mm. For example, the illustrated embodiments of moveable plate 120 lack a lower, secondary conveyor belt system (e.g. as is provided in some known designs), allowing the overall height of movable plate to be relatively small (e.g. when compared to known designs with secondary conveyors).

Providing a moveable plate 120 with a relatively thin profile may have one or more advantages. For example, a relatively thin moveable plate may be extended between a human body and the surface it is resting on with relatively little disturbance of and/or discomfort to the human. This is due to lower required transfer forces, and/or lower angles of approach to the object, each of which may reduce or preferably minimize the perturbance of an object, or may reduce or preferably discomfort in the case of a live object (e.g. a human) being transferred. In particular, a relatively thin moveable plate may facilitate and/or improve the transfer platform's ability to transfer a human from a floor surface.

Optionally, moveable plate 120 may include a plurality of articulated plate segments. In the examples illustrated in FIGS. 43 to 47, movable plate 120 includes articulated plate segments 120a, 120b, 120c, 120d, and 120e. As a result, articulated movable plate 120 may be deformed into a curved position when in an extended position.

In some embodiments, articulated moveable plate 120 may be passively deformable into a non-planar (e.g. curved) position, e.g. in response to an external force, such as the weight of an object being transported. Additionally, or alternatively, articulated moveable plate 120 may be actively deformable into a predetermined curvature, e.g. in response to a signal from the control system. For example, deformation via the control system may be imposed by applying energy to one or more electromechanical actuators or displacement devices that are mounted proximate or across hinge points of the articulated plate segments. As another example, deformation via the control system may be imposed by retracting and/or extending cables embedded within the articulated plate segments.

Providing an articulated movable plate 120 may have one or more advantages. For example, an articulated movable plate may be better able to navigate the contours of and/or conform to a non-planar structure that the object to be transferred may be supported on. For example, if the object to be transferred is resting on a curved surface (e.g. a padded table or a mattress), interposing an articulated moveable plate 120 between the object and the surface may require less force and/or generate less friction than interposing a non-articulated moveable plate 120.

Optionally, moveable plate 120 may include a plurality of telescopic plate segments. In the examples illustrated in FIGS. 48 to 52, movable plate 120 includes telescopic plate segments 120' and 120". As a result, a leading edge 123" of telescopic plate segment 120" may be extended further outwardly relative to fixed plate 110 than a leading edge of a non-telescopic plate.

In the illustrated example, telescopic plate segment 120" is nested between telescopic plate segment 120' when in a retracted position. Alternatively, the telescopic plate segments may be arranged in a stacked configuration, e.g. with telescopic plate segment 120" positioned below telescopic plate segment 120' when in a retracted position.

Providing a telescopic movable plate 120 may have one or more advantages. For example, a telescopic movable plate may be able to transfer objects that are positioned further from fixed plate 110 (e.g. where it may be impractical to maneuver the transfer platform 100 to a position proximate the object to be transferred). Additionally, or alternatively, providing a telescopic movable plate may facilitate providing a transfer platform 100 with a more compact overall form factor, which may assist in storage and/or maneuverability.

As illustrated in FIGS. 1, 5, 6, 10B, 23, and 34A-35D, transfer platform 100 includes a transfer belt 180. In the illustrated example, transfer belt 180 has a fixed length. A first end 181 of transfer belt 180 is secured to a first driven roller 190a, and a second end 182 of transfer belt 180 is secured to a second driven roller 190b. Accordingly, transfer belt 180 may be characterized as a discontinuous belt.

Utilizing a discontinuous transfer belt 180 may have one or more advantages. For example, this may facilitate the removal and/or replacement of transfer belt 180 (e.g. by removing a driven roller with the transfer belt attached). This may result a transfer platform 100 that is characterized as being relatively easy to clean and/or maintain, which may result in reduced downtime. This may be of particular importance in use cases where cross-contamination is of concern (e.g. in hospitals, care homes, etc.).

Additionally, or alternatively, using a discontinuous belt with driven rollers on both ends may also have a mechanical advantage, in that the transfer belt's tension can be controlled from both ends of the belt. For example, this may assist in providing a desired tension level, and/or a desired level of 'slack' (or a lack thereof) in transfer belt 180.

In the illustrated example, transfer belt 180 is guided around two passive (i.e. non-driven) rollers 192a and 192b positioned within housing 199 to avoid potentially damaging interactions with other components located within the housing 199 (e.g. control systems, motors and motor drivers, gears, and the like). It will be appreciated that fewer, more, or no passive rollers 192 may be provided in alternative embodiments.

As shown in FIGS. 1, 5, and 6, transfer belt 180 extends along the upper surface 116 of fixed plate 110, over leading edge 113 of fixed plate 110, and around leading edge 133 of upper moveable plate 130. Transfer belt 180 then passes between a bottom surface 138 of upper moveable plate 130 and an upper surface 146 of the guard plate 140. From there, transfer belt passes around tensioner 193 and terminates at the second driven roller 190b.

In the illustrated example, tensioner 193 is passively sprung. Alternatively, tensioner 193 may be actively actuated, e.g. by providing a linear actuator instead of, or in addition to, one or more passive springs. Additionally, or alternatively, tensioner 193 may be actively dampened, e.g. using ferro-dampening fluids or the like. In some embodiments, the relative position of transfer belt tensioner 193 may be determined by a positioning sensor (not shown) such as a Time of Flight (TOF) or linear potentiometer, for example. This determined tensioner position may be used e.g. by a control system to measure and/or infer tension within transfer belt 180.

As shown in FIGS. 5 and 6, each driven roller 190a, 190b is driven using a corresponding stepper motor 195 coupled to a single stage gear reduction set 196. Optionally, gear set 196 may utilize one or more polymer gears in order to reduce or avoid the need for lubrication, and/or to reduce noise output. It will be appreciated that other motors (e.g. DC or AC motors, brushless DC (BLDC) motors, pneumatic rotary motors, direct electrical motors, and the like) may be used in one or more variant embodiments. Additionally, or alternatively, other gearing (e.g. two or more stages, planetary gearing) may be used.

With continued reference to FIGS. 5 and 6, in the illustrated embodiment end plates 198a, 198b of housing 199 may be pivoted from an in-use position (e.g. as shown in FIG. 5) to a servicing position (e.g. as shown in FIG. 6). In the illustrated example, the end plates pivot about pivot pins 197, and quick release pins 194 are provided to selectively retain the end plates in the in-use position. An advantage of this design is that, in the servicing position, most or all of timing belt 165 may be more easily accessed, e.g. to adjust its tension and/or adjust, service, and/or replace motor 160, tensioners 163, and idlers 167. This configuration may also increase the accessibility of the driven rollers 190a, 190b, and/or passive rollers 192a, 192b. This configuration may also increase the accessibility of one or more sensors and/or control systems positioned within housing 199.

Another advantage of the illustrated design is that the transfer belt drive rollers and tensioners may be removed relatively easily (e.g. by decoupling quick release pins 194 and pivoting end plates 198a, 198b about pivot pins 197, and then removing the transfer belt drive rollers and/or tensioners. This may reduce the time and/or cost required for maintenance and cleaning.

Figure 9:
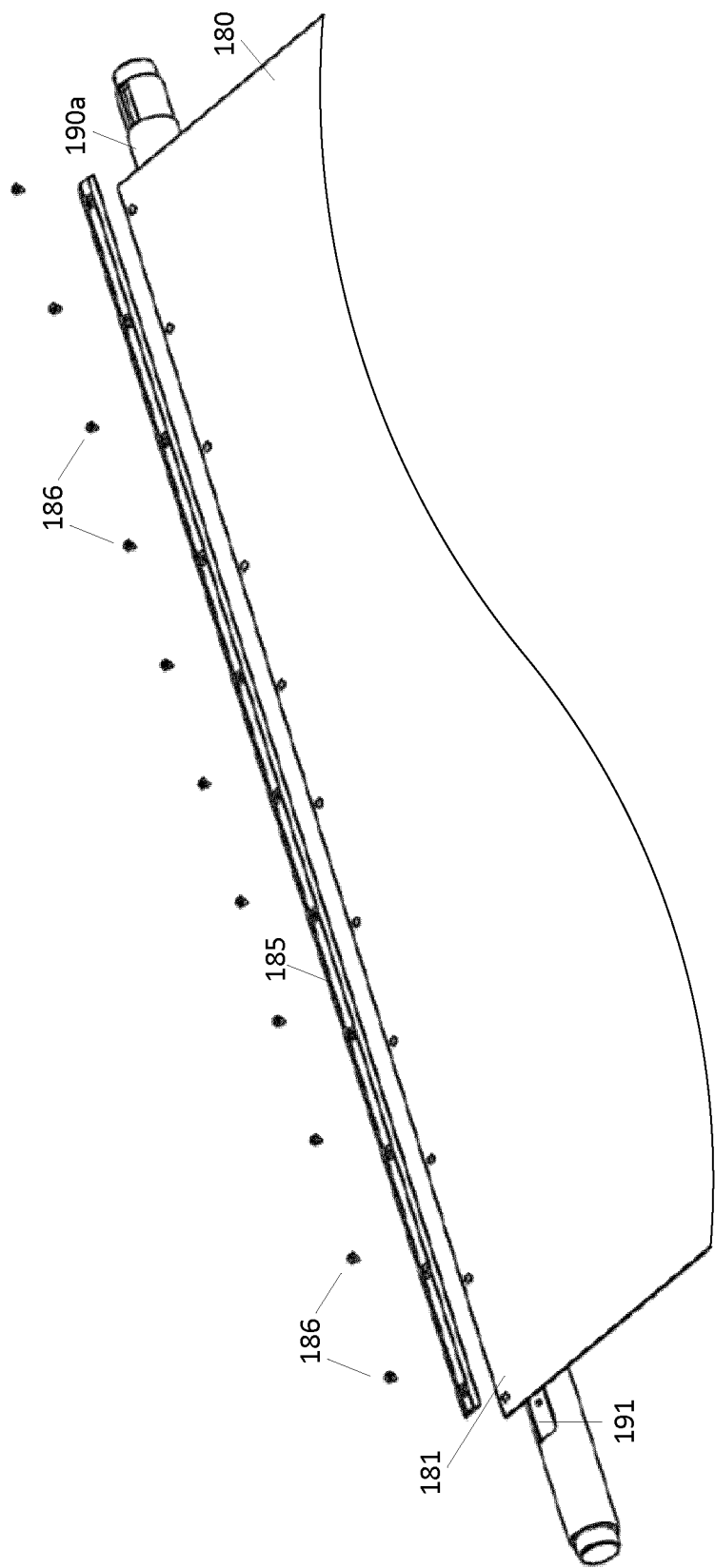
FIG. 9 is an exploded perspective view of an end of a transfer belt secured to the driven roller of FIG. 7, in accordance with one embodiment.
Figure 10A:
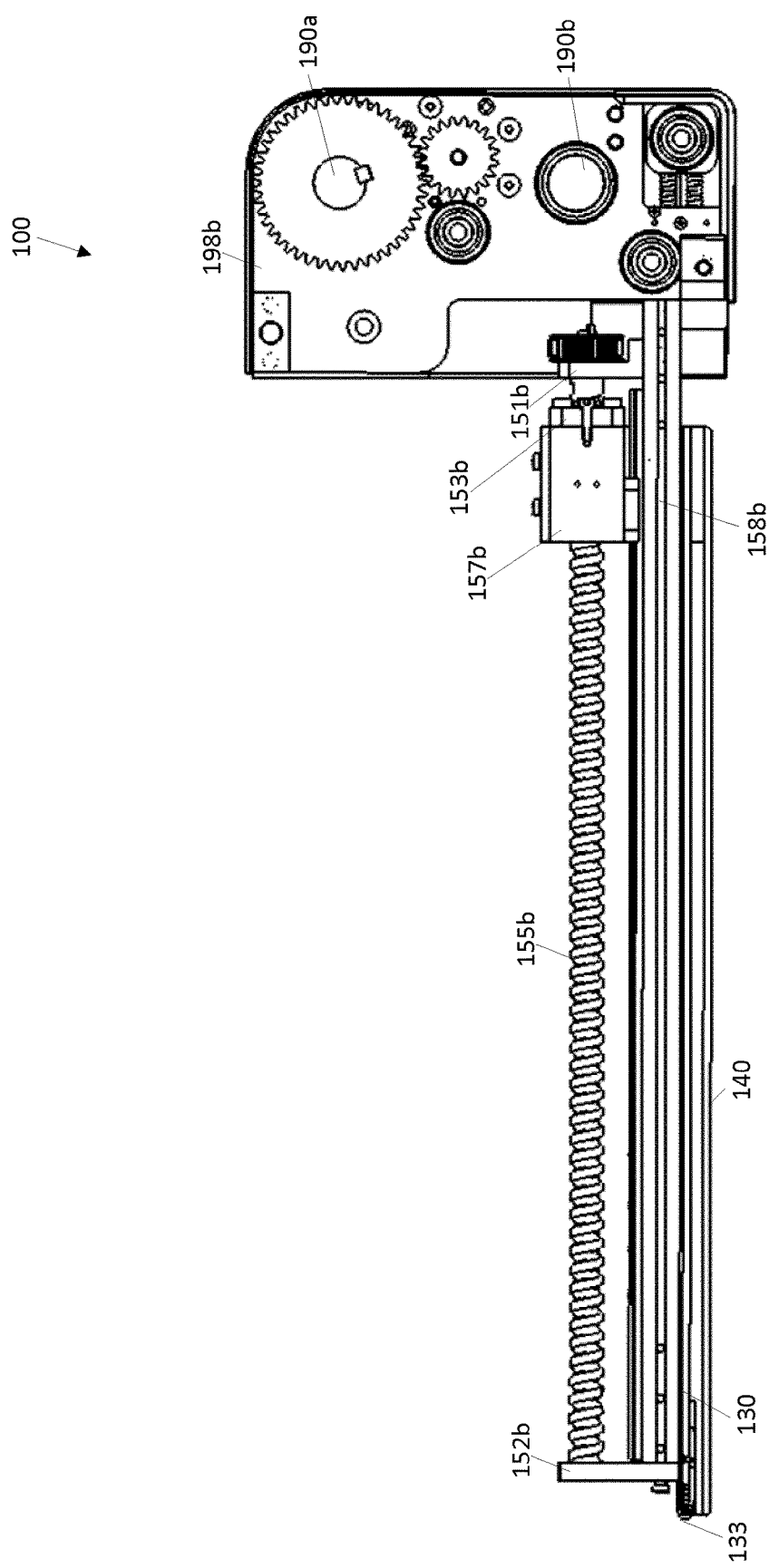
FIG. 10A is a section view of the extendible transfer platform of FIG. 3, taken along line 10A-10A in FIG. 4.
Figure 10B:
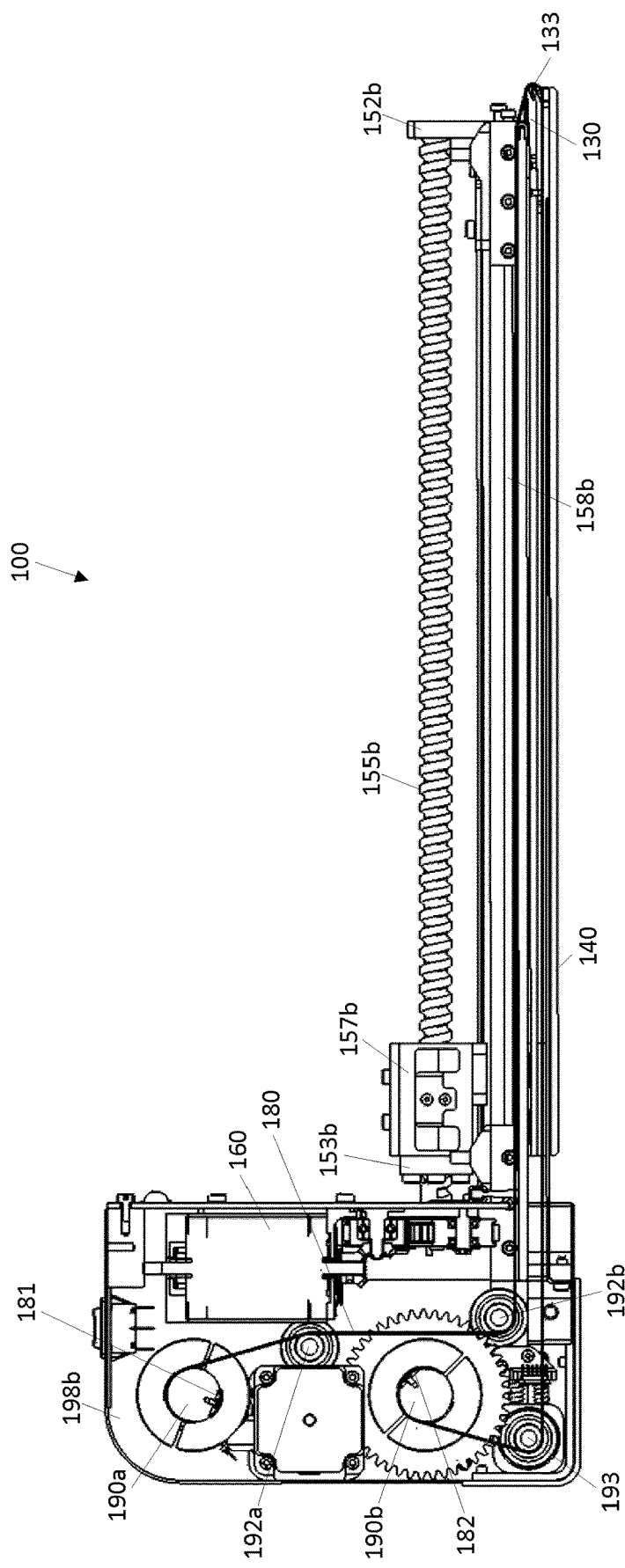
FIG. 10B is a section view of the extendible transfer platform of FIG. 5, taken along line 10B-10B in FIG. 5.

Optionally, transfer belt 180 may be secured to one or both driven rollers 190a, 190b in a manner that allows the belt 180 to be removed, replaced, and/or adjusted quickly and easily. With reference to FIG. 9, driven roller 190a (or 190b) may have a flat 191 along its length, and first end 181 (or second end 182) of transfer belt 180 may be positioned between flat 191 and a belt retaining member 185 secured to the flat using mechanical fasteners 186. It will be appreciated that alternative securement methods, such as mechanical clips, screws, or sprung clamps for example, may be used in one or more variant embodiments.

Figure 7:
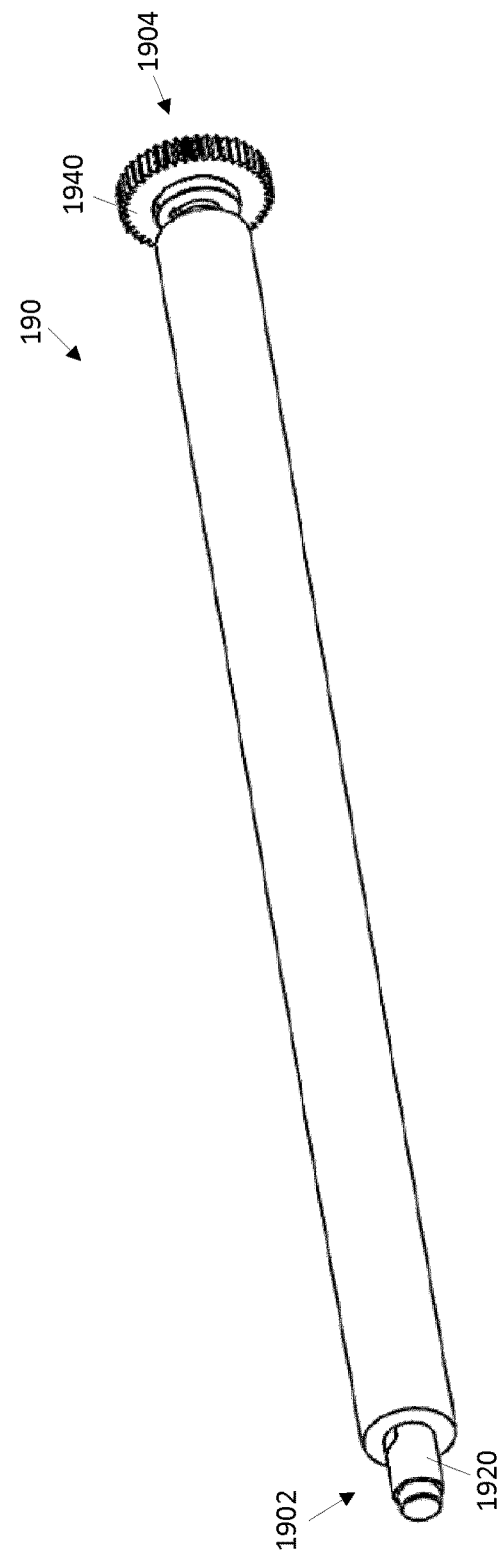
FIG. 7 is a perspective view of a driven roller in accordance with one embodiment.
Figure 8:
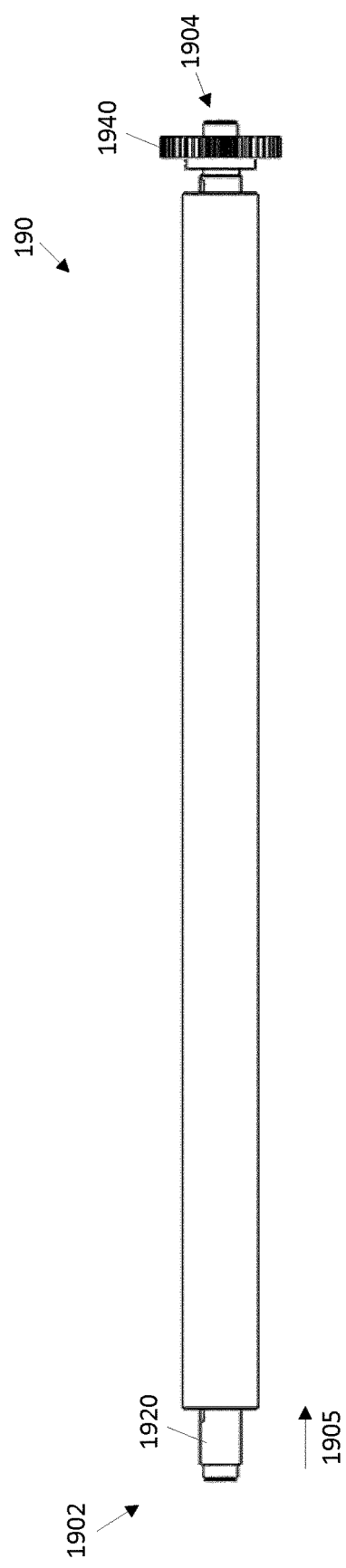
FIG. 8 is a side elevation view of the driven roller of FIG. 7.

Alternatively, the transfer platform may be designed with a cassette-based approach whereby transfer belt 180 may be removed and replaced by removing the entire drive roller with the conveyor on it. Turning to FIGS. 7 and 8, a driven roller 190 may include an engagement end 1902 that includes a spring-loaded rod 1920 that can be retracted axially (i.e. in direction 1905 in FIG. 8) into roller 190 to reduce the overall length of roller 190, and is resiliently biased into an extended position. Driven roller 190 may include an integrated gear end 1904 that includes a gear 1940 mounted in fixed relation to roller 190 and configured to engage a drive motor and/or drive belt for selectively rotating roller 190.

As discussed above, transfer belt 180 passes around leading edge 133 of upper moveable plate 130. Optionally, some or all of leading edge 133 may be provided with one or more friction-reducing features. With reference to FIGS. 12 to 15, in the illustrated example a number of rollers 137 are positioned along the leading edge 133 of upper moveable plate 130. Alternatively, or additionally, some or all surfaces proximate the leading edge 133 may be made from a low-friction material (e.g. Polytetrafluoroethylene (PTFE), Polyamides, Graphite, Acetol, Ultra High Molecular Weight Polyethylene (UHMW PE),) and/or have a low-friction coating applied thereto. Alternatively, or additionally, friction may be reduced via a controlled application of compressed air, one or more lubricants, captive ball bearings, or other suitable systems.

In some embodiments, some or all of leading edge 143 and/or a lower surface 144 of guard layer or guard plate 140 may be provided with one or more friction-reducing features. An advantage of such a configuration is that it may reduce friction between moveable plate 120 and a surface on which an object to be transferred is resting. For example, some or all of the lower surface 144 and/or the leading edge 143 may be made from a low-friction material (e.g. Polytetrafluoroethylene (PTFE), Polyamides, Graphite, Acetol, Ultra High Molecular Weight Polyethylene (UHMW PE),) and/or have a low-friction coating applied thereto. Alternatively, or additionally, friction may be reduced via a controlled application of compressed air, one or more lubricants, captive ball bearings, roller wheels, or other suitable systems.

In the illustrated examples, leading edge 123 of moveable plate 120 (e.g. leading edge 133 of upper movable plate 130) is planar, and generally uniform along its length. In one or more alternative embodiments, the leading edge 123 may not be uniform along its length. For example, some portions of the leading edge may sit higher or lower than other portions, which may allow the moveable plate to extend underneath certain portions of a human (e.g. mid-lower back, under knees) to promote a more even pressure distribution.

Figure 17:
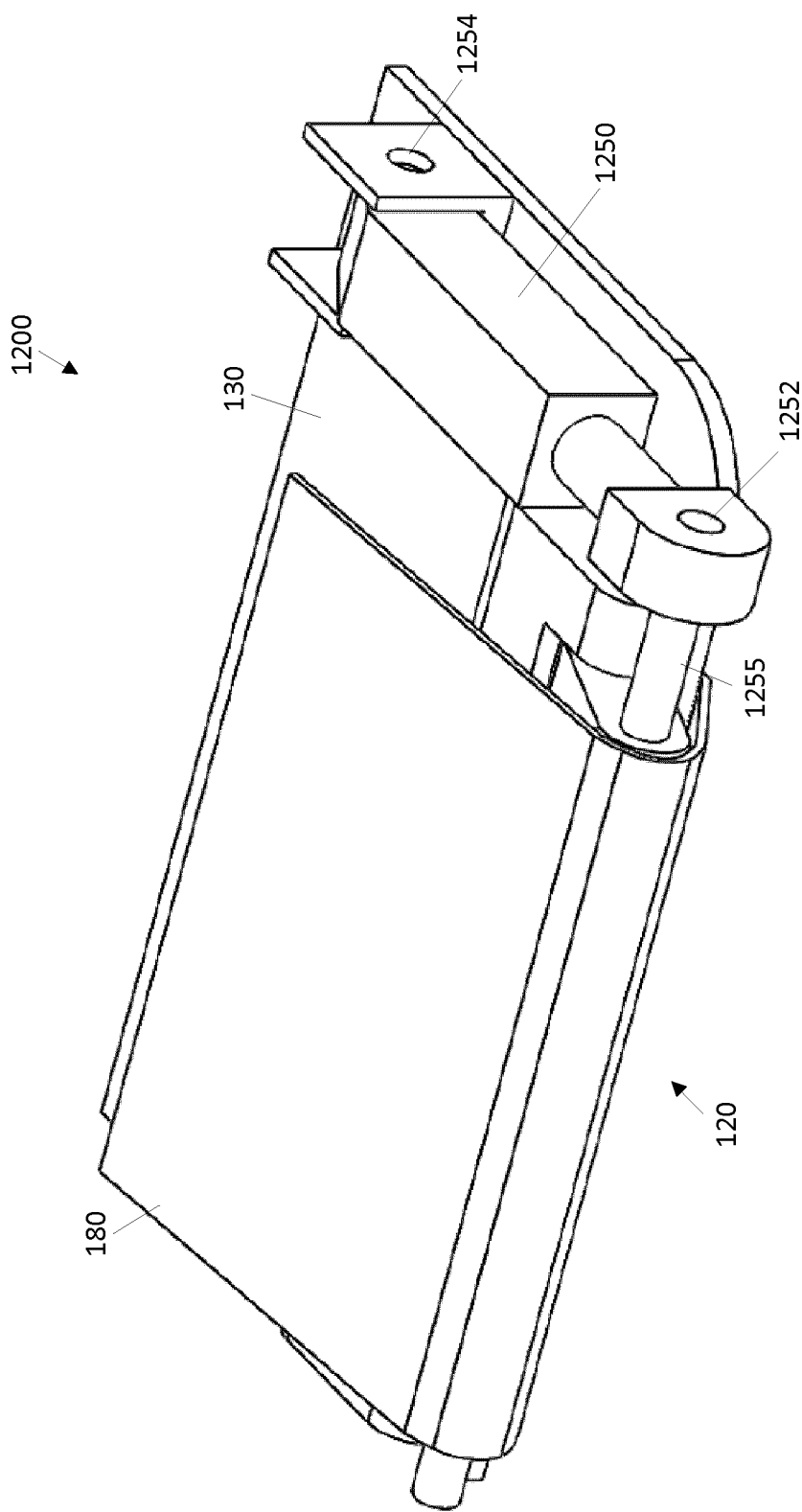
FIG. 17 is a perspective view of a configurable leading edge segment for a movable plate, in accordance with one embodiment.
Figure 18:
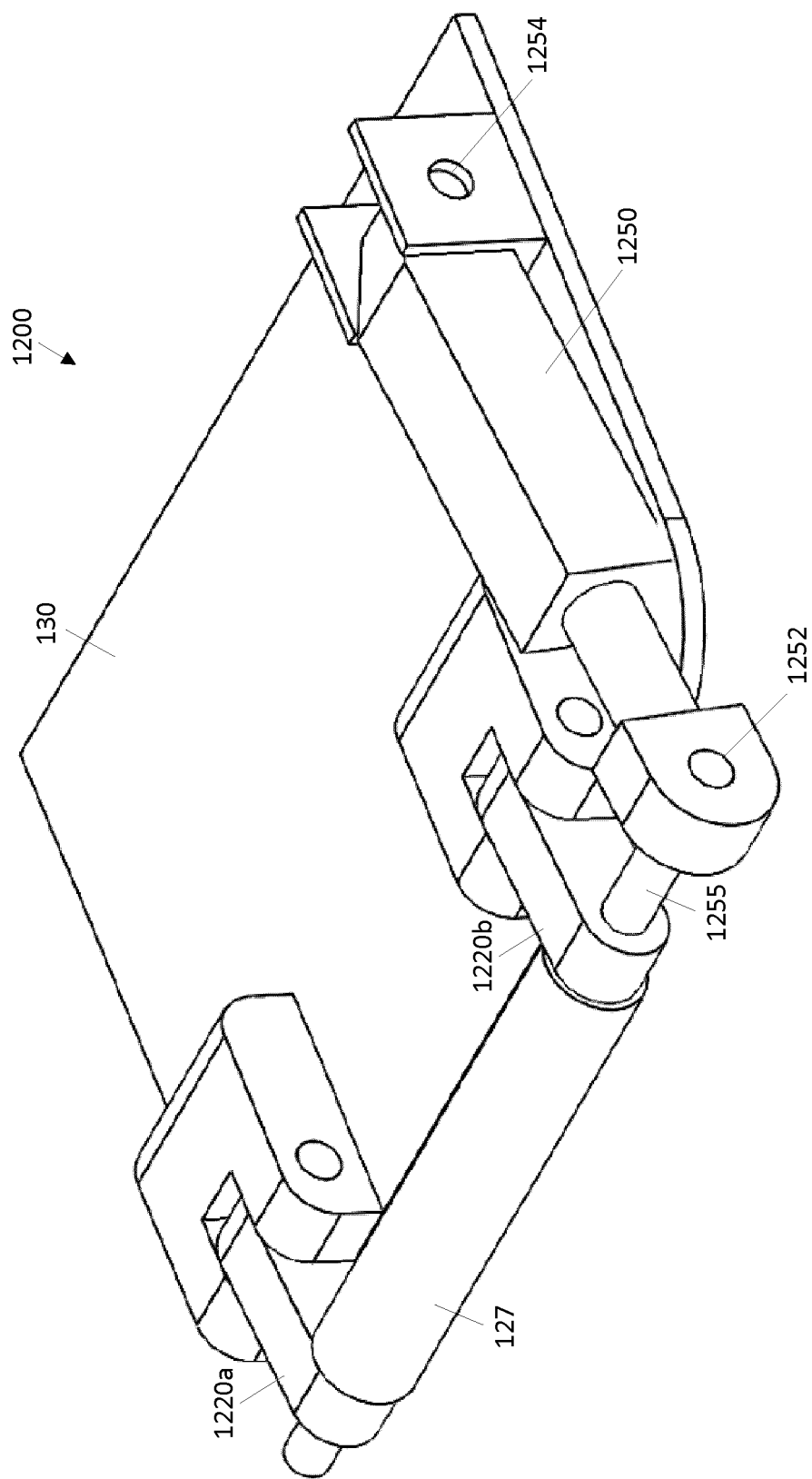
FIG. 18 is a perspective view of the configurable leading edge segment of FIG. 17, with the leading edge in a planar position, and with a transfer belt omitted for clarity.
Figure 19:
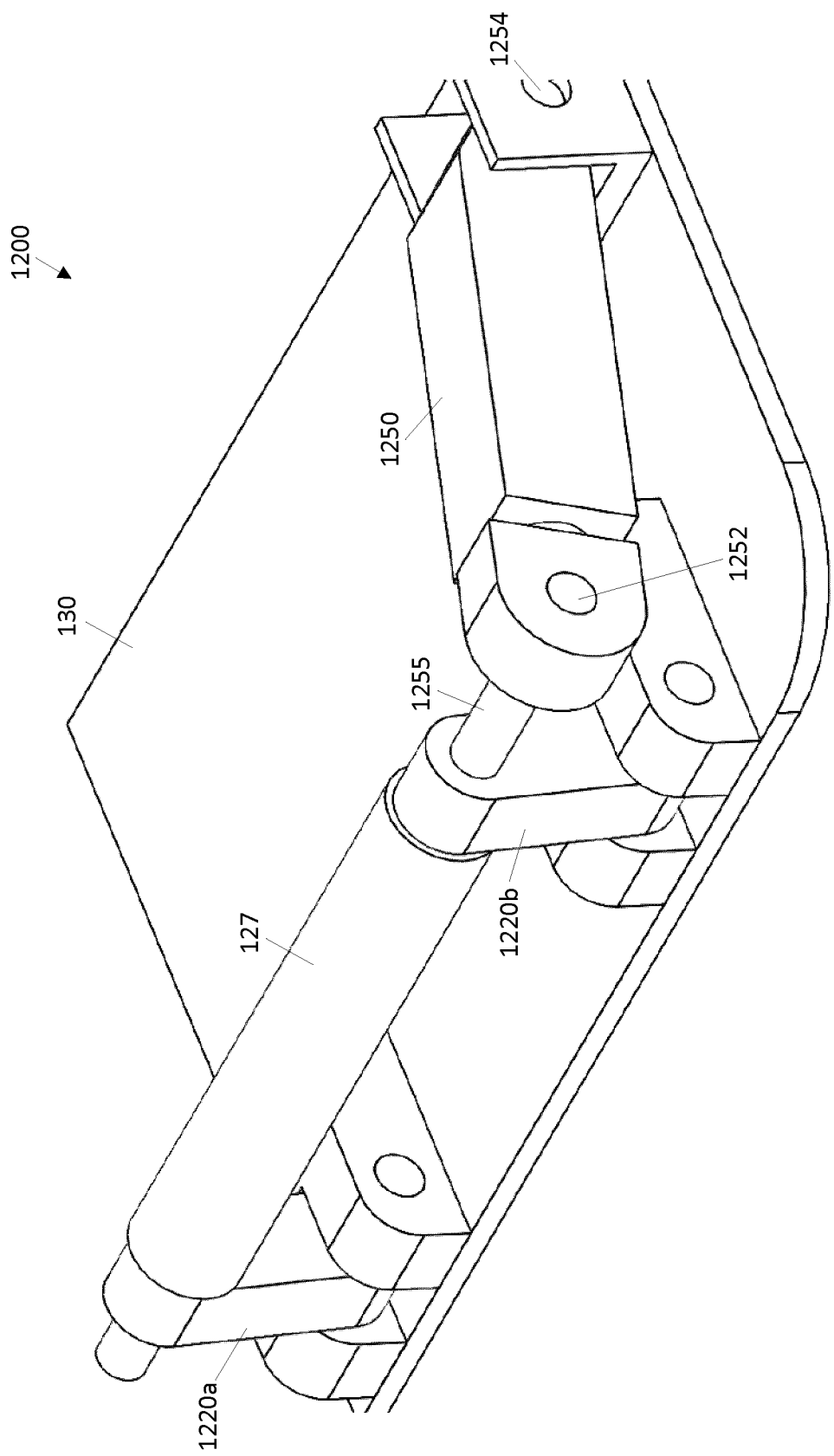
FIG. 19 is a perspective view of the configurable leading edge segment of FIG. 18, with the leading edge in an angled position.

Optionally, the height and/or angle of some or all of the leading edge 123 may be selectively adjustable. For example, with reference to FIGS. 17 to 19, one or more configurable edge modules, referred to generally as 1200, may be provided along the length of leading edge 123. In the illustrated example, configurable edge module 1200 includes a roller 137 secured to upper moveable plate 130 by a pair of linkages 1220a, 1220b. A linear actuator 1250 is pivotally mounted at a first end 1252 to axial member 1255, and at a second end 1254 to upper moveable plate 130. In the illustrated configuration, roller 137 may be moved between a planar position (e.g. as shown in FIG. 18) and a raised position (e.g. as shown in FIG. 19) by extending or contracting linear actuator 1250.

Figure 16:
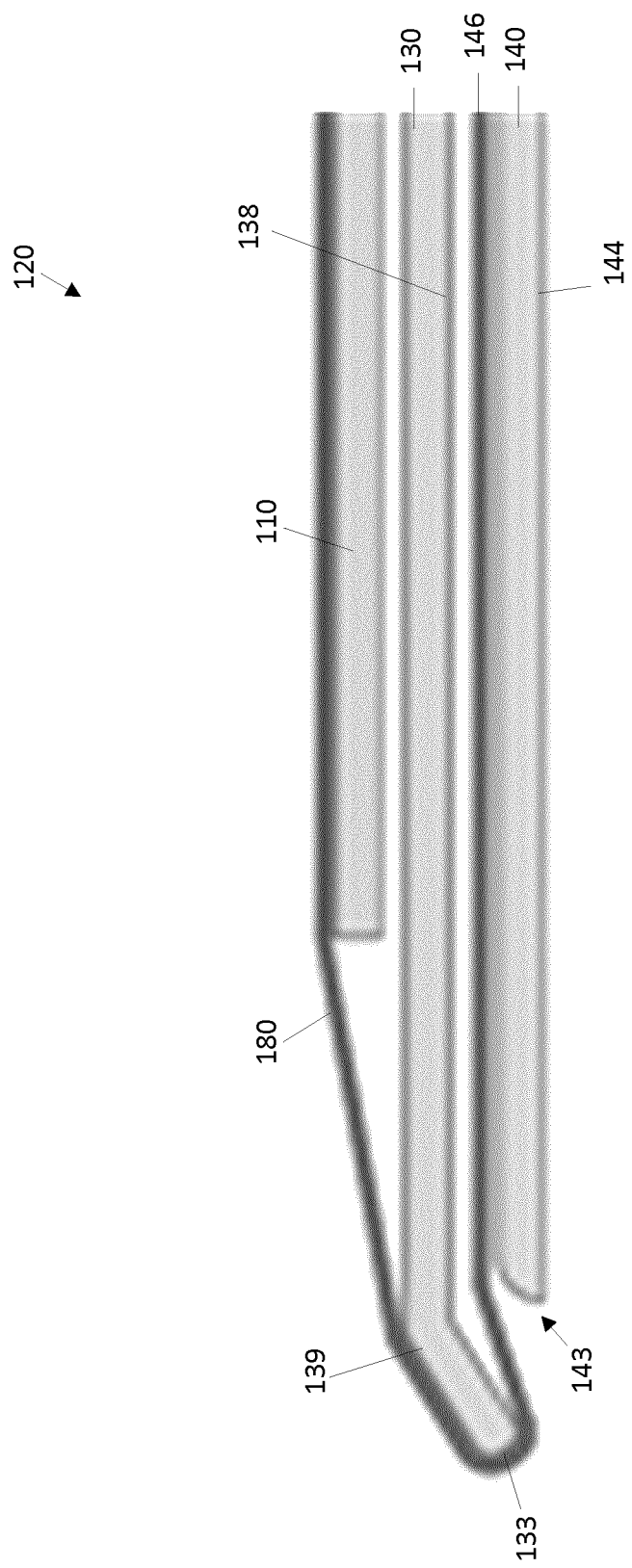
FIG. 16 is a schematic section view of a leading edge of a moveable plate, a leading edge of a fixed plate, and a transfer belt in accordance with one embodiment.

In the examples illustrated in FIGS. 1 to 15, leading edge 133 of upper moveable plate 130 is positioned above guard plate 140. Alternatively, some or all of leading edge 133 may be co-planer or below guard plate 140. For example, as illustrated schematically in FIG. 16, a leading portion 139 of upper moveable plate 130 may be angled or curved downwardly such that leading edge 133 is generally co-planer with guard plate 140. Such an arrangement may have one or more advantages. For example, a relatively lower leading edge 133 may facilitate moveable plate 120 being extended between a human body and the surface it is resting on with relatively little disturbance of and/or discomfort to the human. In particular, a lower leading edge 133 may facilitate and/or improve the transfer platform's ability to transfer a human from a floor surface.

Figure 42:
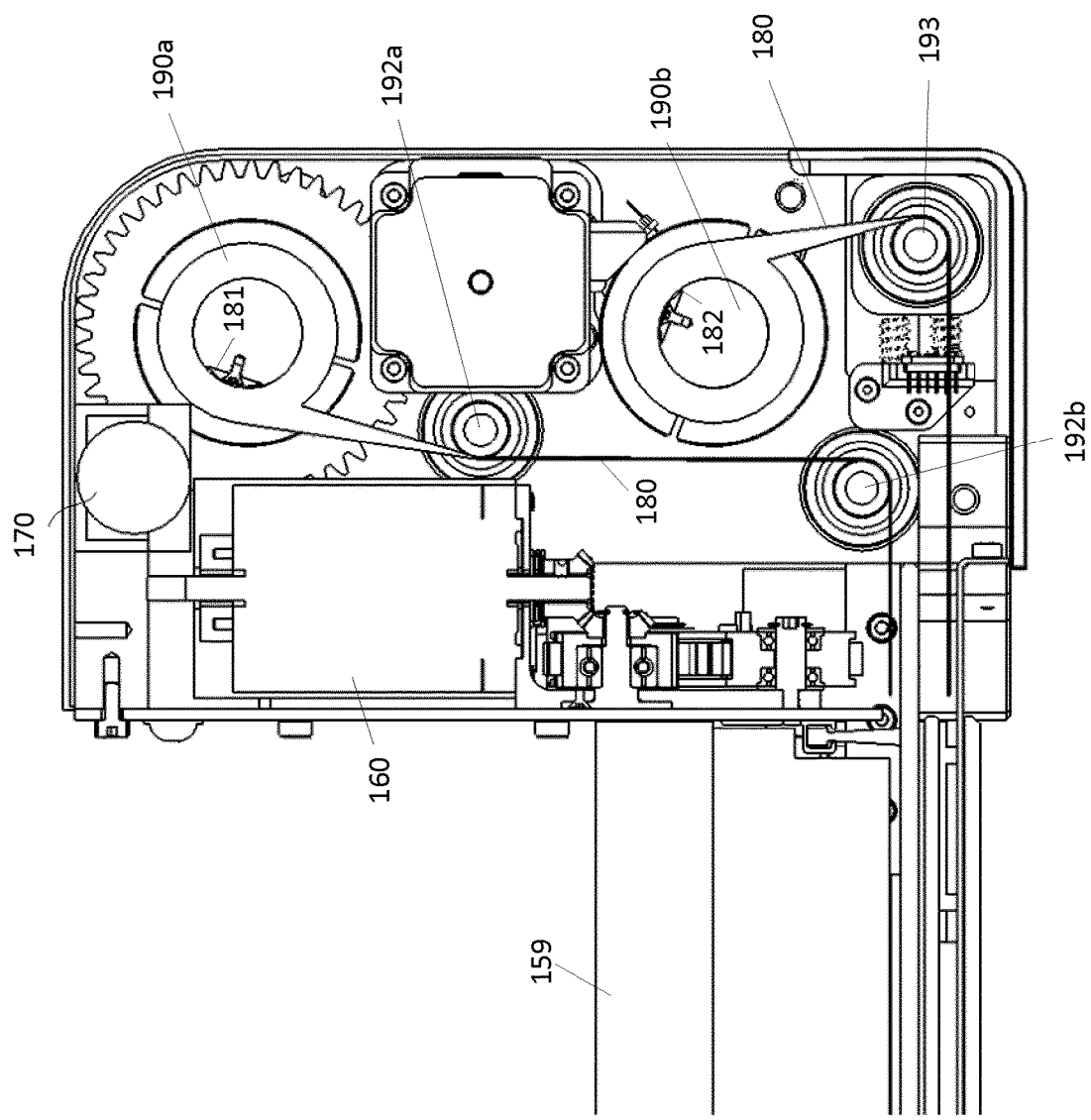
FIG. 42 is a section view of driven rollers of a transfer devise in accordance with another example embodiment, including a UV light emitter.
Figure 43:
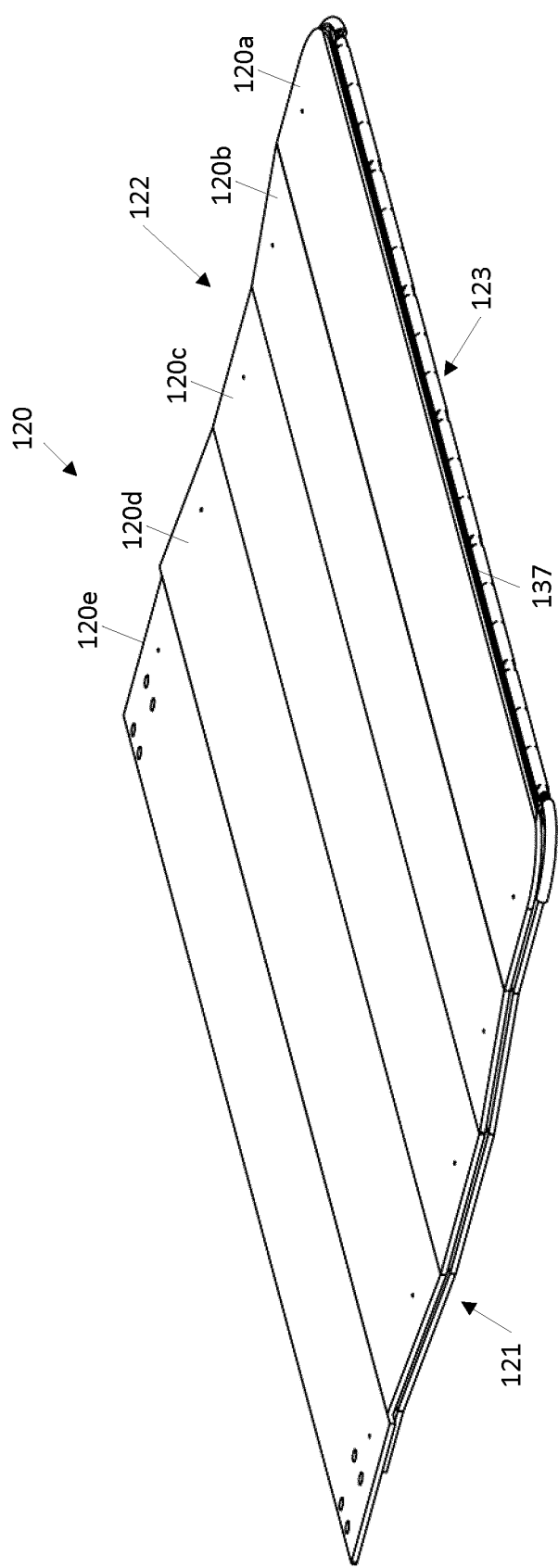
FIG. 43 is a perspective view of an articulated moveable plate, in accordance with one embodiment.
Figure 44:
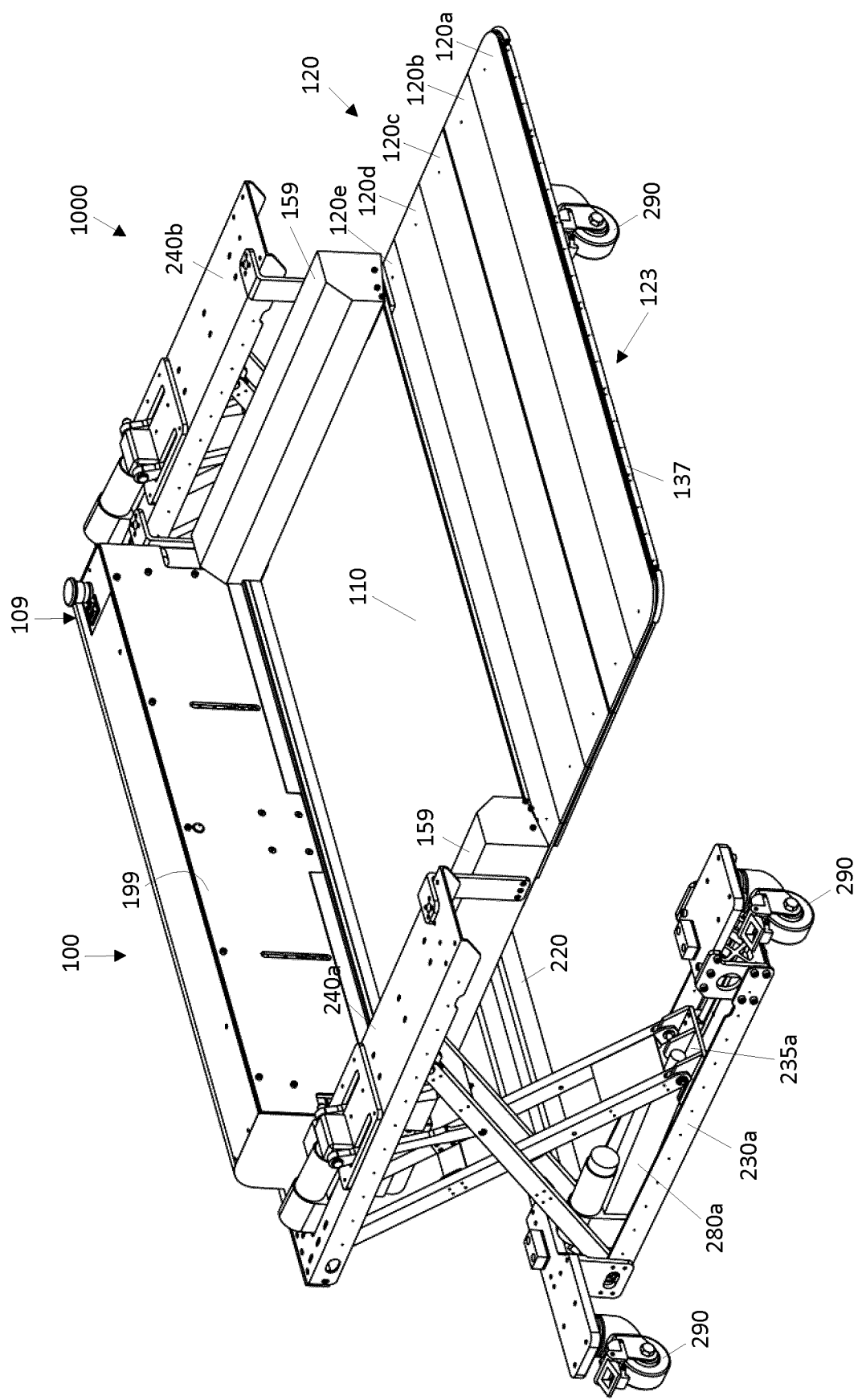
FIG. 44 is a perspective view of a transfer device in accordance with one embodiment, with the transfer platform in a raised position, with an articulated moveable plate in an extended position, and with a transfer belt omitted for clarity.
Figure 45:
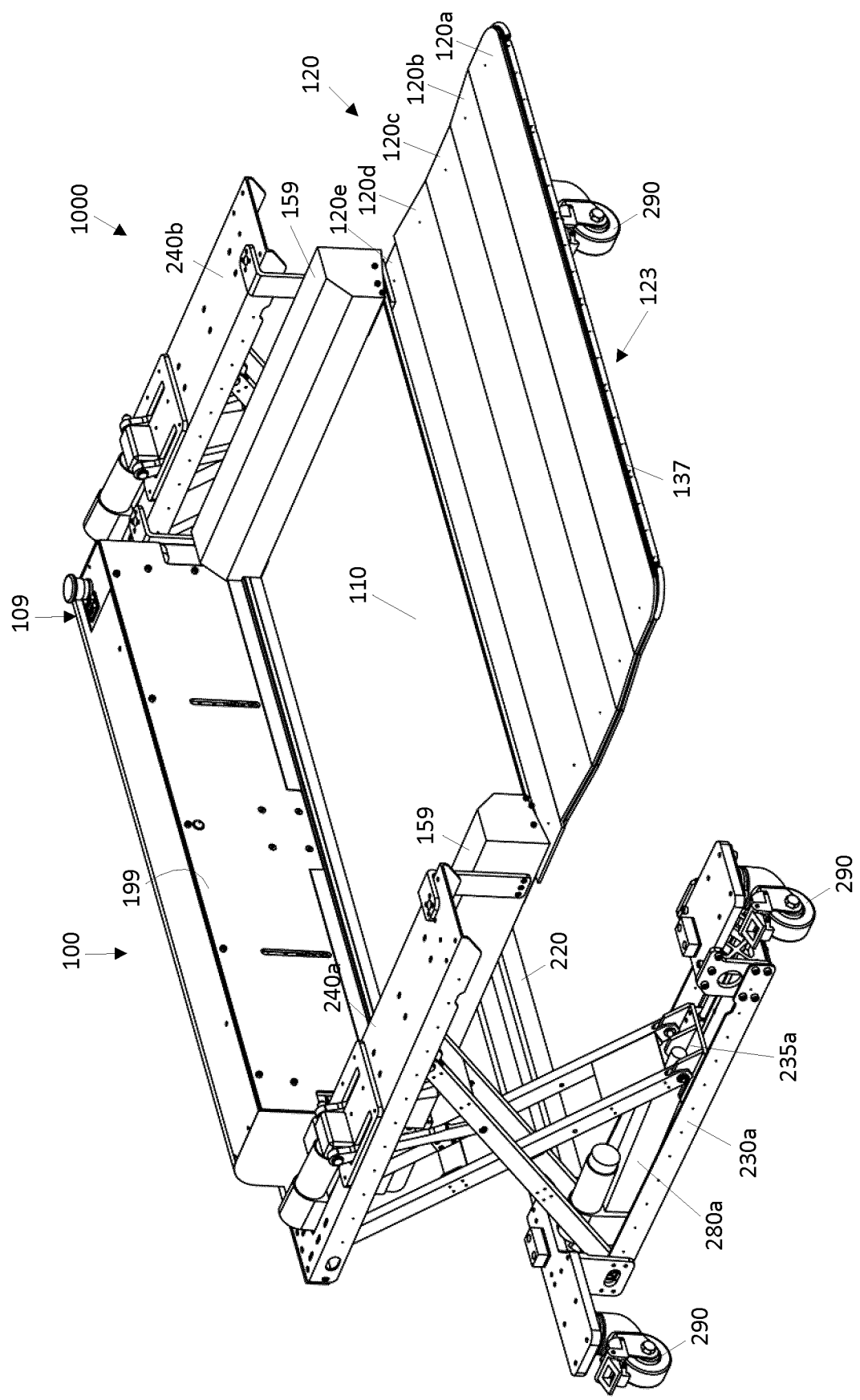
FIG. 45 is a perspective view of the transfer device of FIG. 44, with the articulated movable plate in a flexed position.
Figure 46:
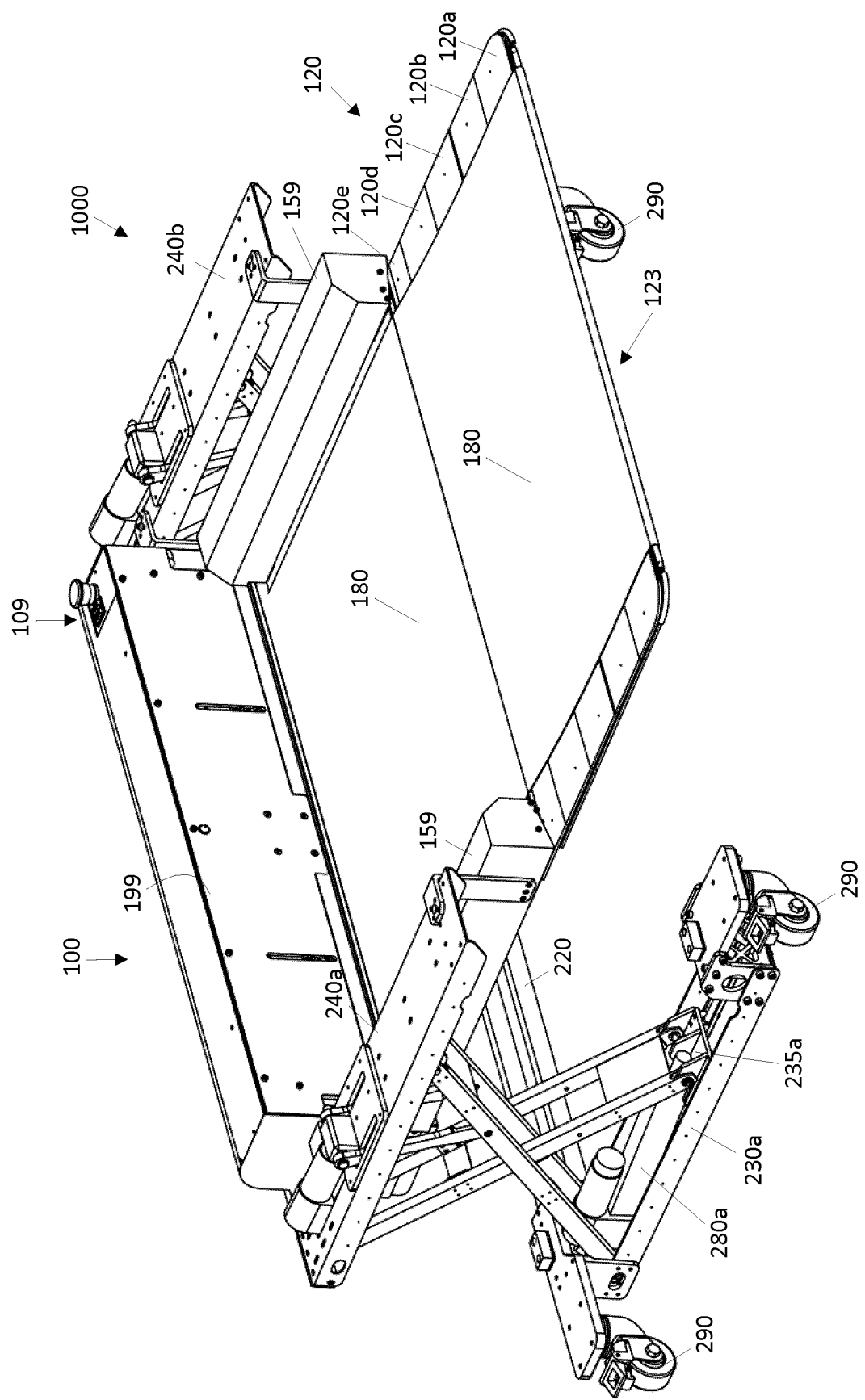
FIG. 46 is a perspective view of the transfer device of FIG. 44, with the transfer belt shown.
Figure 47:
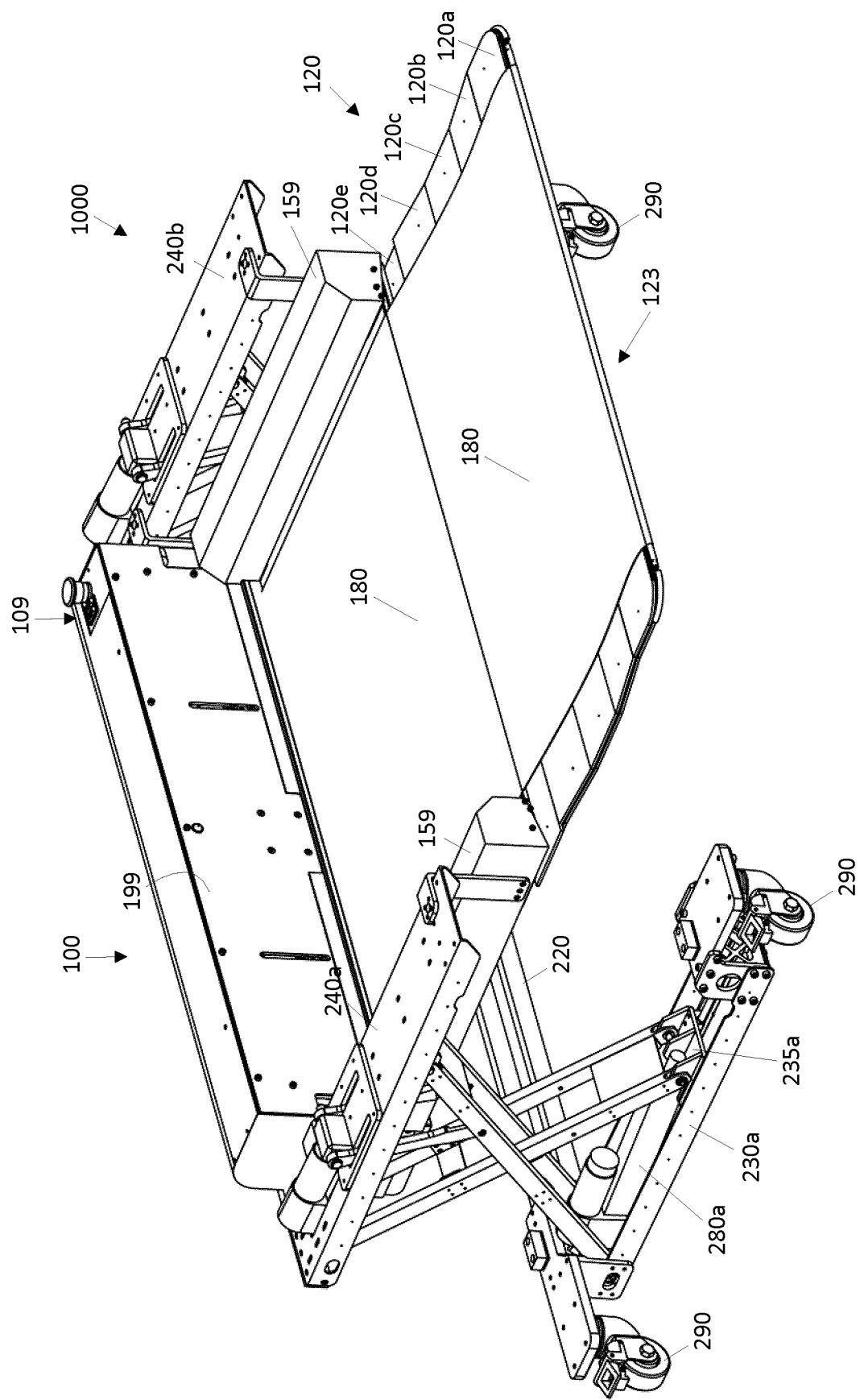
FIG. 47 is a perspective view of the transfer device of FIG. 45, with the transfer belt shown.
Figure 48:
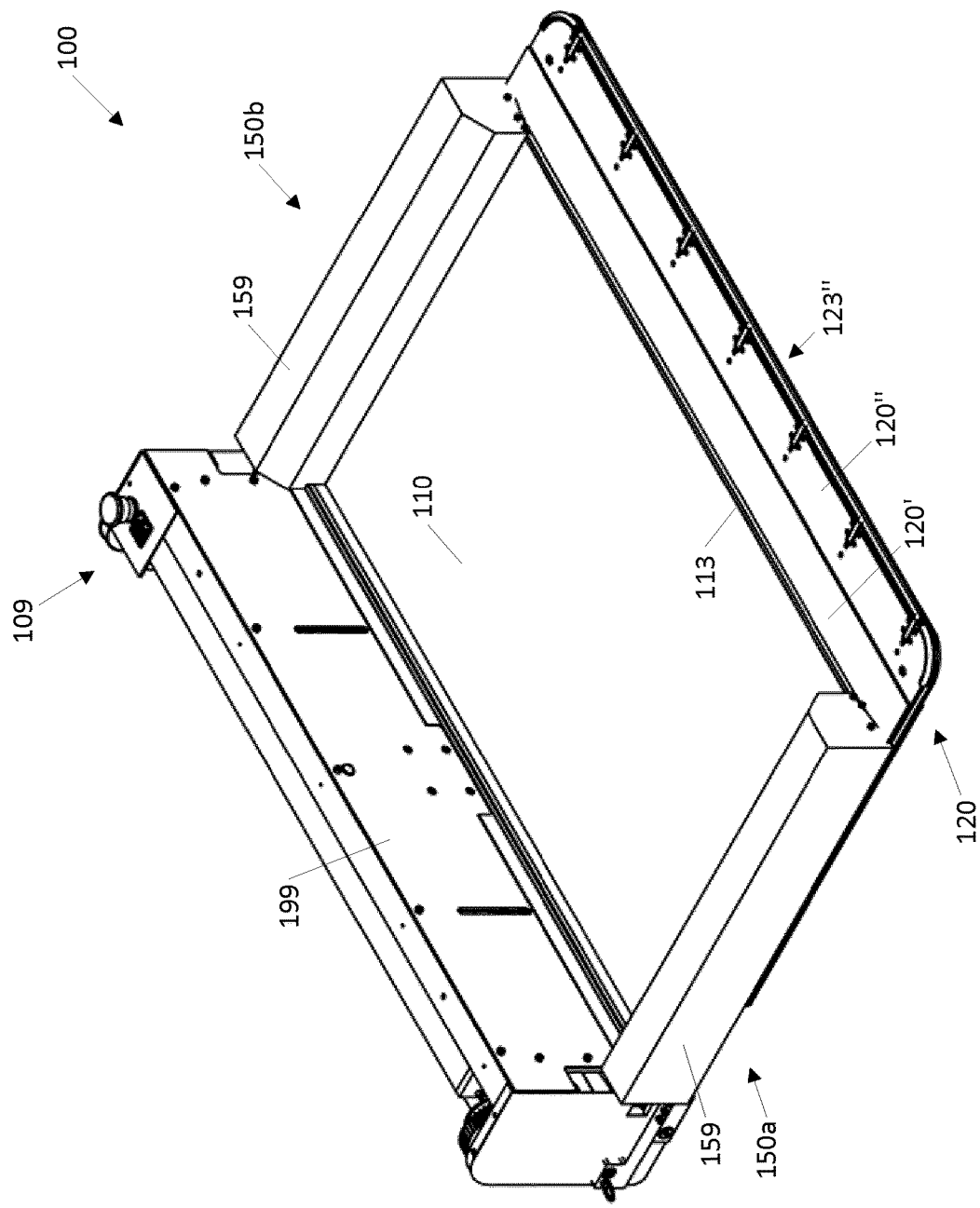
FIG. 48 is a perspective view of an extendible transfer platform in accordance with another embodiment, with a telescopic moveable plate in a retracted position, and with a transfer belt omitted for clarity.
Figure 49:
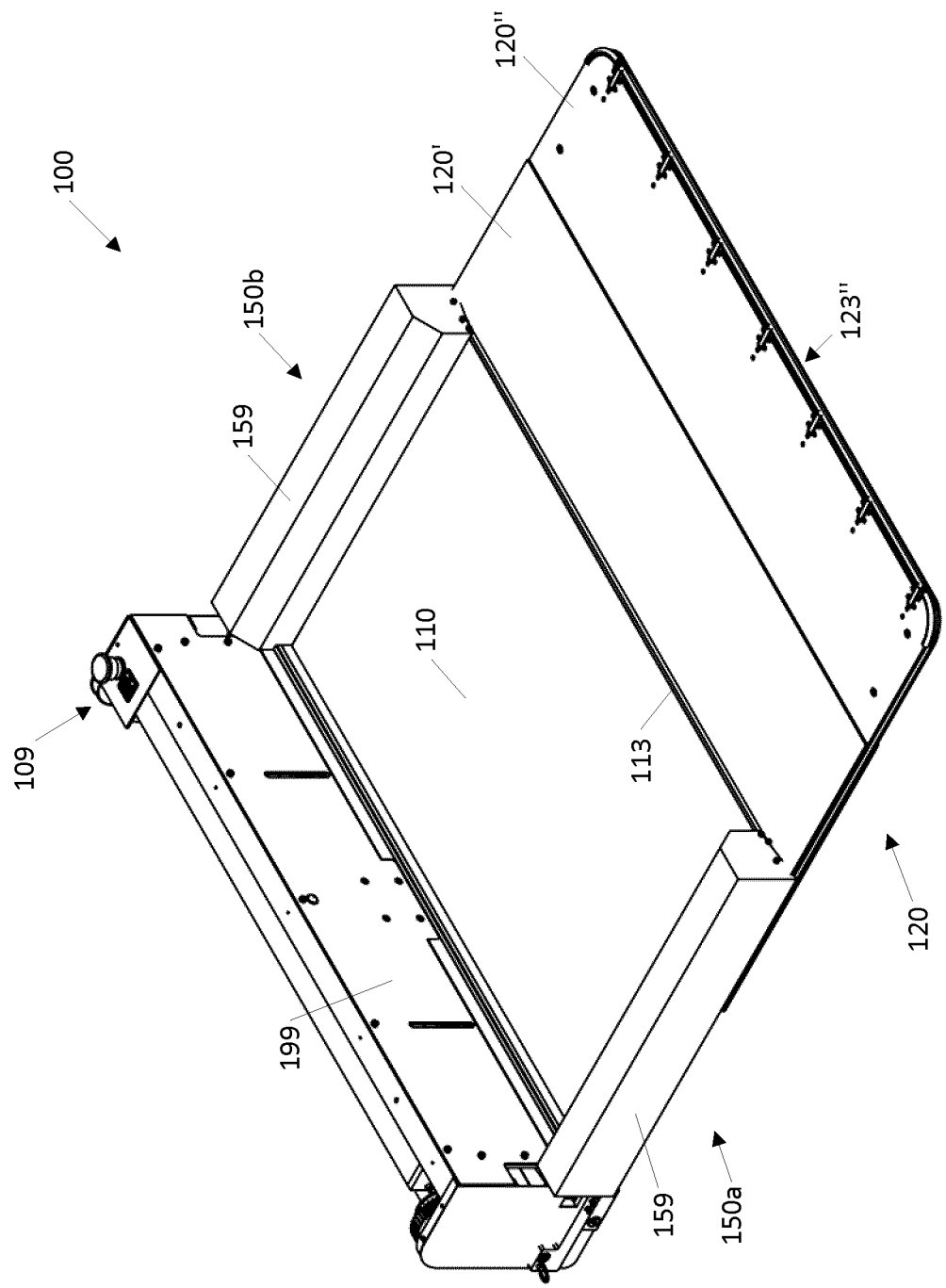
FIG. 49 is a perspective view of the transfer device of FIG. 48, with the telescopic movable plate in a partially extended position.
Figure 50:
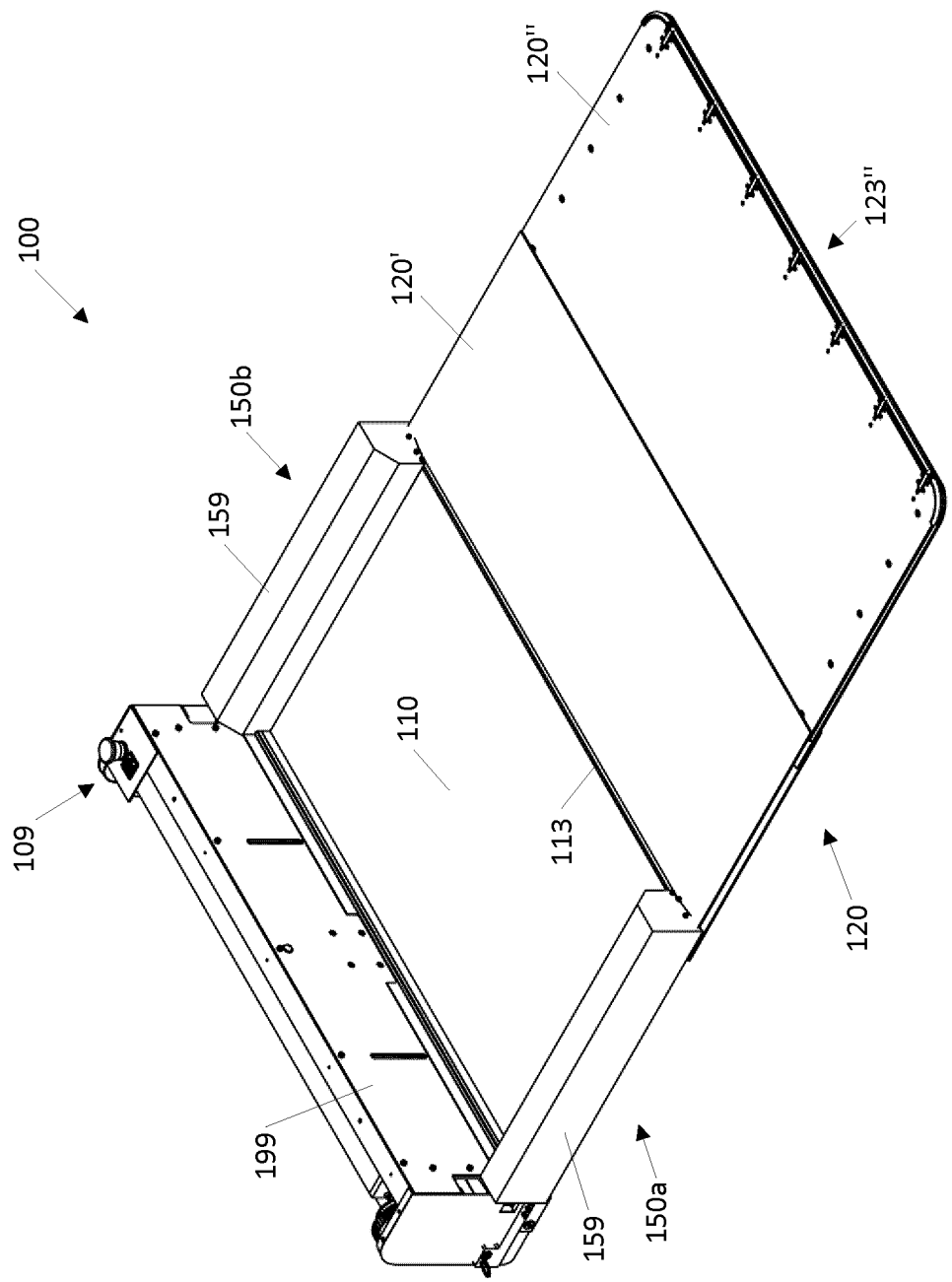
FIG. 50 is a perspective view of the transfer device of FIG. 48, with the telescopic movable plate in an extended position.
Figure 51:
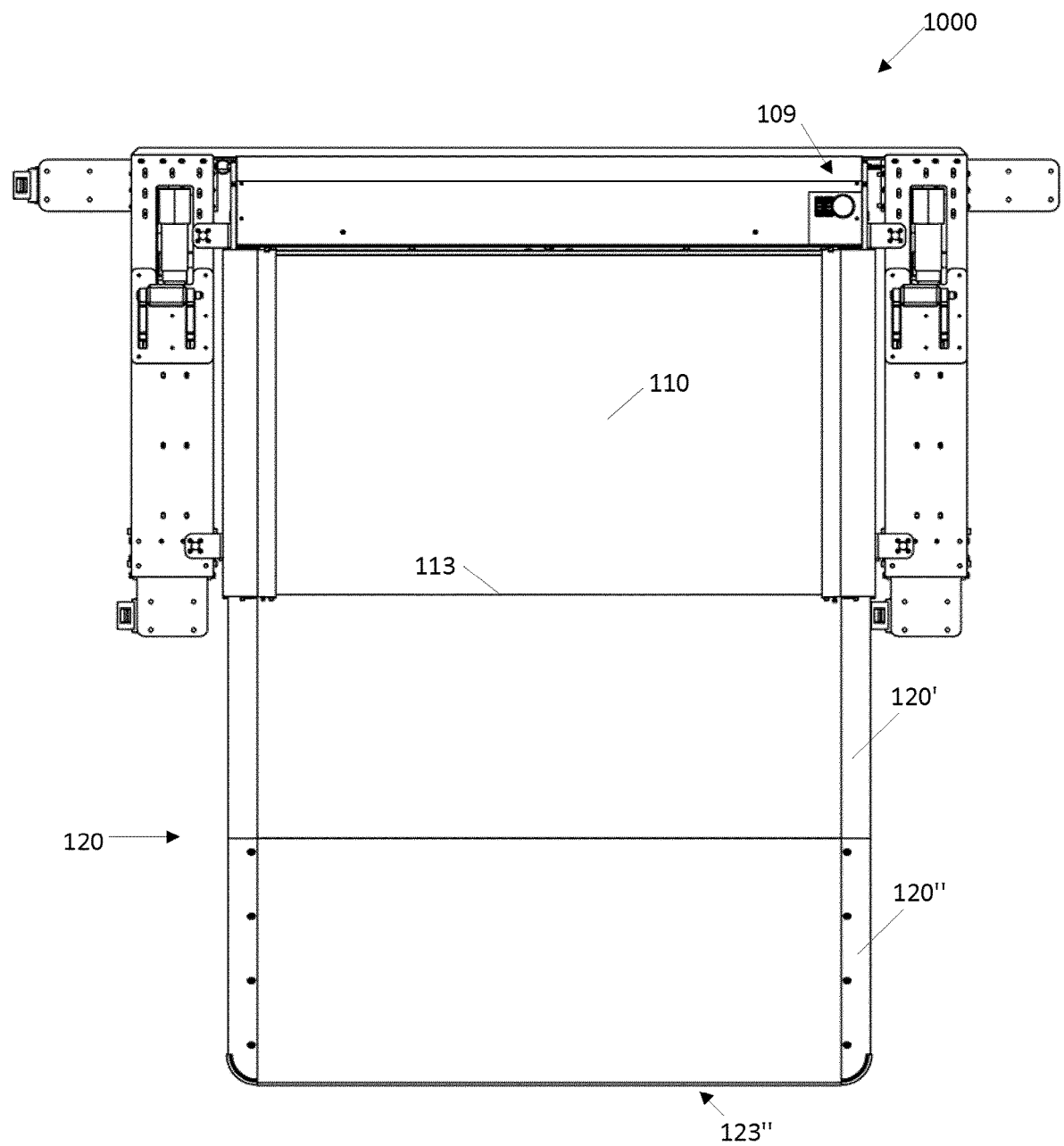
FIG. 51 is a top plan view of a transfer device in accordance with one embodiment, with a telescopic moveable plate in an extended position, and with a transfer belt omitted for clarity.
Figure 52:
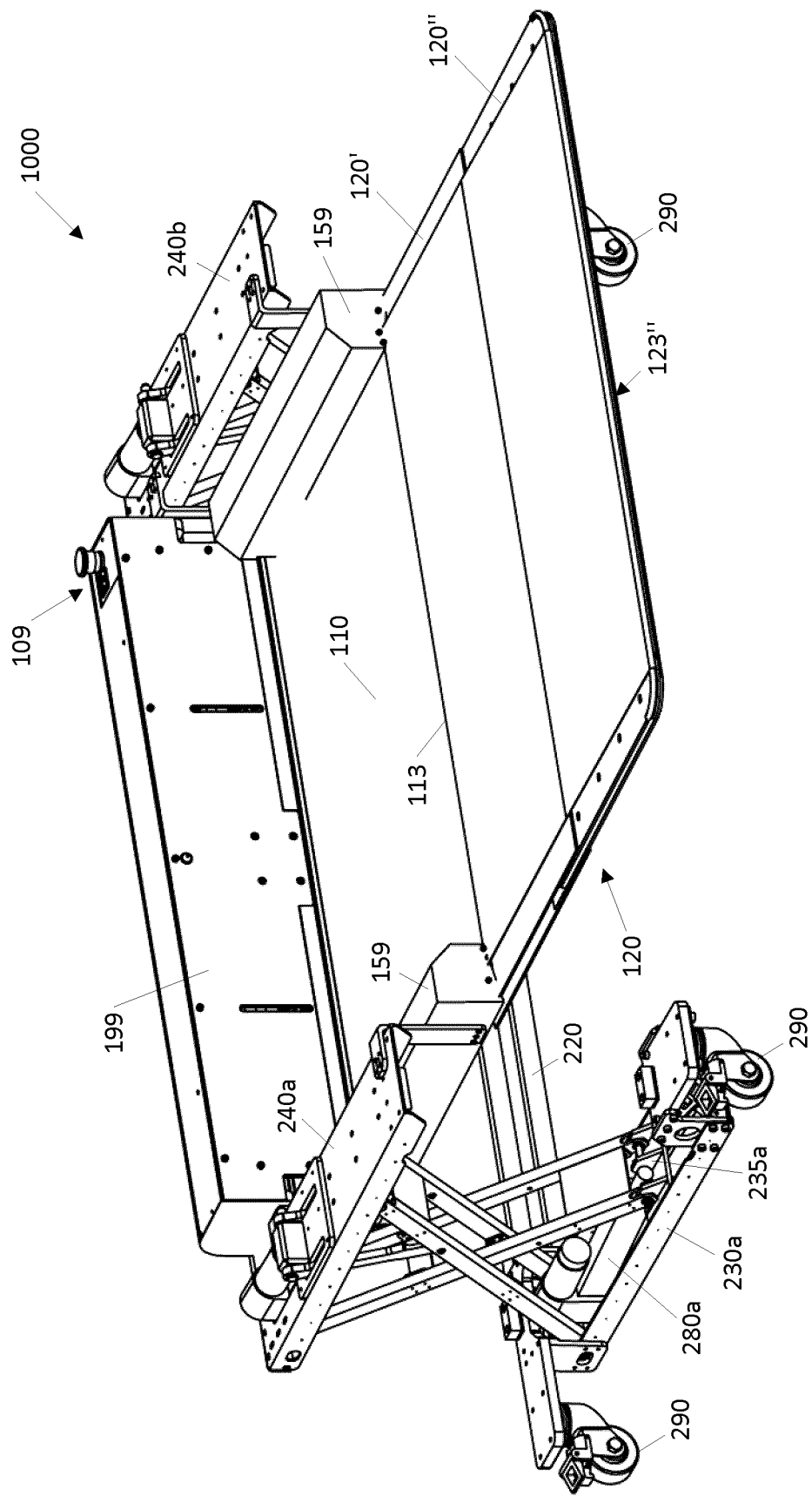
FIG. 52 is a perspective view of the transfer device of FIG. 51.

Optionally, transfer platform 100 may include one or more transfer belt treatment systems for applying a cleaning and/or disinfecting treatment to transfer belt 180. For example, as illustrated in FIG. 42, an ultra-violet (UV) light emitter 170 may be positioned within housing to continuously or selectively emit UV light towards an upper surface of transfer belt 180, or both an upper surface and a lower surface of transfer belt 180 as it passes by the emitter. Such a configuration may be characterized as an ultraviolet germicidal irradiation system.

Figure 53:
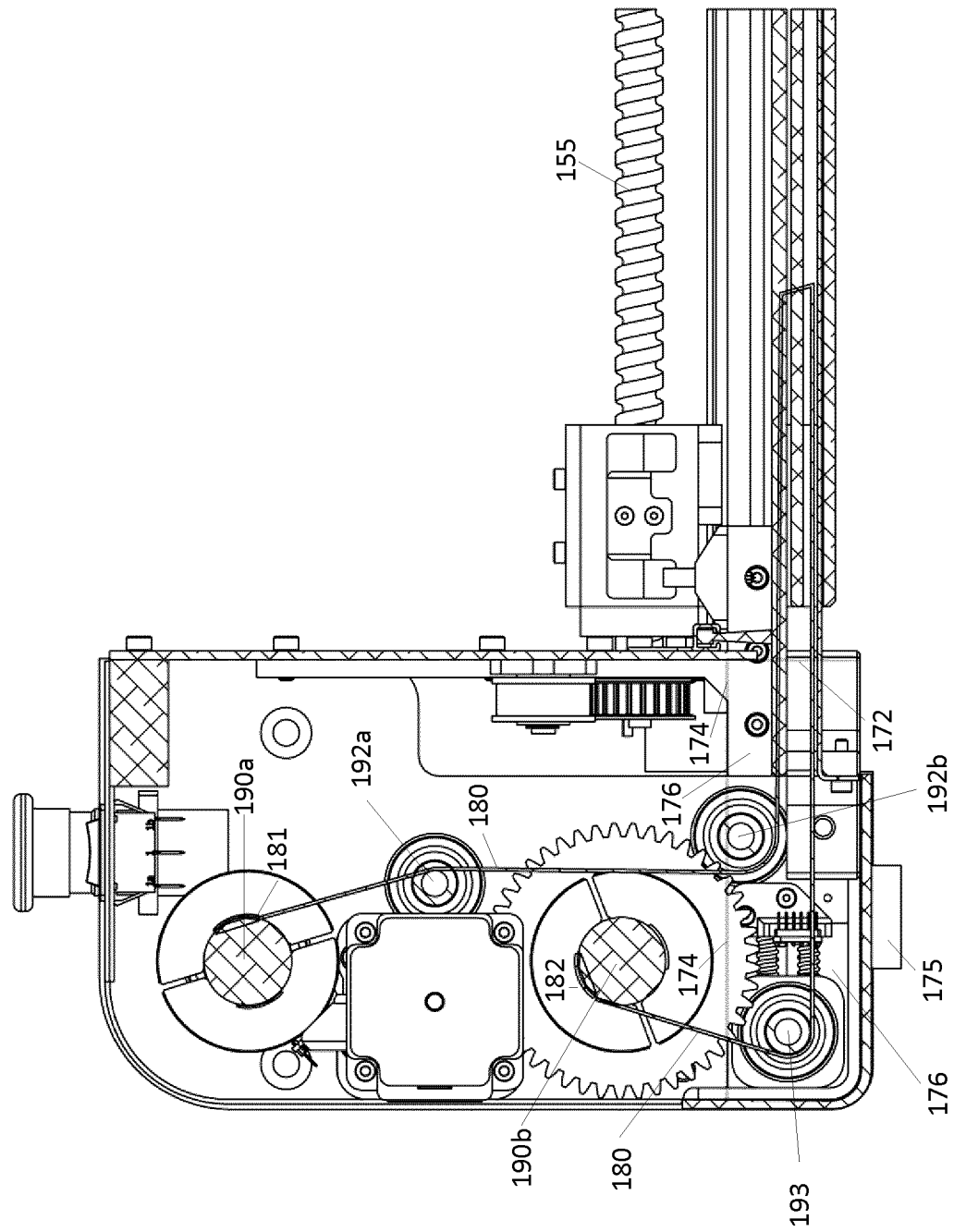
FIG. 53 is a section view of driven rollers of a transfer devise in accordance with another example embodiment, including a fluid reservoir and a fluid agitator.

Additionally, or alternatively, as illustrated in FIG. 53, a fluid chamber 176 may be defined within the housing interior by sealing members 172, 174 (which may have one or more apertures through which transfer belt 180 may be configured to pass through), and a fluid agitator 175 (e.g. an ultrasonic agitator) may be provided to continuously or selectively agitate a fluid as transfer belt 180 passes through the fluid chamber 176. Such a configuration may be characterized as a fluid agitation system or as an ultrasonic bath system.

Additionally, or alternatively, a brush, sponge, microfiber, or other material (not shown) may be positioned within the housing 199 and in contact with a surface of transfer belt 180, such that when the transfer belt is advanced or retracted, dirt or debris may be removed from an upper surface of transfer belt 180, or both an upper surface and a lower surface of transfer belt 180. Optionally, a reservoir of a cleaning and/or disinfectant fluid (e.g. alcohol, peroxide, bleach, etc.) may also be provided, for dispensing cleaning and/or disinfectant fluid onto the brush, sponge, microfiber, or other material, and/or directly onto transfer belt 180. It will be appreciated that for embodiments that include a fluid dispensing apparatus, 'fluid-proofing' or at least increased ingress protection may be required for fluid-sensitive parts of the device (e.g. electronics).

In some embodiments, a manual actuator (e.g. a depressible button) may be provided to selectively actuate the transfer belt treatment system to provide one or more treatment agents (e.g. UV light, disinfectant fluid, ultrasonic bath agitation) to transfer belt 180. For example, the UV light emitter 170 may be configured such that, in response to depression of the manual actuator, it emits UV light for a pre-set period of time (e.g. 10 seconds, 30 minutes), which may be selected based on e.g. the decontamination level required, a distance of emitter 170 from belt 180, intensity of light emitted by emitter 170, and/or other factors known to those in the art. As another example, the agitator 175 may be configured such that, in response to depression of the manual actuator, it agitates fluid in chamber 176 for a pre-set period of time (e.g. 10 seconds, 30 minutes), which may be selected based on e.g. the decontamination level required, composition of fluid within chamber 176, and/or other factors known to those in the art. Additionally, or alternatively, the transfer belt treatment system may be configured such that one or more treatment agents (e.g. UV light, disinfectant fluid, ultrasonic agitation) are provided at pre-set intervals (e.g. following every transfer operation, every 24 hours) without requiring manual actuation, and/or at a preset time after a transfer operation has been performed.

Optionally, transfer platform 100 may include one or more inflatable chambers (not shown) positioned above fixed plate 110. Such chambers may act as cushioning for a human body (or other object) resting on the transfer platform. This cushioning may be useful, for example, when transferring a human who is immobilized, or a human who may need to spend extended periods on the transfer device.

Optionally, transfer platform 100 may include one or more mechanical gates (not shown) to inhibit or prevent a human from rolling off of the platform during transport.

Optionally, transfer platform 100 may include one or more diagnostic sensors (not shown). Such diagnostic sensors may be used to collect data on a human (or other object) positioned on the transfer platform. For example, one or more load cells (e.g. for weight), pressure monitoring sensors (e.g. for blood pressure and/or pulse), and/or visual cameras may provide feedback to practitioners on the status of the human being transferred.

Transfer platform 100 also includes a transfer device controller operatively coupled to at least one of the first driven roller, the second driven roller, and the at least one platform actuator for controlling their operation. The transfer device controller may also be operatively coupled to one or more sensors, such as back-emf detection or encoders for distance on motors and gearboxes, current sensors for motor torques, pressure sensors, load cells, proximity sensors, and the like. It will be appreciated that the control system may employ open loop control, closed loop control, or a combination thereof.

For example, various embodiments of control systems described herein may be implemented using a combination of hardware and software. These embodiments may be implemented in part using computer programs executing on one or more programmable devices, each programmable device including at least one processor, one or more data stores (including volatile memory or non-volatile memory or other data storage elements or a combination thereof), at least one communication interface and any other associated hardware and software that is necessary to implement the functionality of at least one of the embodiments described herein. At least some of the embodiments described herein that use programs may be implemented in a high level procedural or object oriented programming and/or scripting language or both. Accordingly, the program code may be written in C, Java, SQL or any other suitable programming language and may comprise modules or classes, as is known to those skilled in object oriented programming. However, other programs may be implemented in assembly, machine language or firmware as needed. In either case, the language may be a compiled or interpreted language. The computer programs may be stored on a storage media (e.g. a computer readable medium such as, but not limited to, ROM, magnetic disk, optical disc) or a device that is readable by a general or special purpose computing device. The program code, when read by the computing device, configures the computing device to operate in a new, specific and predefined manner in order to perform at least one of the methods described herein.

Transfer platform 100 may include one or more user input devices that allow a user to initiate and/or control the operation of the transfer platform. For example, with reference to FIG. 1, user input devices may include one or more switches 109, which may include a main on/off switch, and a display (not shown), which may be a touch screen display for enabling user input. Transfer platform 100 may also include one or more user output devices that allows a user to monitor the operation of the transfer device. For example, the user output device may be display, and/or one or more audio and/or visual output devices, such as lights, buzzers, speakers, and the like (not shown).

As shown in FIGS. 1 to 6, at least some of the user input devices and/or control electronics of transfer platform 100 may be enclosed in a control housing or cabinet 199. It will be appreciated that the housing may be made from any suitable material (e.g. metal, plastic, and the like), and that in one or more alternative embodiments, a control cabinet may not be provided.

The operation of transfer platform 100 in transferring a human body from an elevated surface will now be described with reference to FIGS. 34A-D. The operation will be described in connection with the transfer platform 100 transferring a human body 10 from a compressible mattress 20. However, it will be understood that transfer platform 100 may transfer a human body (or other object) off of and on to any other raised surface in the same manner.

Figure 34A:
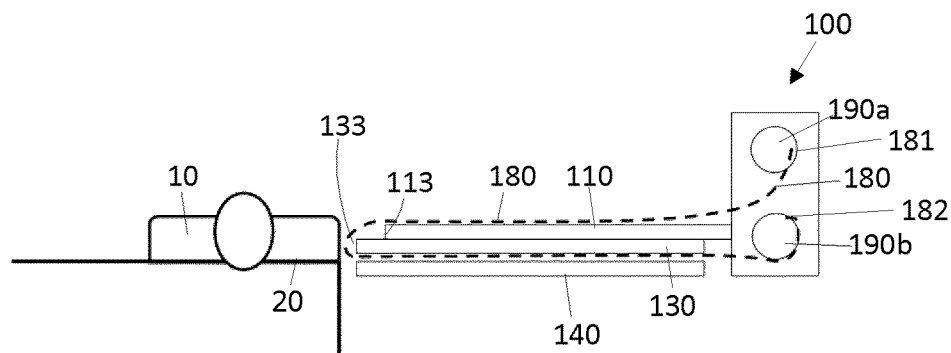
FIGS. 34A-D are a series of schematic elevation views illustrating the extendible transfer platform of FIG. 1 being used to transfer a human from a bed onto the transfer platform.

Transfer platform 100 is positioned beside the human body to be transferred, e.g. in the position shown in FIG. 34A, with the leading edge 123 of moveable plate 120 at a similar elevation to the surface on which the human body 10 is supported. For example, transfer platform 100 may be supported by a platform support structure, as will be discussed subsequently.

Figure 34B:
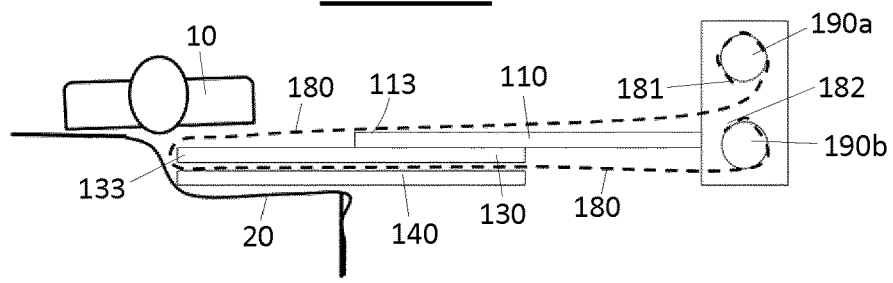

Referring to FIG. 34B, platform actuators 150 are used to extend the leading edge 123 of moveable plate 120 to a position distal from the leading edge 113 of fixed plate 110 so that at least a portion of moveable plate 120 is positioned below the human body 10, with a portion of transfer belt 180 positioned between moveable plate 120 and body 10.

In the illustrated example, a lower surface of the moveable plate (e.g. guard layer 140) is in contact with the surface 20 supporting the object to be transferred before and during the object's transfer. As illustrated, the supporting surface 20 may be displaced and/or compressed by the moveable plate during the transfer, e.g. to reduce the force on the body 10.

Figure 34C:
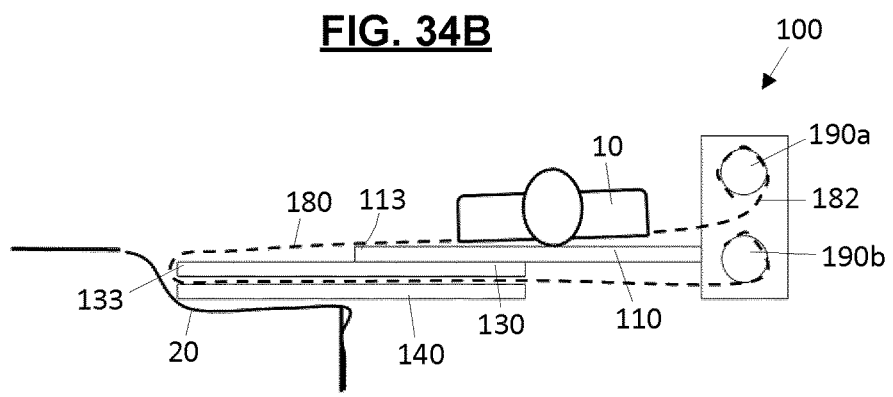

Referring to FIG. 34C, the first and second driven rollers are then actuated to convey the body 10 along upper surfaces of the moveable plate 120 and fixed plate 110. In the illustrated example, this is achieved by 'winding' first driven roller 190a while concurrently 'unwinding' second driven roller 190b to advance the upper surface of transfer belt 180 towards housing 199 in an actively controlled manner.

Figure 34D:
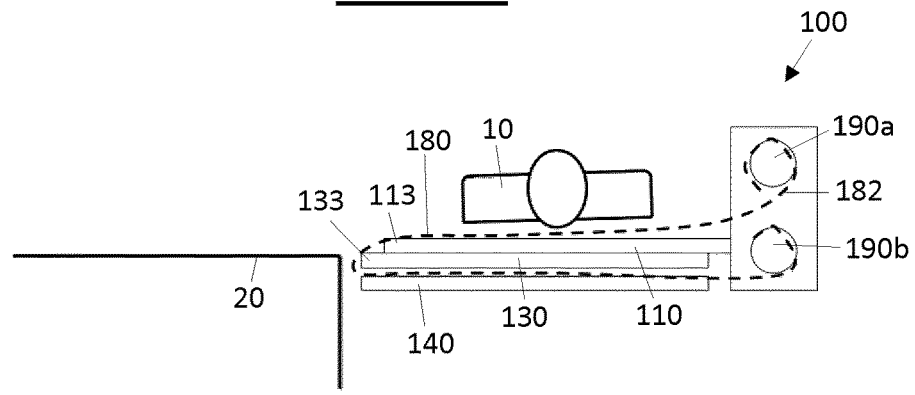

Referring to FIG. 34D, moveable plate 120 may then be retracted to a position in which fixed plate 110 overlies a majority of moveable plate 120. For example, fixed plate 110 may overlie at least 60%, at least 70%, at least 80%, or more than 80% of moveable plate 120. Preferably, driven rollers 190a, 190b may be controlled to take-up slack in transfer belt 180 during the retraction of moveable plate 120. For example, tension in transfer belt 180 may be controlled throughout the transfer process by monitoring one or more of the following exemplary sensors: current from the motor drivers, compression distance of a spring of tensioner 193, strain sensors (not shown) embedded into the transfer belt, and/or other suitable sensors.

Optionally, moveable plate 120 may be retracted concurrently with the advancement of the upper surface of transfer belt 180 towards housing 199. For example, the motion of moveable plate 120 and/or transfer belt 180 may be controlled to provide limited (or zero) relative motion between an upper surface of moveable plate 120 and body 10 during some or all of the retraction.

To transfer a human body from the transfer platform to an elevated surface, the process illustrated in FIGS. 34A to 34D may be performed in reverse order.

Figure 20:
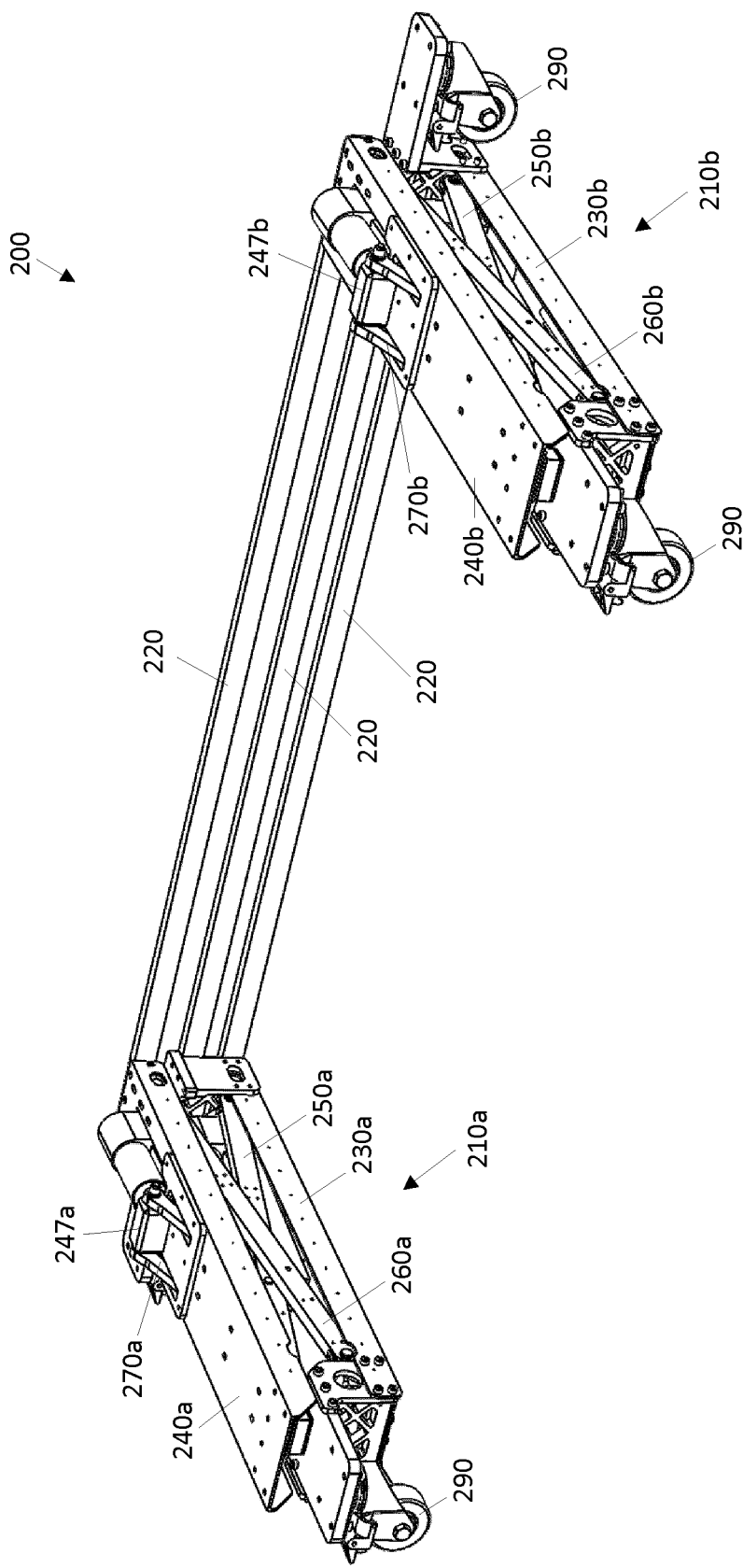
FIG. 20 is a perspective view of a platform support structure in accordance with one embodiment.
Figure 21:
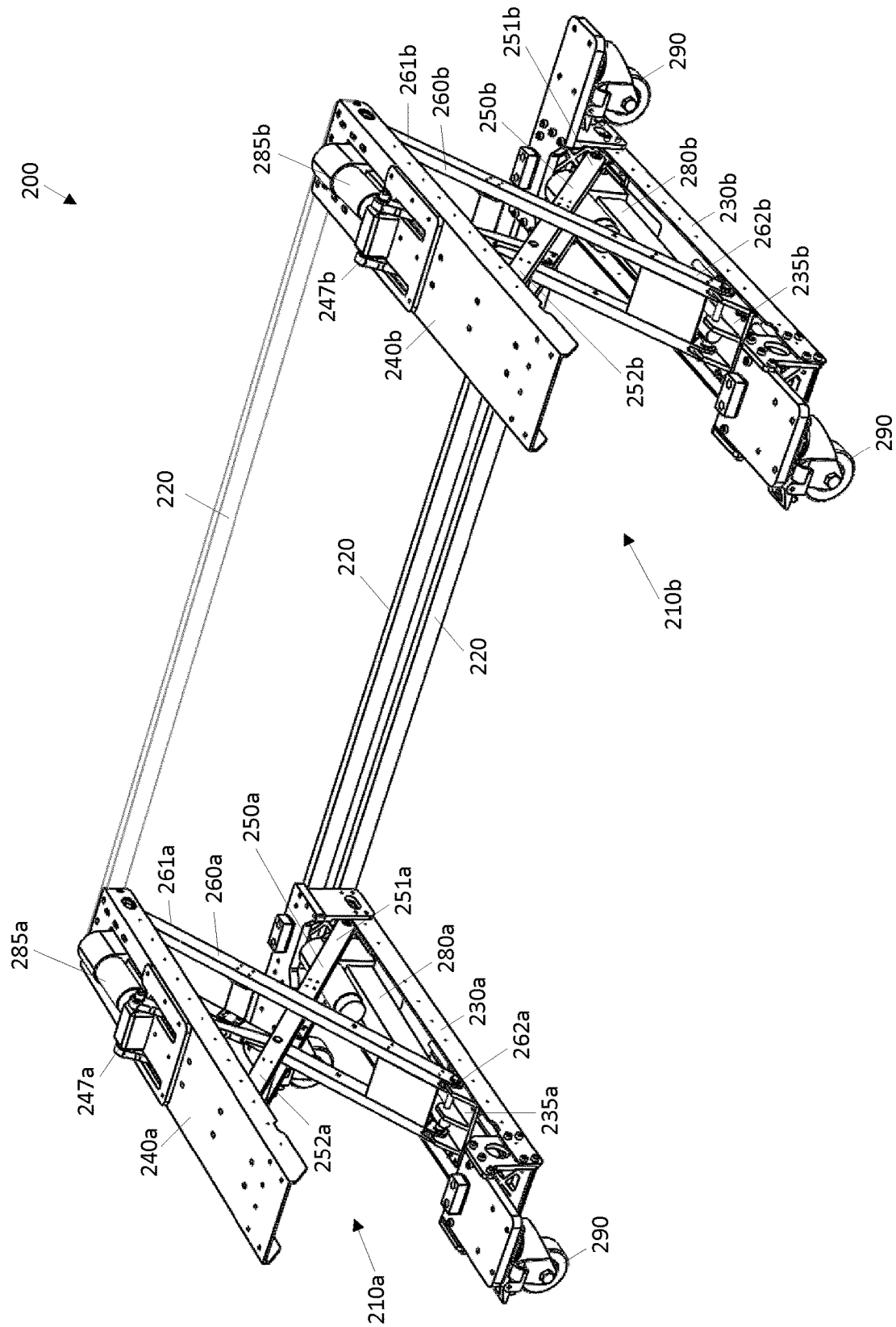
FIG. 21 is a perspective view of the platform support structure of FIG. 20, in a raised position.
Figure 22:
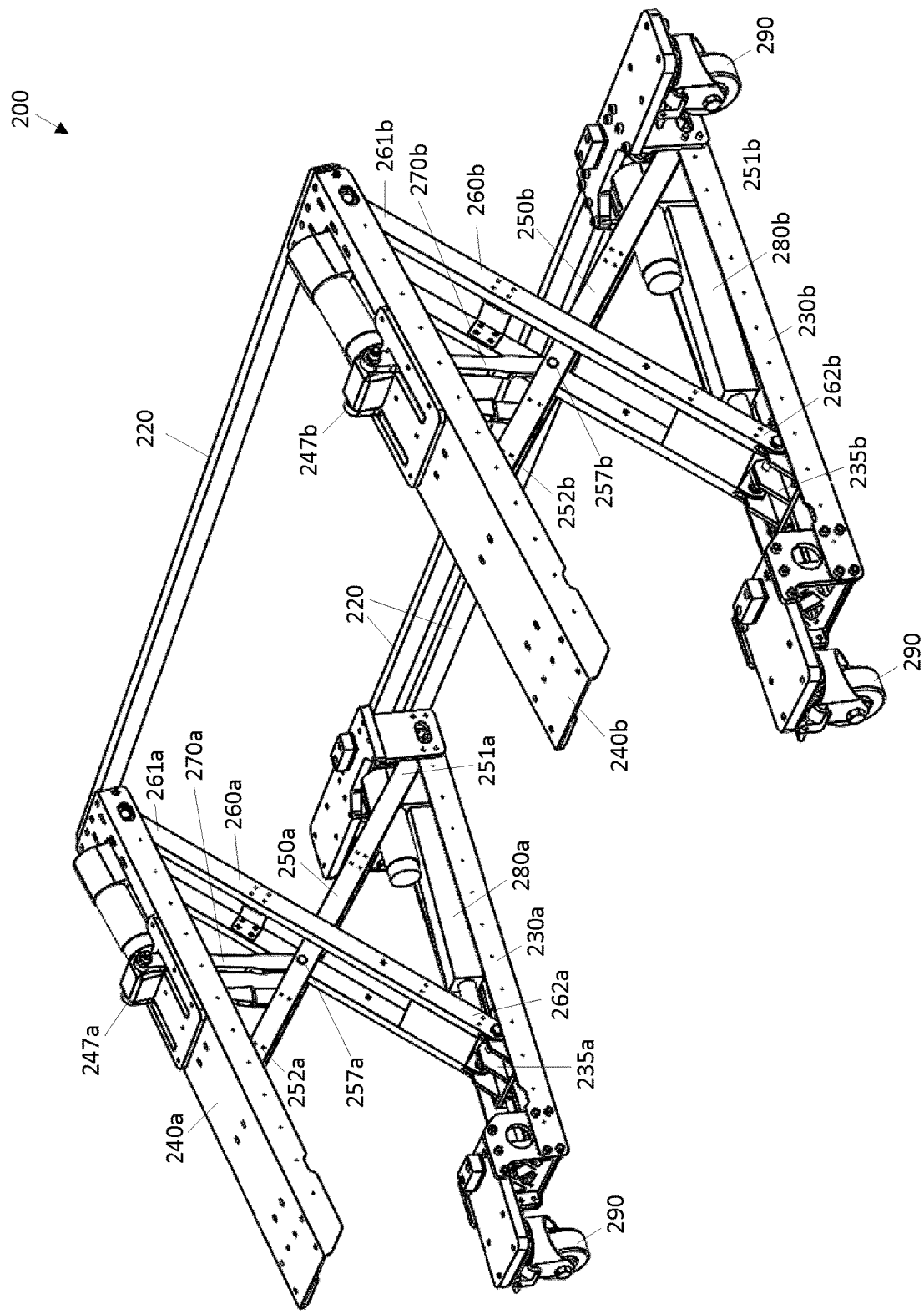
FIG. 22 is a perspective view of the platform support structure of FIG. 20, in a raised and tilted position.
Figure 23:
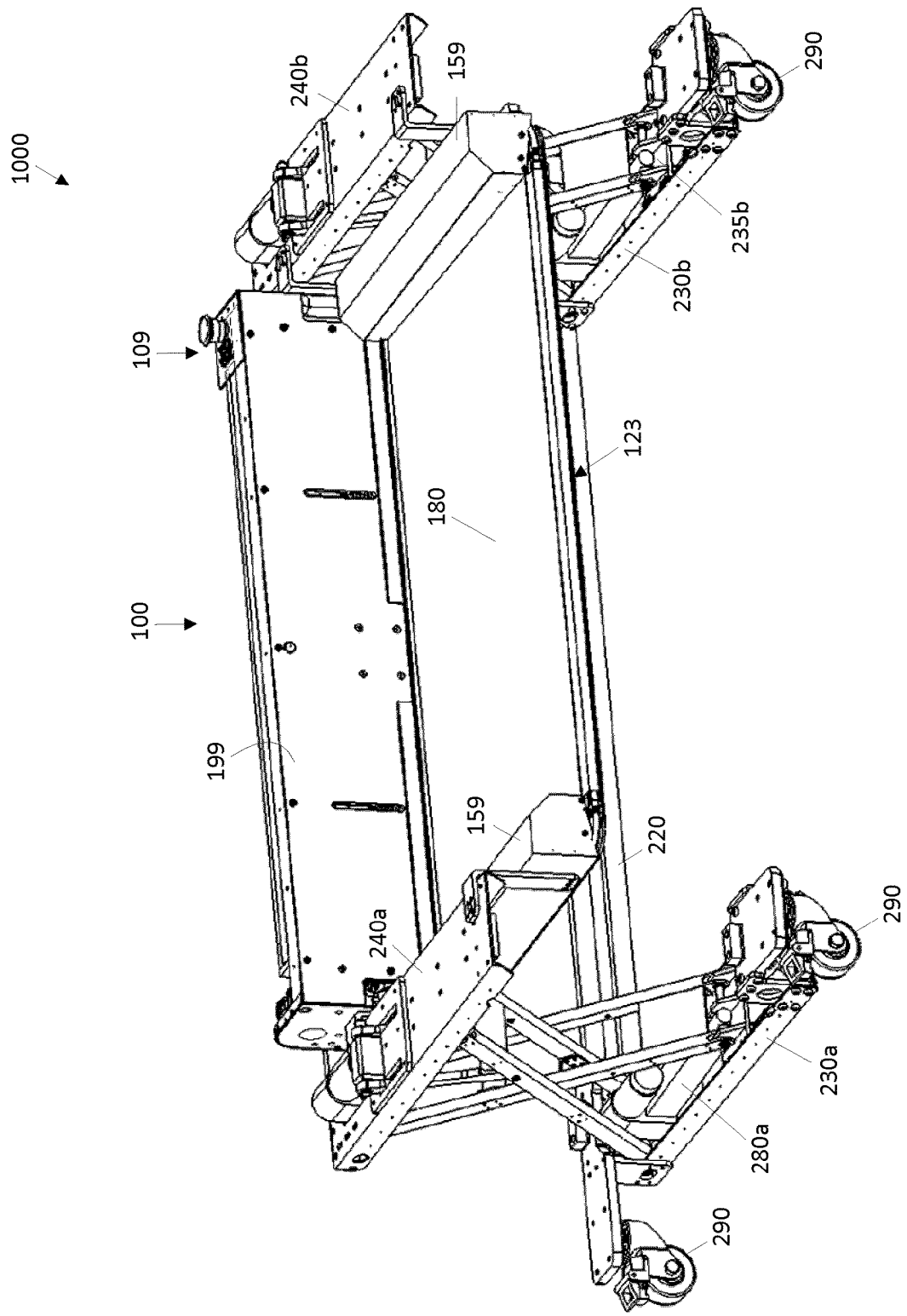
FIG. 23 is a perspective view of a transfer device in accordance with one embodiment, with the transfer platform in a raised position, with a moveable plate in a retracted position.
Figure 24:
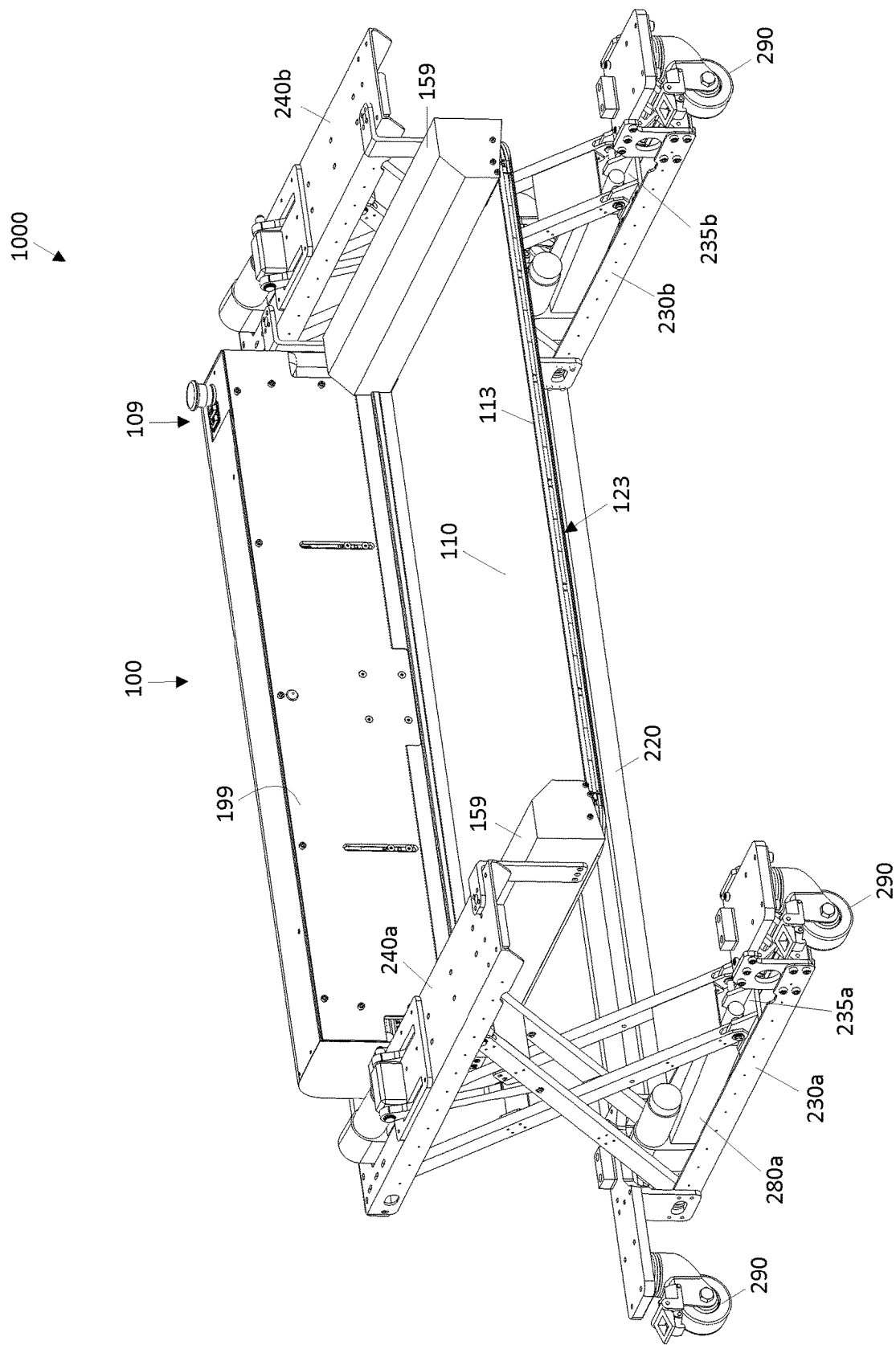
FIG. 24 is a perspective view of a transfer device in accordance with one embodiment, with the transfer platform in a raised position, with a moveable plate in a retracted position, and with a transfer belt omitted for clarity.
Figure 25:
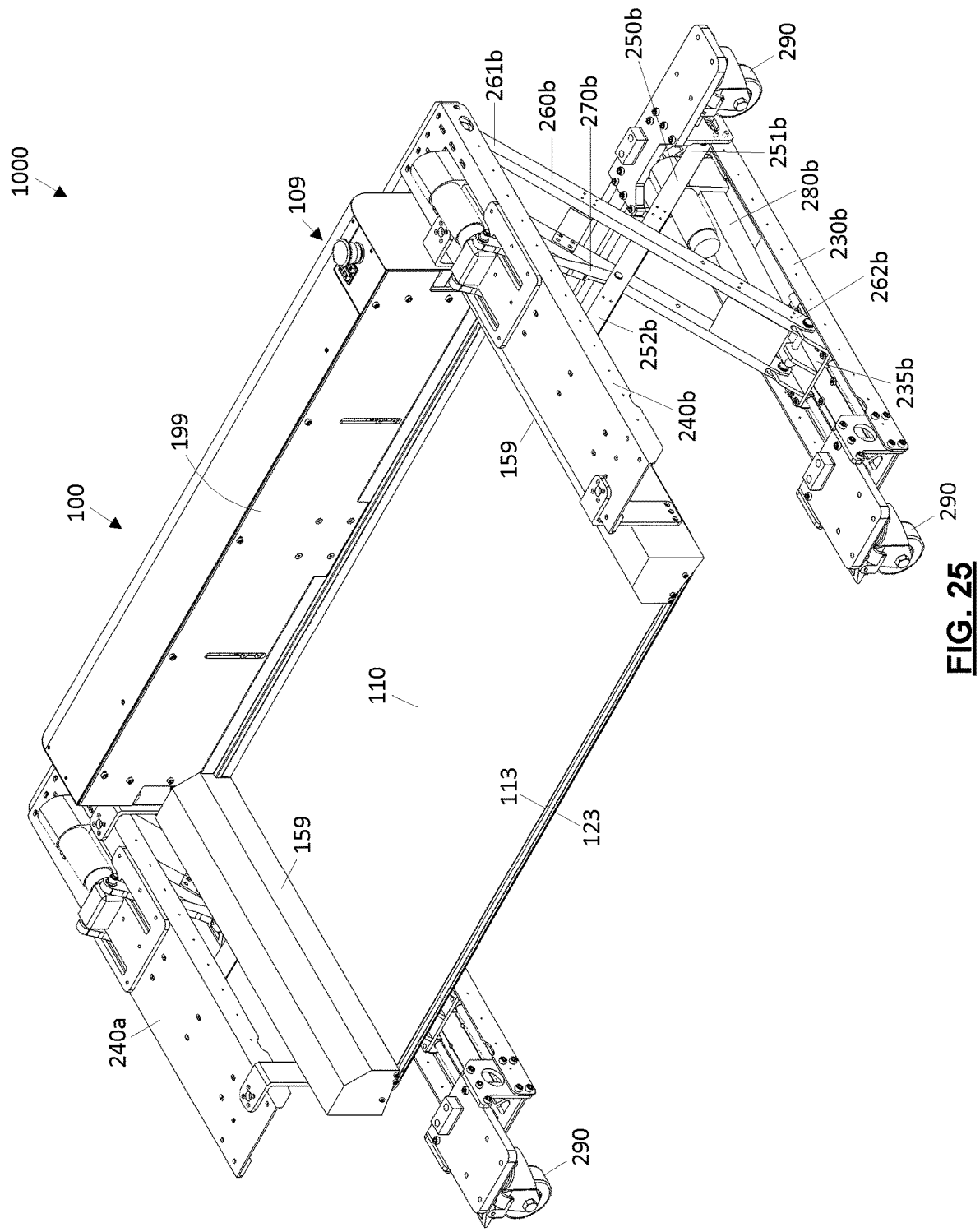
FIG. 25 is another perspective view of the transfer device of FIG. 24.
Figure 26:
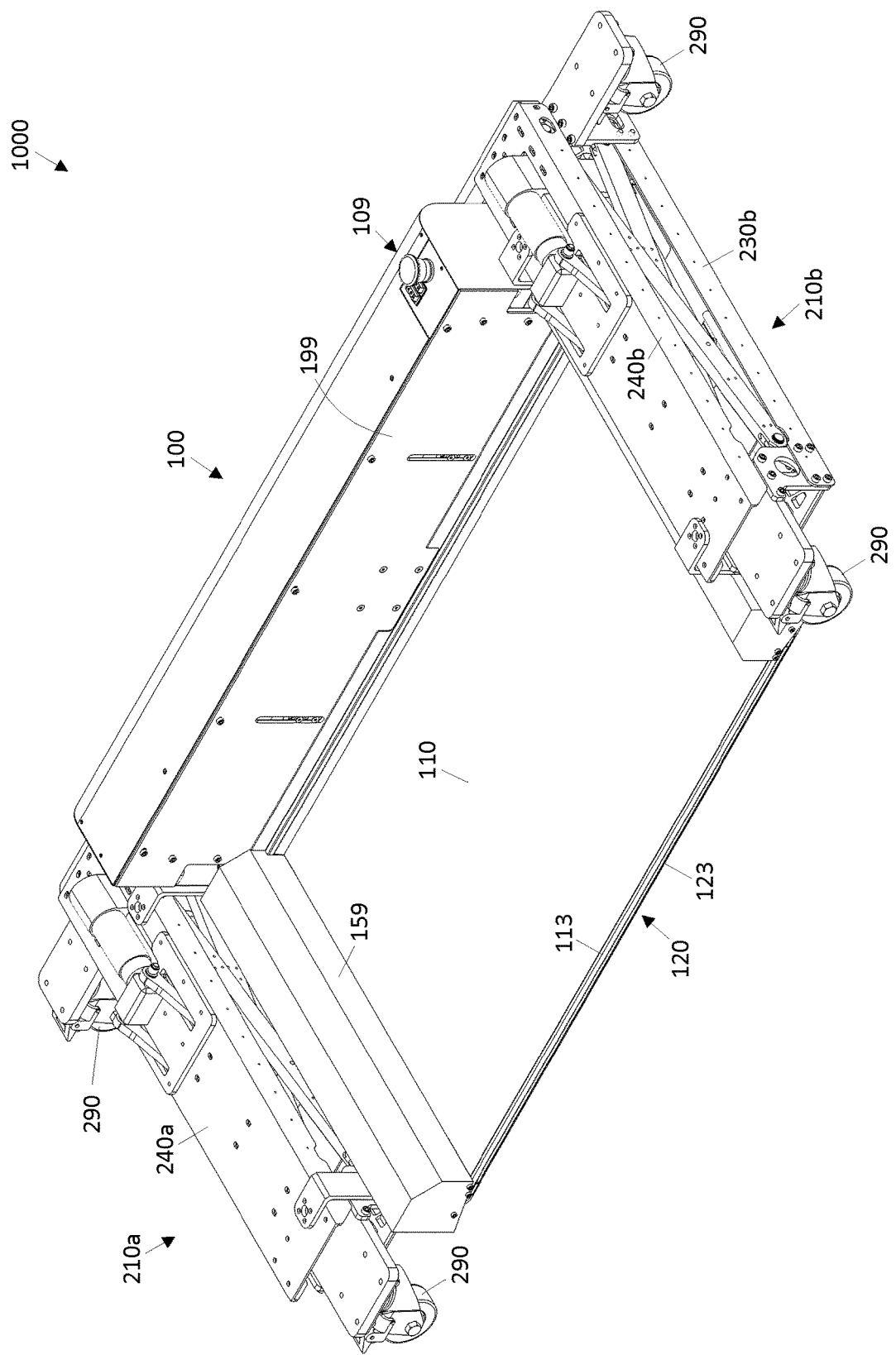
FIG. 26 is a perspective view of the transfer device of FIG. 24, with the transfer platform in a lowered position.
Figure 27:
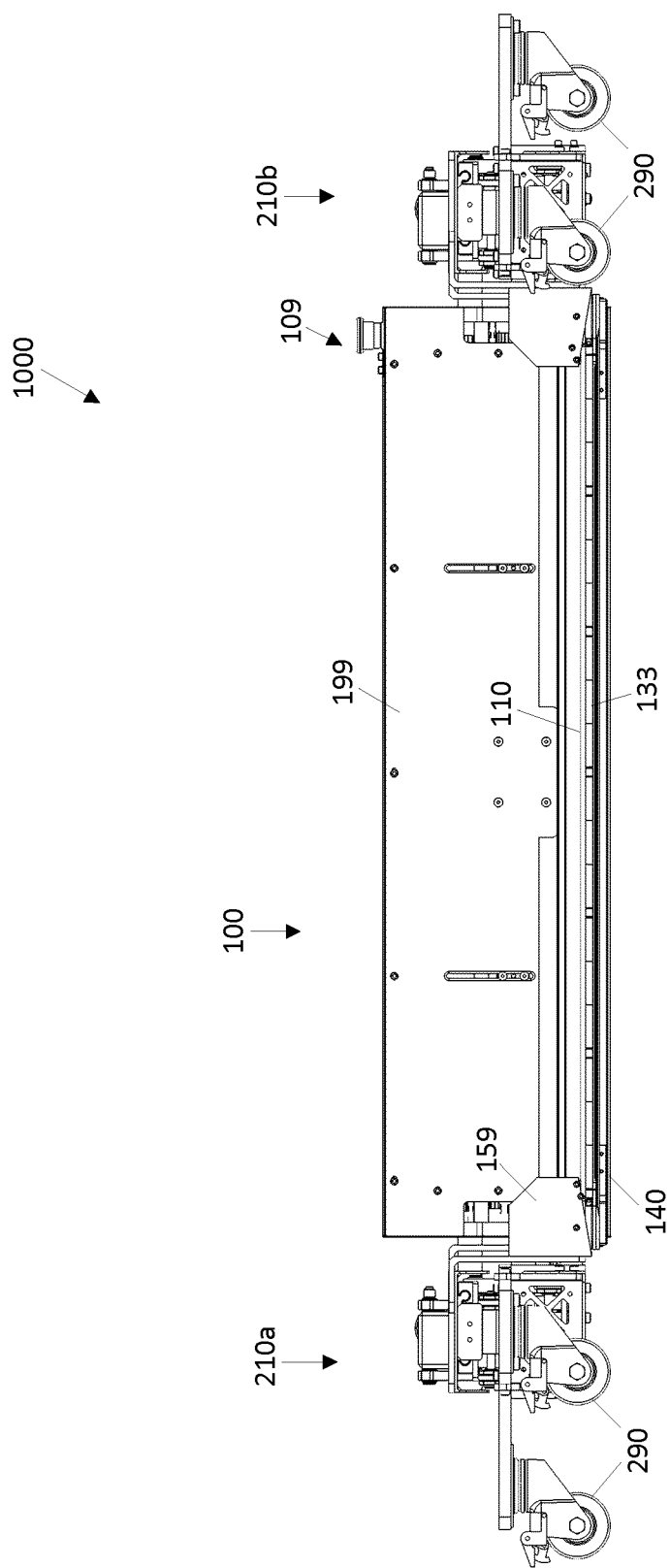
FIG. 27 is a front elevation view of the transfer device of FIG. 24, with the transfer platform in a lowered position.
Figure 28:
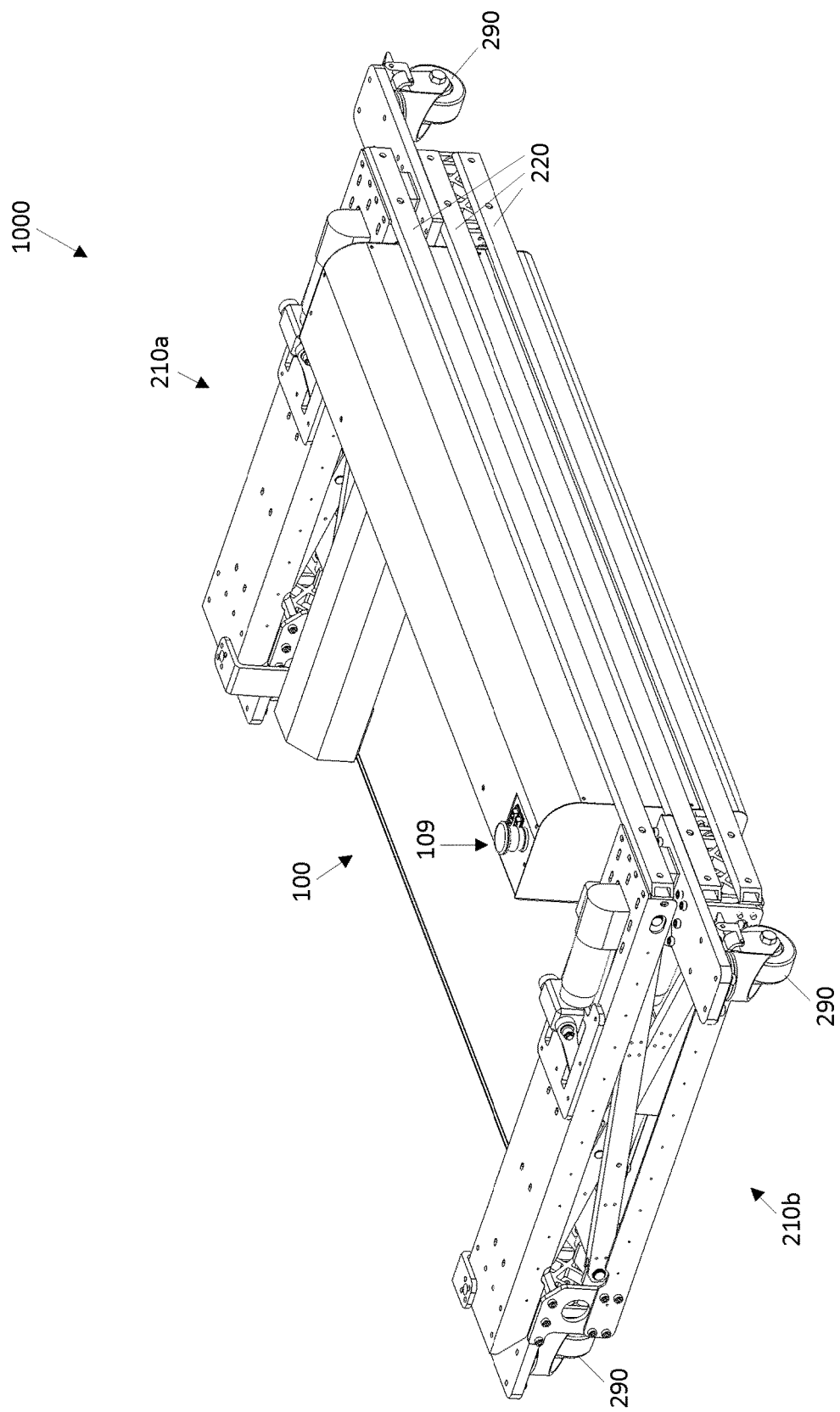
FIG. 28 is a rear perspective view of the transfer device of FIG. 24, with the transfer platform in a lowered position.
Figure 29:
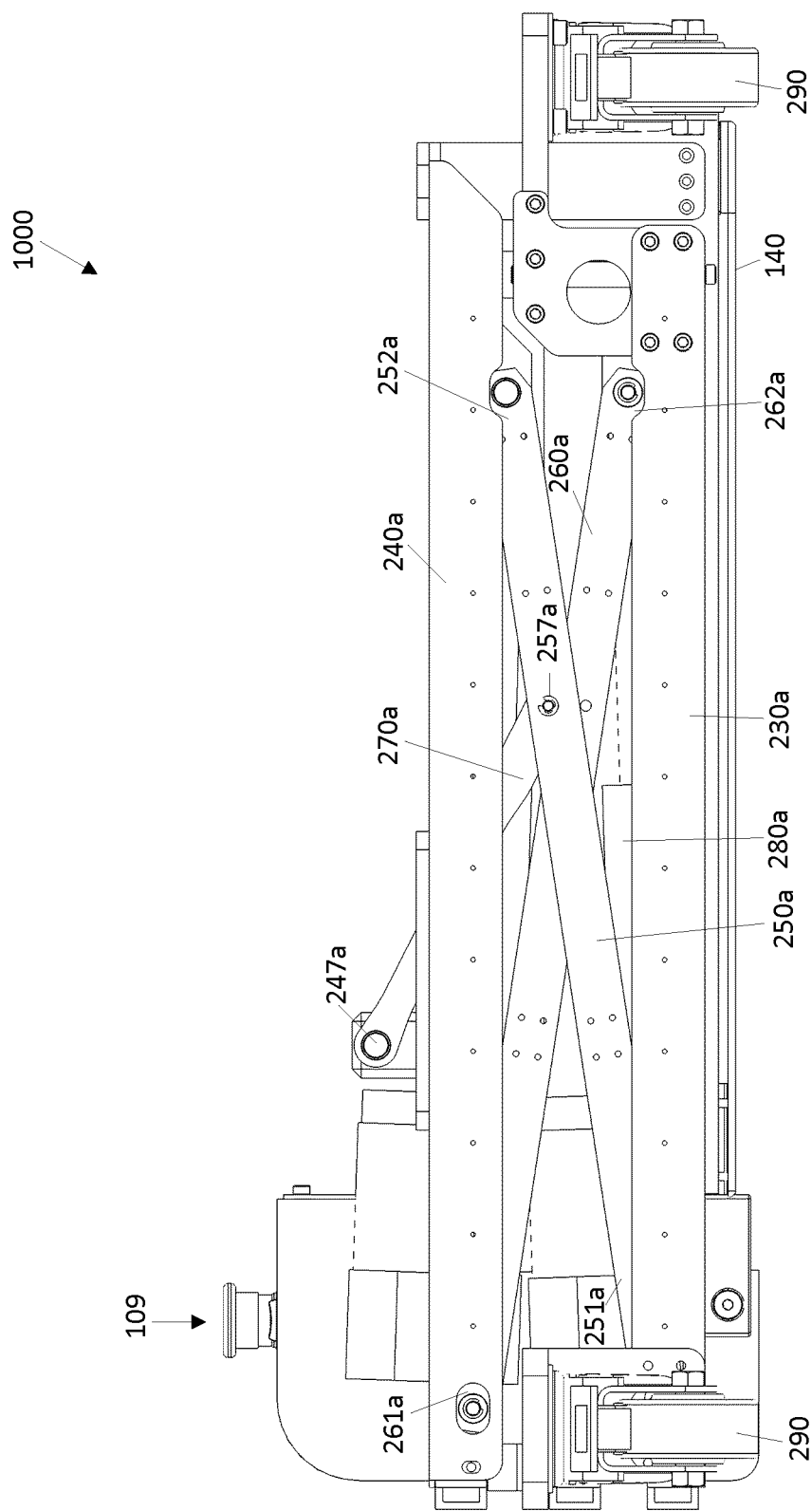
FIG. 29 is a side elevation view of the transfer device of FIG. 24, with the transfer platform in a lowered position.
Figure 30:
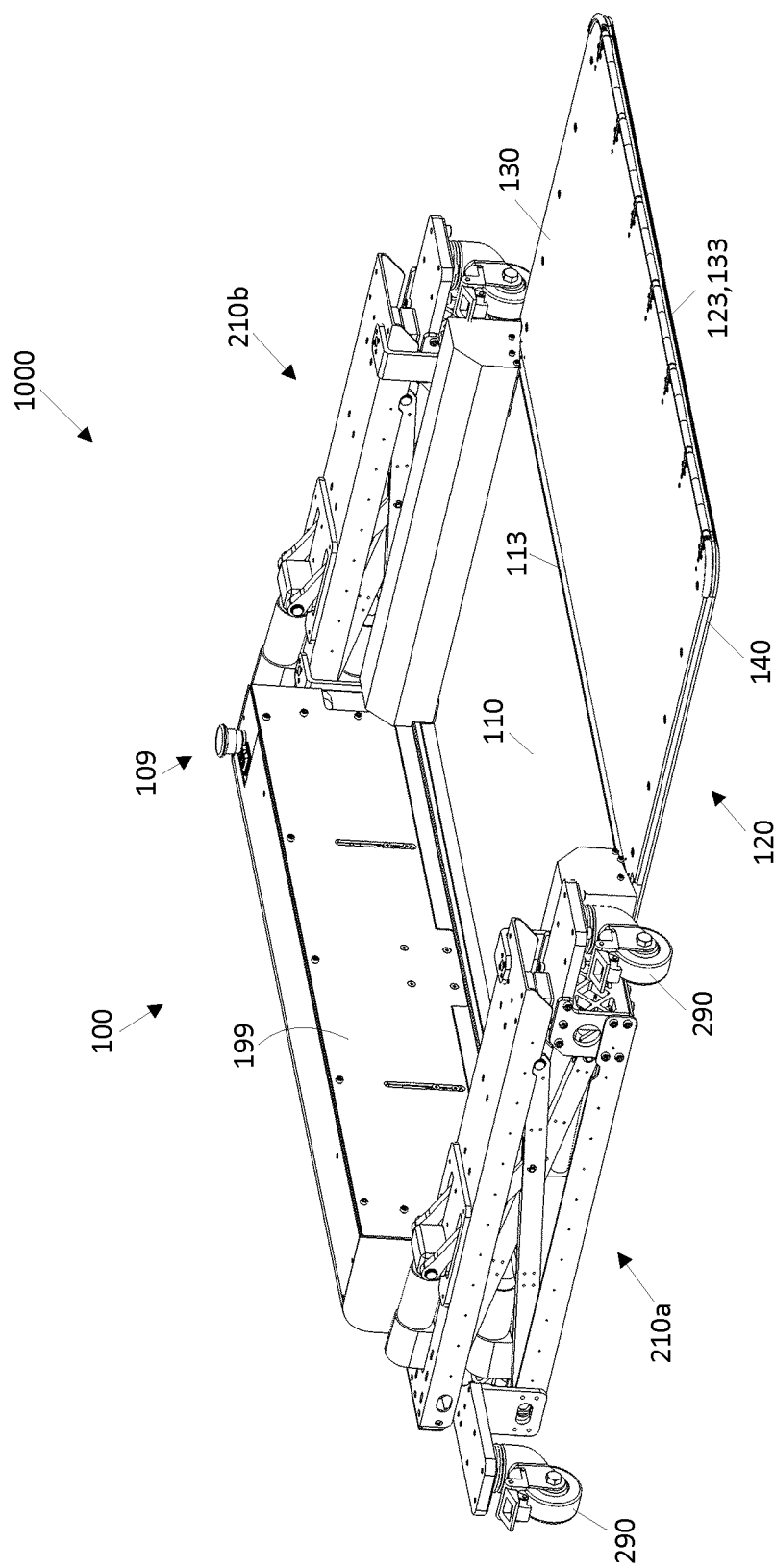
FIG. 30 is another perspective view of the transfer device of FIG. 24, with the transfer platform in a lowered position, and with the moveable plate in an extended position.

FIGS. 20 to 22 illustrate an example embodiment of a platform support structure, referred to generally as 200. Support structure 200 includes a first extendible linkage 210a, a second extendible linkage 210b, and support frame members 220 secured to each linkage 210 to form a generally U-shaped frame. Each extendible linkage includes at least one support actuator 280 to selectively expand and contract the linkage.

In use, platform support structure 200 may be secured to an extendable transfer platform (e.g. transfer platform 100) to raise, lower, and otherwise orient the transfer platform to facilitate the transfer of a human body from and/or to a remote surface using the transfer platform.

As illustrated in FIGS. 20 to 22, first extendible linkage 210a includes a linkage base member 230a, a linkage support member 240a, a first arm 250a and a second arm 260a. A first end 251a of first arm 250a is rotationally secured to linkage member base 230a, and a second end 252a of first arm 250a is rotationally secured to an upper linkage sled (not visible) positioned in linkage support member 240a. A first end 261a of second arm 260a is rotationally secured to linkage support member 240a, and a second end 262a of second arm 260a is rotationally secured to a lower linkage sled 235a positioned in linkage base member 230a.

Lower linkage sled 235a may be selectively moved along linkage base member 230a using a lower linkage actuator 280a. Similarly, upper linkage sled (not visible) may be selectively moved along linkage support member 240*a* using an upper linkage actuator 285*a*.

In the illustrated example, the upper and lower linkage actuators 285, 280 each comprise an electrically driven linear actuator. It will be appreciated that other actuator types (e.g. ballscrew, lead screw, hydraulic or pneumatic piston, or the like) may be used in variant embodiments for the first and/or the second linkage actuator. It will also be appreciated that various open and closed loop control methods, familiar to those knowledgeable in the art, can be used to adjust the height, orientation, and/or angle of platform support structure 200.

In the illustrated example, each extendible linkage 210*a*, 210*b* includes a third arm 270. With reference to first extendible linkage 210*a*, a first end 271*a* of third arm 270*a* is rotationally secured to an intermediate location 257*a* along the first arm 250*a*, and a second end 272*a* of third arm 270*a* is rotationally secured to a mounting point 247*a* positioned above the linkage support member 240*a*. In this configuration, when the upper and lower linkage actuators 285*a*, 280*a* are extended (or contracted) in unison, linkage support member 240*a* is raised (or lowered) away from linkage base member 230*a*, while remaining generally parallel to each other (e.g. as shown in FIG. 21). Alternatively, when the upper and lower linkage actuators 285*a*, 280*a* are extended (or contracted) at different rates, linkage support member 240*a* may be positioned at an angle relative to linkage base member 230*a* (e.g. as shown in FIG. 22). It will be appreciated that the lengths of the arms 250, 260, 270 and/or the spacing of their mounting points on the linkage base and support members 230, 240 may be selected based on dimensions of transfer platform 100, and/or to provide a desired travel path for the transfer platform when supported by support structure 200.

In order to assist in moving platform support structure 200, one or more wheels 290 may be coupled to linkage base members 230 and/or support frame members 220. In the illustrated example, wheels 290 are freely rotatable (e.g. configured as swivel casters), allowing the platform support structure 200 to be manually translated along a floor surface.

In some embodiments, one or more of wheels 290 may be driven by one or more motors (not shown) coupled to platform support structure 200, so that platform support structure 200 may be able to propel itself across a surface. For example, one or more motors may be provided to drive one or more of the wheels directly. Alternatively or additionally, wheel hub motors may be coupled to one or more of the wheels. Alternatively, or additionally, in some embodiments one or more of wheels 290 may be selectively rotatable by one or more motors (not shown) coupled to platform support structure 200, so that platform support structure 200 may be able to steer itself as it is being propelled. Alternatively, or additionally, the speed of any motors or other drive systems driving wheels to propel the apparatus may be independently adjustable to assist in steering and/or braking.

FIGS. 23 to 33 and FIGS. 36 to 40 illustrated a transfer device, referred to generally as 1000. Transfer device 1000 includes a transfer platform, such as transfer platform 100, and a platform support structure, such as platform support structure 200 to selectively position the transfer platform 100.

In use, the platform support structure allows the transfer platform to be positioned adjacent to a surface on which an object to be transferred (e.g. a human body) is supported, so that the object may be transferred from (or to) the surface.

As illustrated in FIGS. 23 to 33, transfer platform 100 is positioned between the extendible linkages 210*a*, 210*b*. This arrangement may have one or more advantages. For example, this may allow the transfer platform to be lowered to a position where the moveable plate is proximate (e.g. within about 50 mm) or abutting a floor surface that both the transfer device and an object to be transferred (e.g. a human body) are resting on, e.g. as illustrated in FIGS. 26 to 31. By positioning the moveable plate of the transfer platform close to (or abutting) the floor surface, this may reduce the magnitude of any vertical displacement of the object as the moveable plate is extended underneath the object.

Figure 37:
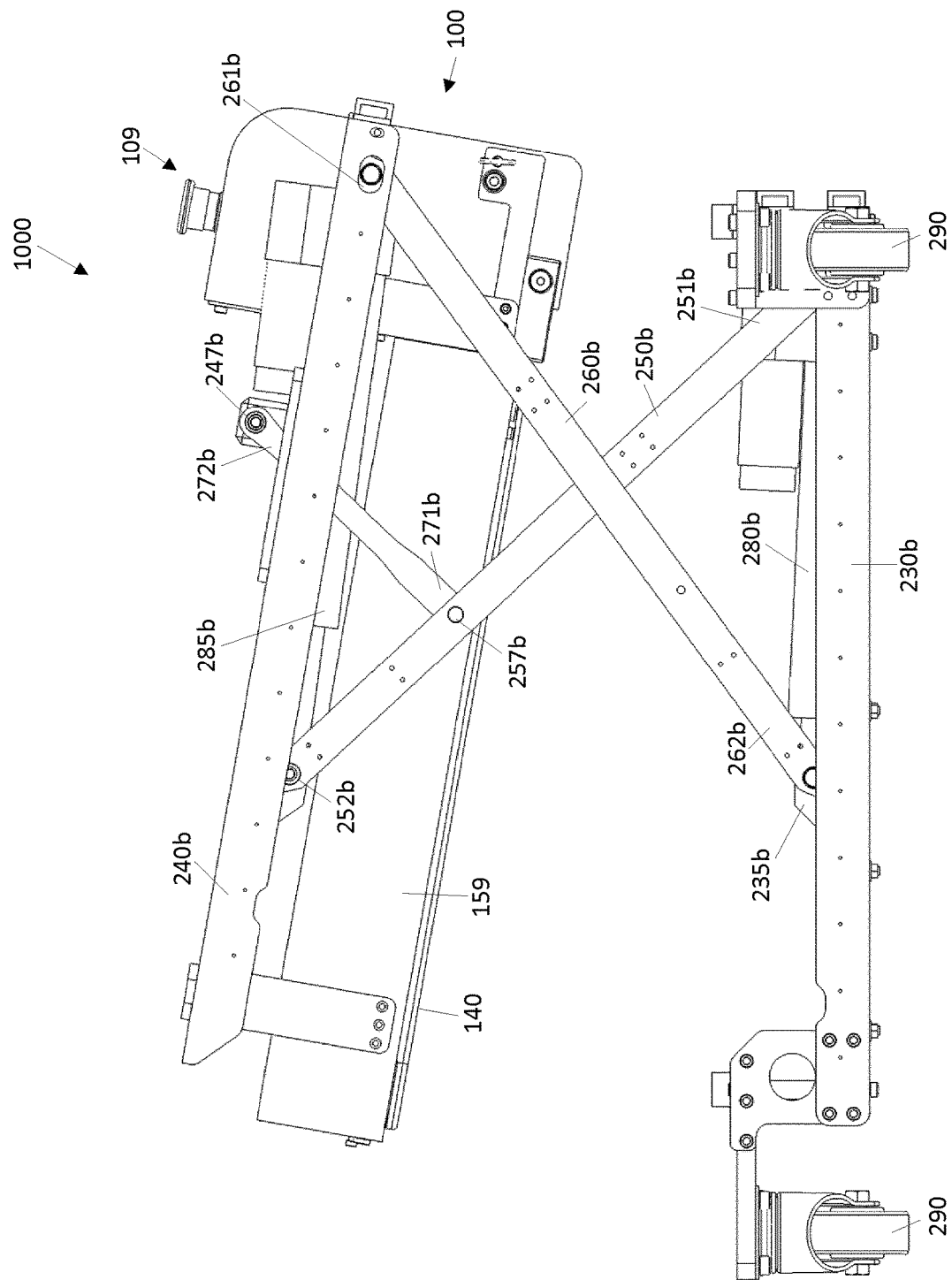
FIG. 37 is a side elevation view of the transfer device of FIG. 23, with the transfer platform in a raised and upwardly tilted position.
Figure 38:
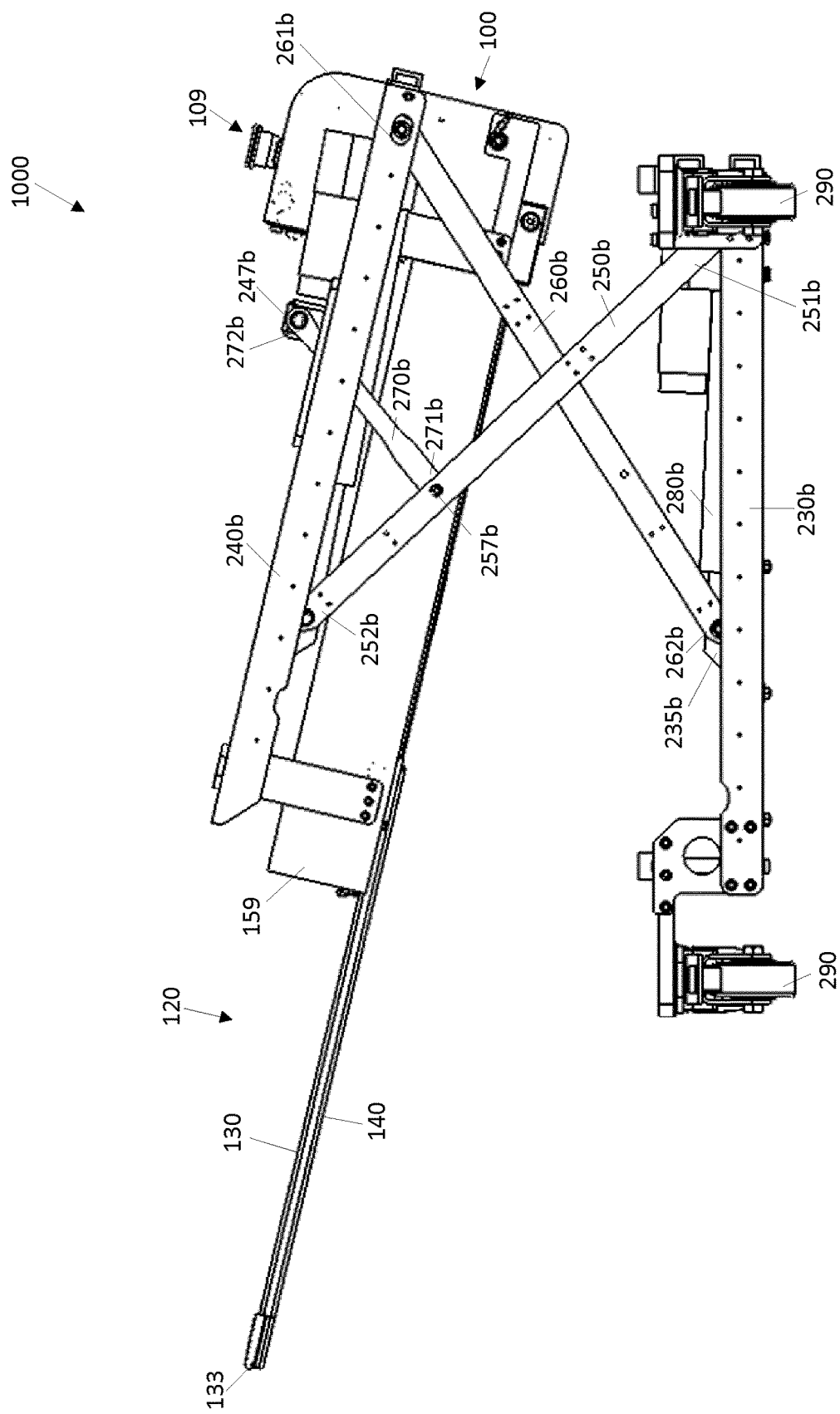
FIG. 38 is a side elevation view of the transfer device of FIG. 37, with the moveable plate in an extended position.
Figure 39:
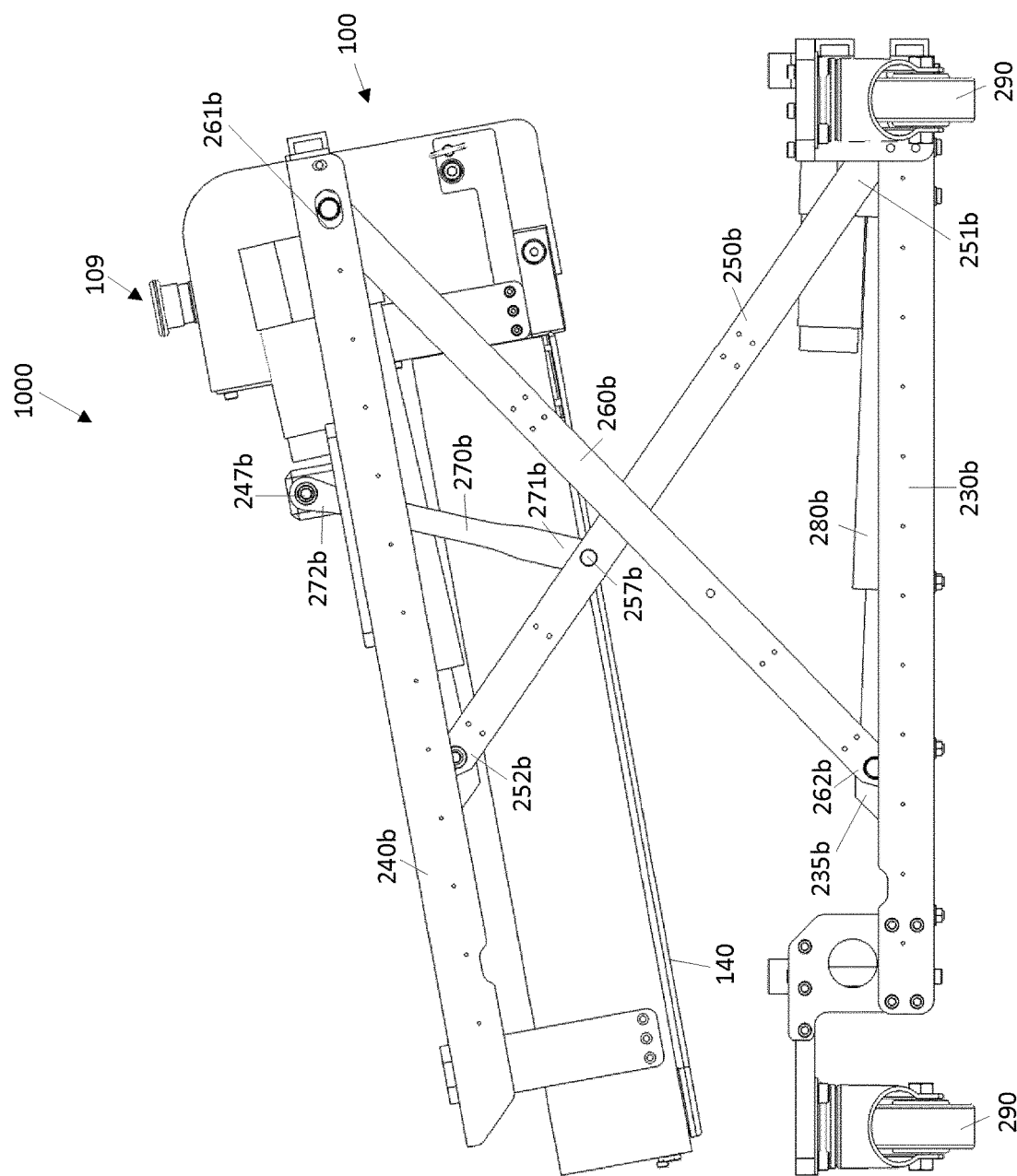
FIG. 39 is a side elevation view of the transfer device of FIG. 23, with the transfer platform in a raised and downwardly tilted position.
Figure 40:
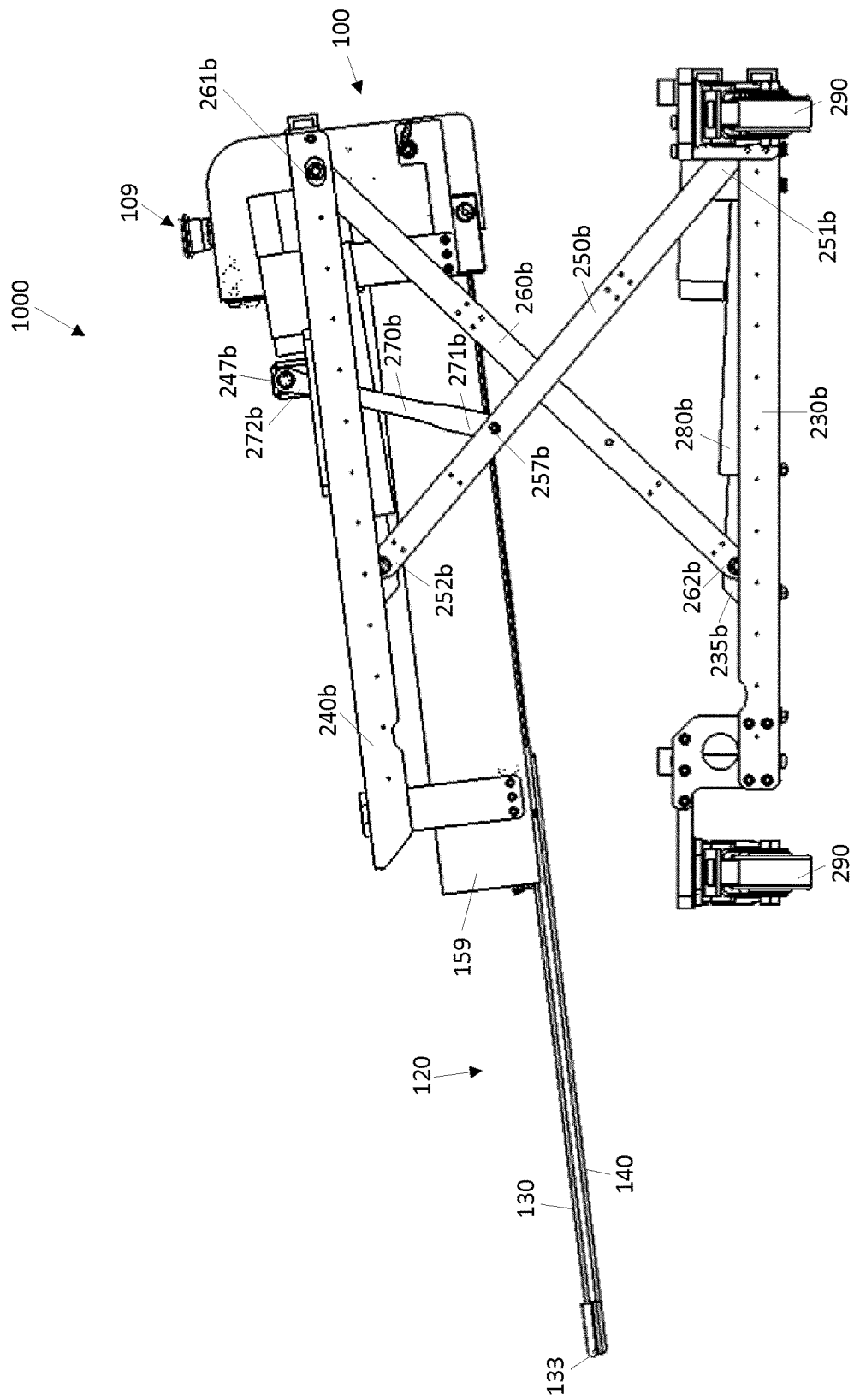
FIG. 40 is a side elevation view of the transfer device of FIG. 39, with the moveable plate in an extended position.

As illustrated in FIGS. 37 to 40, the transfer support structure of transfer device 1000 may also be used to position the transfer platform at an angle relative to a surface from (or to) which an object is to be transferred. This arrangement may have one or more advantages. For example, the transfer platform may be oriented such that leading edge 123 of moveable plate 120 is initially positioned at an angle to the surface on which the object is resting (e.g. as shown in FIGS. 39 and 40) in order to facilitate the extension of the moveable plate between the object and the surface. The angle of the transfer platform may then be reduced (e.g. concurrently) as the moveable plate is extended underneath the object. As another example, the transfer platform may be oriented such that leading edge 123 is elevated relative to housing 199 (e.g. as shown in FIGS. 37 and 38) in order to inhibit or prevent an object from falling off of the transfer platform.

Optionally, transfer device 1000 may have a modular design, wherein transfer platform 100 and platform support structure 200 are modular components that are readily assemblable and disassemblable. For example, in the embodiment illustrated in FIGS. 32 and 33, transfer platform 100 may be separated from the platform support structure 200 by decoupling or removing four bolts 245. Optionally, a single electrical connector (not shown) for electrically coupling transfer platform 100 and platform support structure 200 may be provided to simplify assembly/disassembly of transfer device 1000.

The operation of transfer device 1000 in transferring a human body from a floor surface will now be described with reference to FIGS. 35A-D. The operation will be described in connection with the transfer device 1000 transferring a human body 10 from in incompressible floor surface 30. However, it will be understood that transfer device 1000 may transfer a human body (or other object) off of and on to a compressible (e.g. carpeted) floor surface in the same manner.

Figure 35A:
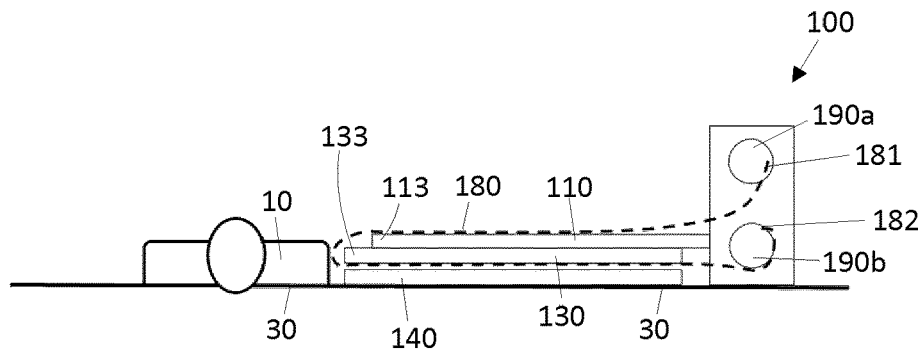
FIGS. 35A-D are a series of schematic elevation views illustrating the extendible transfer platform of FIG. 1 being used to transfer a human from a floor surface onto the transfer platform.

Transfer device 1000 is positioned beside the human body to be transferred, e.g. such that the transfer platform 100 is in the position shown in FIG. 35A, with the guard layer 140 of moveable plate 120 proximate (e.g. within about 50 mm) or abutting the floor surface 30. For example, transfer platform 100 may be lowered to the floor surface by collapsing the linkages 210 of platform support structure 200, as discussed above.

Figure 35B:
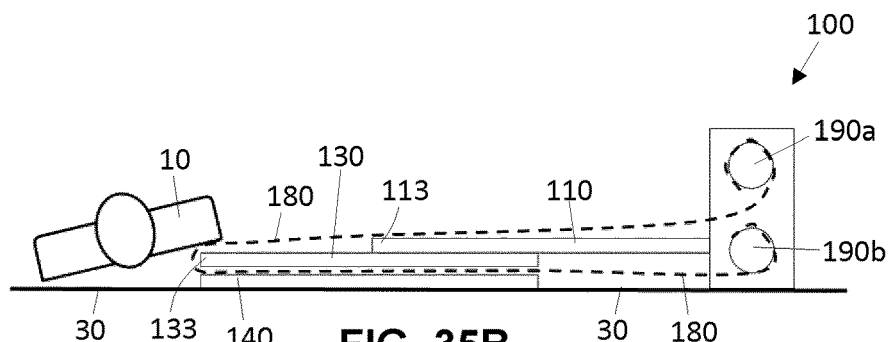

Referring to FIG. 35B, platform actuators 150 are used to extend the leading edge 123 of moveable plate 120 so that at least a portion of moveable plate 120 is positioned below the body 10, with a portion of transfer belt 180 positioned between moveable plate 120 and body 10.

Figure 35C:
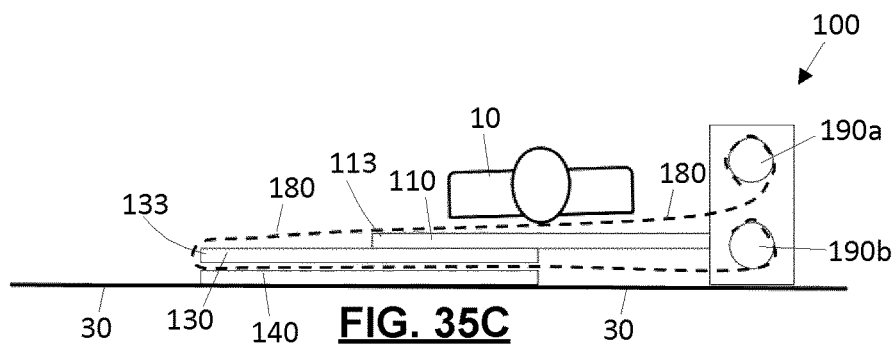

Referring to FIG. 35C, the first and second driven rollers are then actuated to convey the body 10 along upper surfaces of the moveable plate 120 and fixed plate 110. In the illustrated example, this may be achieved by 'winding' first driven roller 190*a* while concurrently 'unwinding' second driven roller 190b to advance the upper surface of transfer belt 180 towards housing 199. Alternatively, first driven roller 190a may be 'wound' while allowing second driven roller 190b to 'unwind' by rolling freely.

Figure 35D:
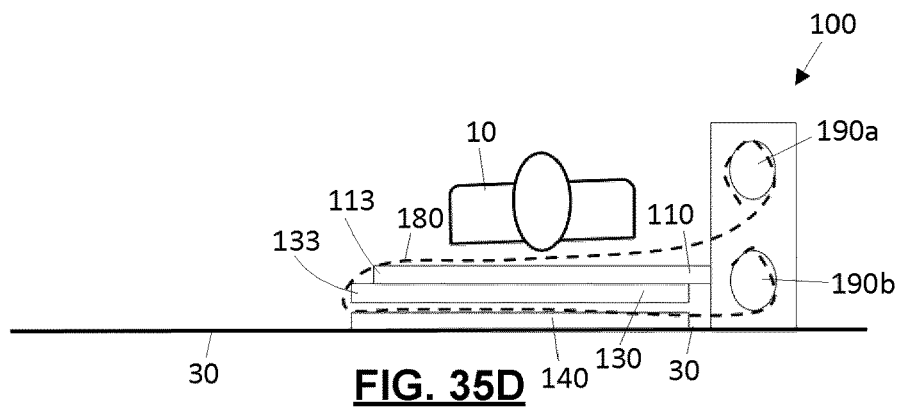
Figure 36:
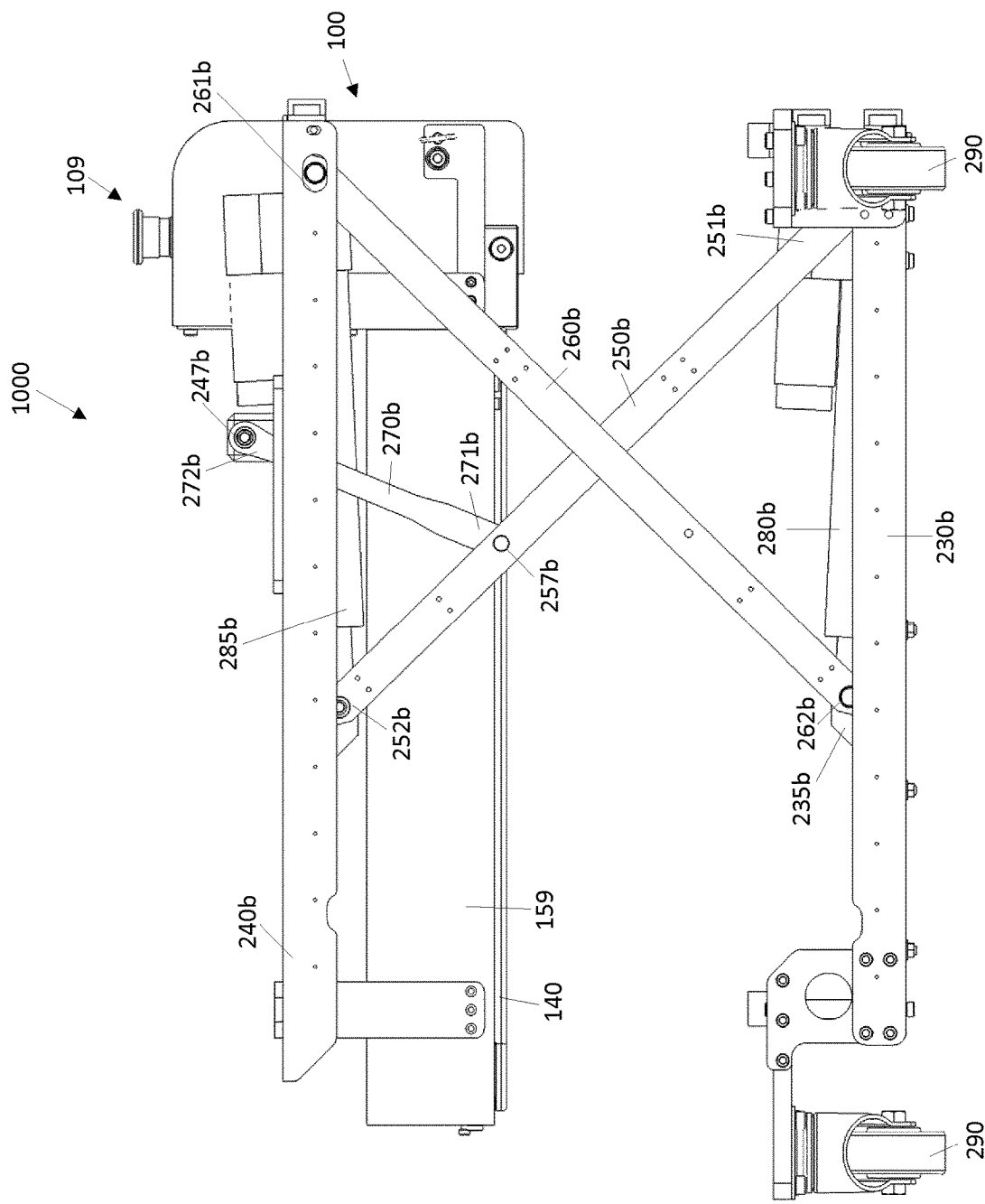
FIG. 36 is a side elevation view of the transfer device of FIG. 23, with the transfer platform in a raised position.

Referring to FIG. 35D, moveable plate 120 may then be retracted to a position in which fixed plate 110 overlies a majority of moveable plate 120. Preferably, driven rollers 190a, 190b may be controlled to take-up slack in transfer belt 180 during the retraction of moveable plate 120.

Optionally, moveable plate 120 may be retracted concurrently with the advancement of the upper surface of transfer belt 180 towards housing 199. For example, the motion of moveable plate 120 and/or transfer belt 180 may be controlled to provide limited (or zero) relative motion between an upper surface of moveable plate 120 and body 10 during some or all of the retraction.

In some embodiments, transfer device 1000 may have a control system that provides assisted control over some or all steps of transferring a body from (or to) a remote surface. For example, a transfer device controller may obtain feedback via one or more sensors or sensory systems embedded in transfer platform 100 and/or platform support structure 200.

Figure 41:
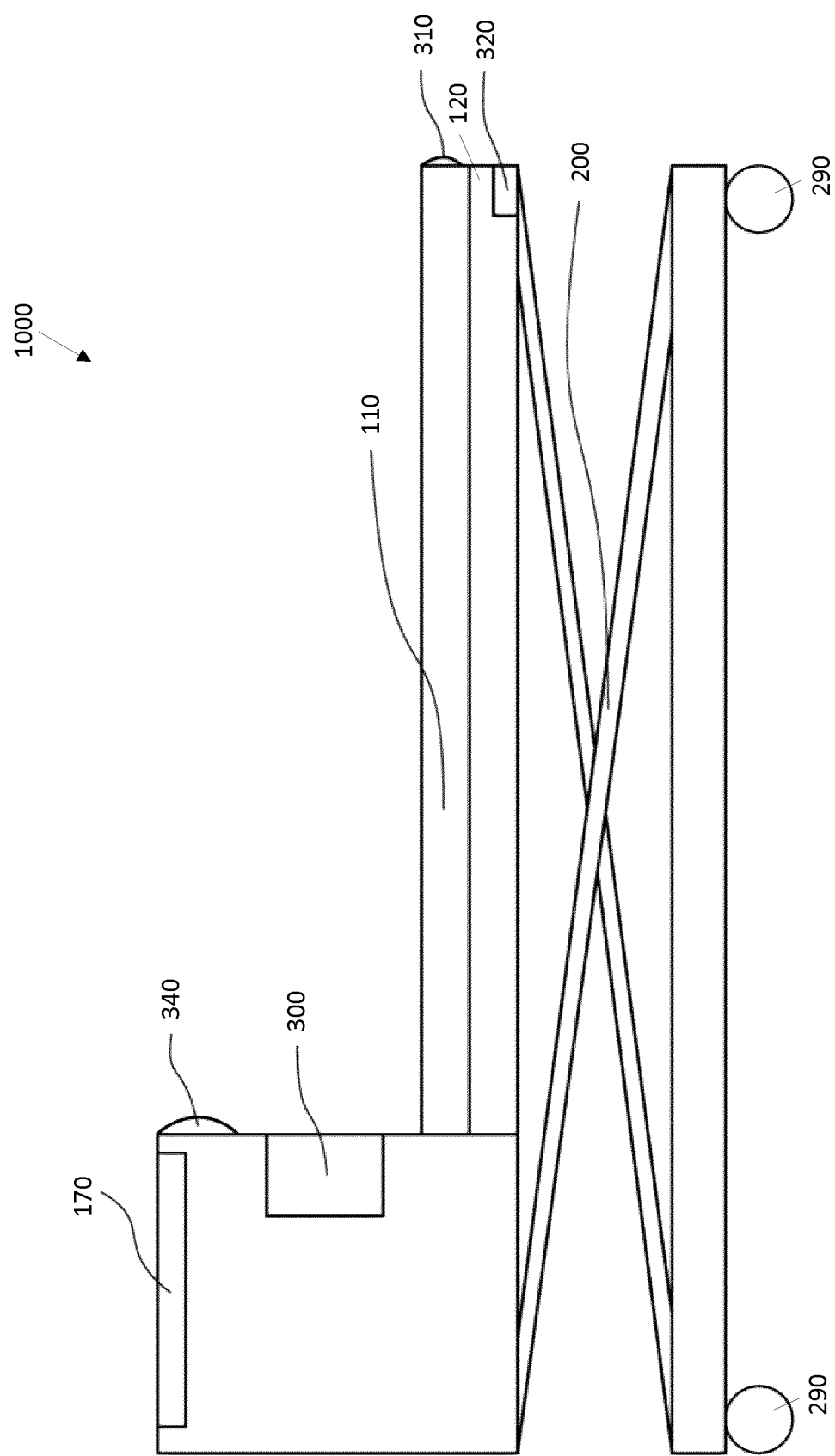
FIG. 41 is a schematic view of a transfer device in accordance with another embodiment.

Referring to FIG. 41, transfer device 1000 may include a controller 300 operatively coupled to a sensor system that includes one or more positioning sensors 310 for providing relative position information for an object to be transferred and the leading edge 123 of moveable plate 120. The relative positioning information may, for example, to assist in aligning the leading edge of the upper moveable plate with the object to be transferred. Positioning sensors 310 may include direct positioning sensors. For example, one or more ultrasonic sensors may be provided to determine a distance between leading edge 123 and a body resting on a surface. As another example, one or more force transducers (or other tactile sensors) may be provided. Additionally, or alternatively, one or more optical sensors 340, such as an infrared (IR) based time of flight sensor, a LiDAR system, a digital camera system, a depth-enabled camera system, and a radar mapping system may be provided to provide and/or supplement the relative position information. Additionally, or alternatively, one or more indirect or implicative sensors, such as a time-of-flight sensor, may be provided to provide and/or supplement the relative position information.

In some embodiments, transfer device 1000 may include one or more contact sensors 320 for providing feedback for physical interactions between transfer device 1000 and its operating environment. For example, one or more contact sensors, such as pressure sensors, strain gauges, strain transducers, capacitive or non-capacitive 'touch' systems, or the like may be provided to detect contact between moveable plate 120 and/or fixed plate 110 and a remote surface on which an object to be transferred is resting. For example, if the remote surface is compressible (e.g. a mattress), stresses imposed on the compressible surface by moveable plate 120 may be controlled by monitoring the one or more contact sensors and adjusting the motion of the moveable plate and/or the platform support structure 200 based on the detected contact.

As used herein, the wording "and/or" is intended to represent an inclusive—or. That is, "X and/or Y" is intended to mean X or Y or both, for example. As a further example, "X, Y, and/or Z" is intended to mean X or Y or Z or any combination thereof.

It should be noted that terms of degree such as "substantially", "about" and "approximately" as used herein mean a reasonable amount of deviation of the modified term such that the end result is not significantly changed. These terms of degree may also be construed as including a deviation of the modified term, such as by 1%, 2%, 5% or 10%, for example, if this deviation does not negate the meaning of the term it modifies.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A transfer device comprising:
an extendable transfer platform comprising:
a fixed plate having a first end, a second end, and a leading edge extending between the first end and the second end,
a moveable plate positioned below the fixed plate and having a first end, a second end, and a leading edge extending between the first end and the second end,
at least one platform actuator configured to selectively move the moveable plate relative to the fixed plate between a retracted position in which the fixed plate overlies a majority of the moveable plate, and an extended position in which the leading edge of the moveable plate is located distally from the leading edge of the fixed plate,
a transfer belt having a first end secured to a first driven roller, a second end secured to a second driven roller, the transfer belt extending from the first driven roller, above an upper surface of the fixed plate, around the leading edge of the moveable plate, and to the second driven roller, wherein the transfer belt overlies the fixed plate and the moveable plate in both the retracted and extended positions;
a platform support structure secured to the extendable transfer platform for supporting the extendable transfer platform above a floor surface, the platform support structure comprising:
at least one support actuator configured to selectively move the transfer platform relative to the floor surface between a lowered position in which at least the leading edge of the moveable plate is proximate the floor surface, and a raised position; and
a transfer device controller operably coupled to the first driven roller, the second driven roller, and the at least one platform actuator.

2. The transfer device of claim 1, wherein, in the lowered position, at least the leading edge of the moveable plate is within about 50 mm of the floor surface.

3. The transfer device of claim 1, wherein the moveable plate comprises an upper moveable plate and a guard layer positioned below and secured to the upper moveable plate.

4. The transfer device of claim 3, wherein, in the lowered position, the guard layer abuts the floor surface.

5. The transfer device of claim 3, wherein a lower surface of the guard layer comprises at least one of a low-friction surface treatment and a roller.

6. The transfer device of claim 3, wherein a combined height of the upper moveable plate and the guard layer is less than about 50 mm.

7. The transfer device of claim 3, wherein the guard layer comprises a rigid guard plate.

8. The transfer device of claim 3, wherein each of the at least one platform actuator, the first driven roller, and the second driven roller are positioned above the guard layer.

9. The transfer device of claim 1, wherein the moveable plate comprises two or more articulated plate segments.

10. The transfer device of claim 1, wherein the moveable plate comprises two or more telescopic plate segments.

11. The transfer device of claim 1, wherein, the transfer device controller is operably coupled to the at least one support actuator.

12. The transfer device of claim 1, wherein the at least one platform actuator comprises a first linear actuator positioned proximate the first end of the fixed plate, and a second linear actuator positioned proximate the second end of the fixed plate.

13. The transfer device of claim 12, wherein the first and second linear actuators are mechanically coupled to each other and driven by a single platform motor.

14. The transfer device of claim 1, wherein the at least one support actuator is further configured to selectively tilt the transfer platform relative to the floor surface.

15. The transfer device of claim 1, further comprising:
a belt treatment system comprising at least one of:
a UV light emitter configured to direct UV light towards at least an upper surface of the transfer belt;
a fluid emitter configured to direct at least one of a cleaning fluid and a disinfectant fluid towards at least the upper surface of the transfer belt; and
a fluid agitator configured to agitate fluid in a fluid chamber through which the transfer belt is configured to pass.

16. The transfer device of claim 15, wherein the belt treatment system comprises the UV light emitter, wherein the transfer device controller is operatively coupled to the belt treatment system, and wherein the transfer device controller is configured to selectively actuate the UV light emitter.

17. The transfer device of claim 15, wherein the belt treatment system comprises the fluid emitter, wherein the transfer device controller is operatively coupled to the belt treatment system, and wherein the transfer device controller is configured to selectively actuate the fluid emitter.

18. The transfer device of claim 15, wherein the belt treatment system comprises the fluid agitator, wherein the transfer device controller is operatively coupled to the belt treatment system, and wherein the transfer device controller is configured to selectively actuate the fluid agitator.

19. The transfer device of claim 15, wherein the transfer device controller is operatively coupled to the belt treatment system, and wherein the transfer device controller is configured to selectively actuate one or more of the UV light emitter, the fluid emitter, and the fluid agitator concurrently or separately from each other.

* * * * *